United States Patent
Anderfaas

(10) Patent No.: US 9,327,725 B2
(45) Date of Patent: May 3, 2016

(54) GEOMETRY FOR IMPROVED DRIVELINE-SUSPENSION COUPLING OF NARROW LEANING COMMUTER VEHICLES

(71) Applicant: Eric N. Anderfaas, Westminster, CA (US)

(72) Inventor: Eric N. Anderfaas, Westminster, CA (US)

(*) Notice: Subject to any disclaimer, the term of this patent is extended or adjusted under 35 U.S.C. 154(b) by 0 days.

(21) Appl. No.: 14/289,427

(22) Filed: May 28, 2014

(65) Prior Publication Data

US 2014/0358369 A1 Dec. 4, 2014

Related U.S. Application Data

(60) Provisional application No. 61/828,084, filed on May 28, 2013.

(51) Int. Cl.
| | |
|---|---|
| B60W 30/045 | (2012.01) |
| B60W 10/22 | (2006.01) |
| B60W 10/04 | (2006.01) |
| B62K 5/10 | (2013.01) |
| B62K 5/00 | (2013.01) |

(52) U.S. Cl.
CPC ............ *B60W 30/045* (2013.01); *B60W 10/04* (2013.01); *B60W 10/22* (2013.01); *B62K 5/10* (2013.01); *B62K 2005/001* (2013.01)

(58) Field of Classification Search
CPC .... B60W 30/045; B60W 10/04; B60W 10/22
USPC ......... 701/37; 180/214, 216; 280/5.5, 47.131; 303/146, 148
See application file for complete search history.

(56) References Cited

U.S. PATENT DOCUMENTS

| | | | |
|---|---|---|---|
| 3,504,934 A | 4/1970 | Wallis | |
| 3,583,727 A | 6/1971 | Wallis | |
| 3,645,558 A | 2/1972 | McMullen | |
| 3,712,404 A | 1/1973 | Walquist | |
| 3,866,341 A | 2/1975 | Fabrygel | |
| 3,931,989 A | 1/1976 | Nagamitsu | |

(Continued)

FOREIGN PATENT DOCUMENTS

| | | |
|---|---|---|
| DE | 3044899 A1 | 6/1982 |
| DE | 3611417 A1 | 10/1987 |

(Continued)

OTHER PUBLICATIONS

Foale, T., "Motorcycle Handling and Chassis Design: The Art and Science"; 2002; Chapter 9 (pp. 9.1-9.50); self-published paper, Spain; available for order at www.tonyfoale.com.

(Continued)

*Primary Examiner* — Fadey Jabr
*Assistant Examiner* — Yazan A Soofi
(74) *Attorney, Agent, or Firm* — Rod D. Baker

(57) ABSTRACT

A method and apparatus relating to a driveline and suspension system for a vehicle and, more particularly, methods and systems for driveline-suspension coupling in a narrow multi-track leaning vehicle with three or more wheels and with at least two driving wheels. There are provided graphical and computational methods for determining driveline and suspension geometries for narrow multi-track vehicles, as well as apparatuses including the geometric configurations, and exhibiting improved driveline-suspension coupling behaviors.

19 Claims, 57 Drawing Sheets

(56) References Cited

U.S. PATENT DOCUMENTS

| | | | |
|---|---|---|---|
| 4,003,443 A | 1/1977 | Boughers | |
| 4,046,211 A | 9/1977 | Allen | |
| 4,159,752 A | 7/1979 | Kanno | |
| 4,423,795 A | 1/1984 | Winchell et al. | |
| 4,429,760 A | 2/1984 | Koizumi | |
| 4,433,747 A | 2/1984 | Offenstadt | |
| 4,434,868 A | 3/1984 | Brenner et al. | |
| 4,437,535 A | 3/1984 | Winchell et al. | |
| 4,674,589 A | 6/1987 | Szymkowiak | |
| 4,678,053 A | 7/1987 | Watanabe et al. | |
| 4,887,829 A | 12/1989 | Prince | |
| 4,974,863 A | 12/1990 | Patin | |
| 5,040,812 A | 8/1991 | Patin | |
| 5,469,930 A | 11/1995 | Wiers | |
| 5,611,555 A * | 3/1997 | Vidal | 280/282 |
| 5,765,846 A | 6/1998 | Braun | |
| 6,328,121 B1 | 12/2001 | Woodbury et al. | |
| 6,766,876 B2 | 7/2004 | Ozeki et al. | |
| 7,097,187 B2 | 8/2006 | Walters et al. | |
| 7,121,570 B2 | 10/2006 | Parker | |
| 7,878,290 B2 * | 2/2011 | Tsujii et al. | 180/385 |
| 9,045,015 B2 * | 6/2015 | Spahl et al. | |
| 2006/0170171 A1 * | 8/2006 | Pedersen | 280/62 |
| 2008/0238005 A1 * | 10/2008 | James | 280/5.509 |
| 2010/0044977 A1 * | 2/2010 | Hughes et al. | 280/5.509 |
| 2011/0006498 A1 * | 1/2011 | Mercier | 280/124.103 |
| 2012/0181765 A1 * | 7/2012 | Hill et al. | 280/62 |
| 2013/0068550 A1 * | 3/2013 | Gale | 180/216 |

FOREIGN PATENT DOCUMENTS

| | | |
|---|---|---|
| DE | 3711554 A1 | 10/1988 |
| DE | 4035128 A1 | 6/1992 |
| EP | 1702773 A3 | 9/2006 |
| WO | 97 27071 A1 | 7/1997 |
| WO | 2008 012251 A1 | 1/2008 |

OTHER PUBLICATIONS

Milliken, W.F. et al; "Race Car Vehicle Dynamics"; 1995; Chapter 17 (pp. 607-663); SAE International, Warrendale, Pennsylvania, USA.

* cited by examiner

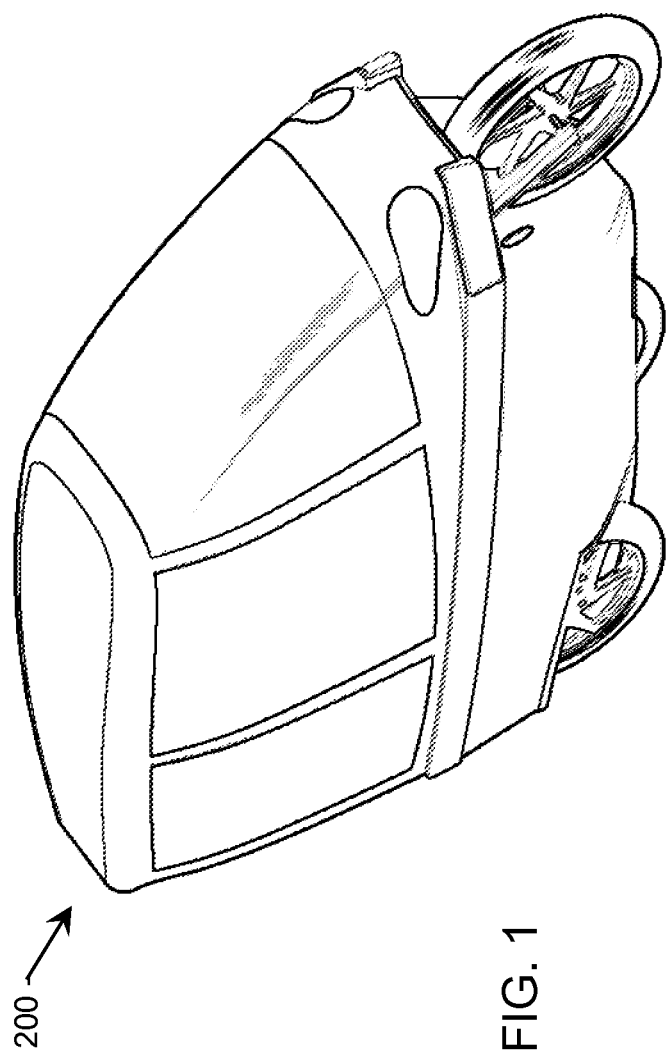

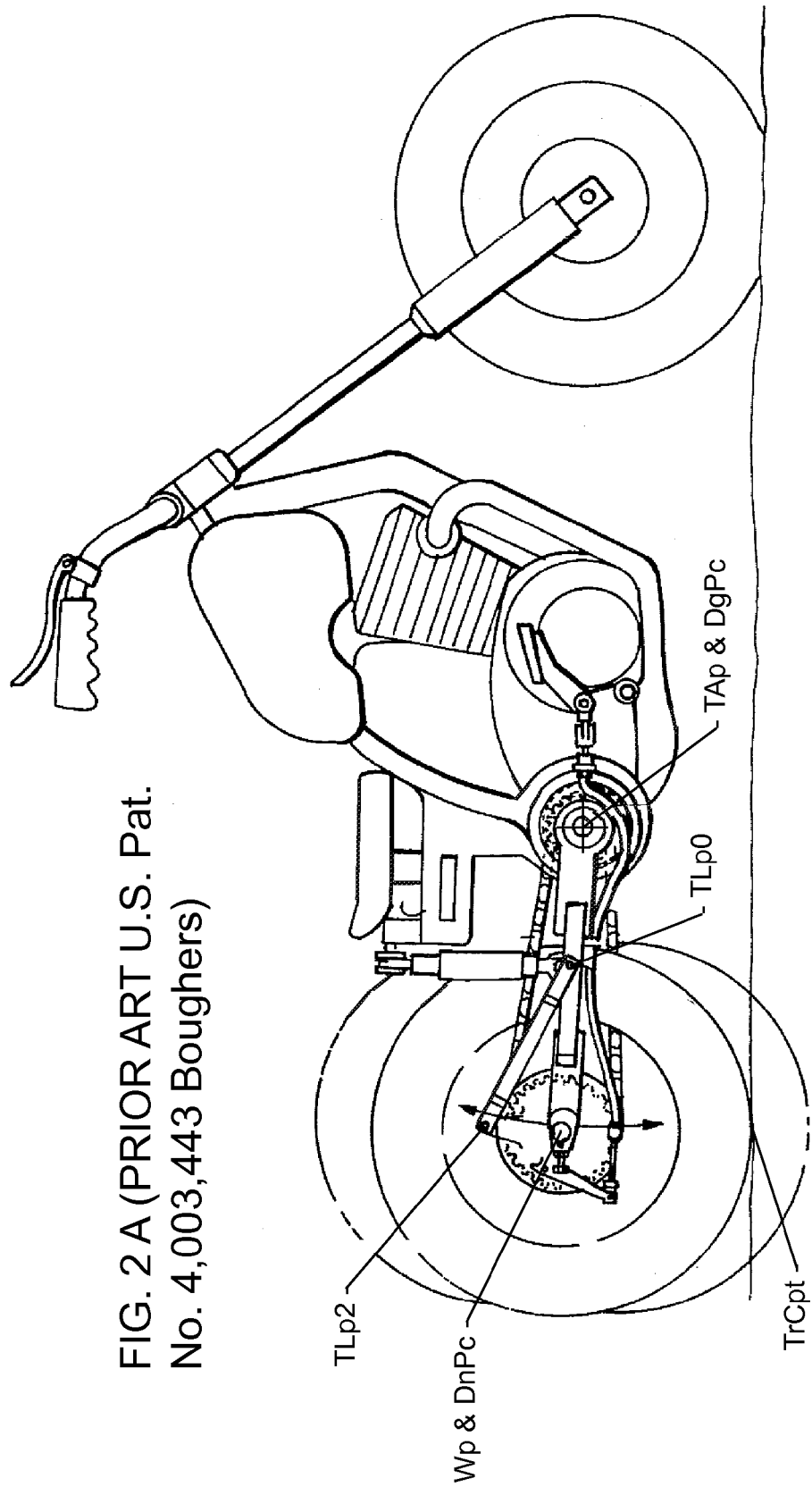
FIG. 2A (PRIOR ART U.S. Pat. No. 4,003,443 Boughers)

(U.S. Pat. No. 4,003,443 Boughers)

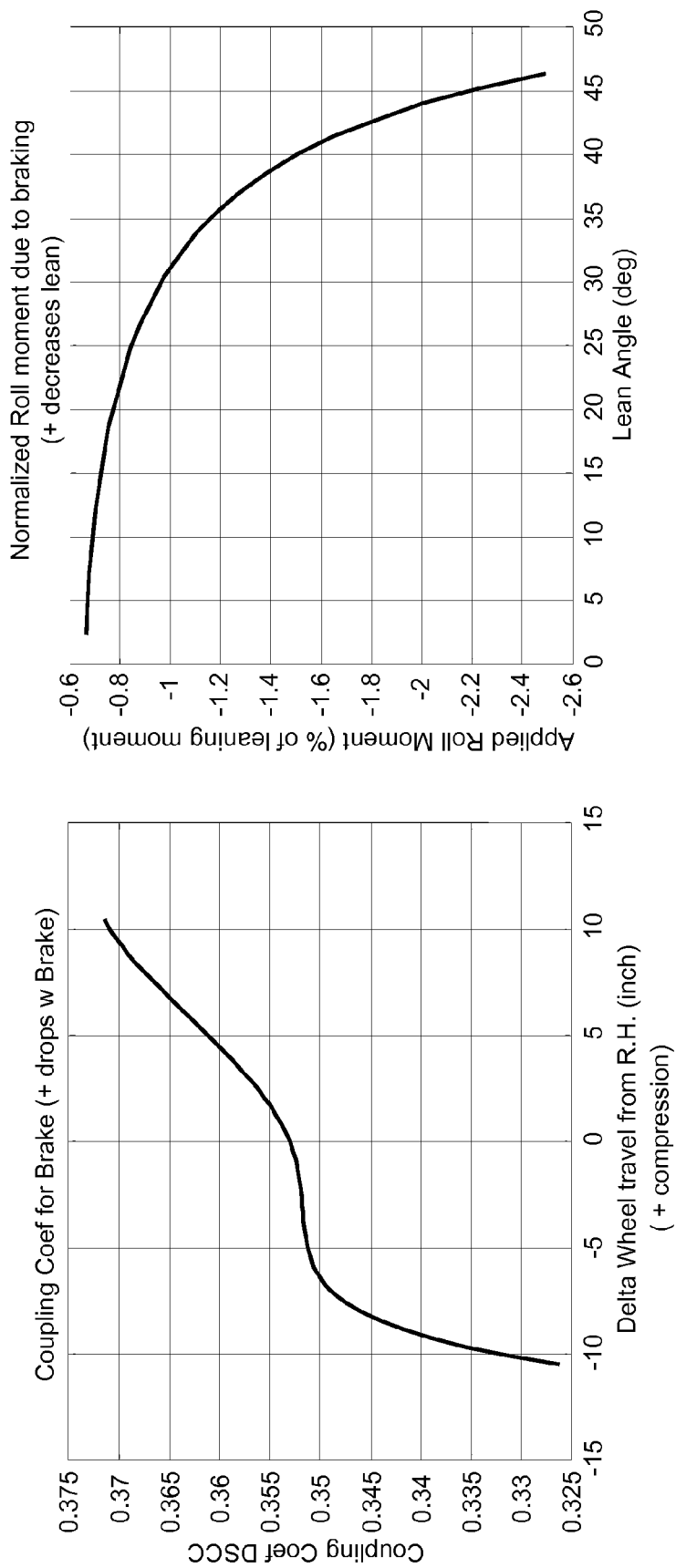

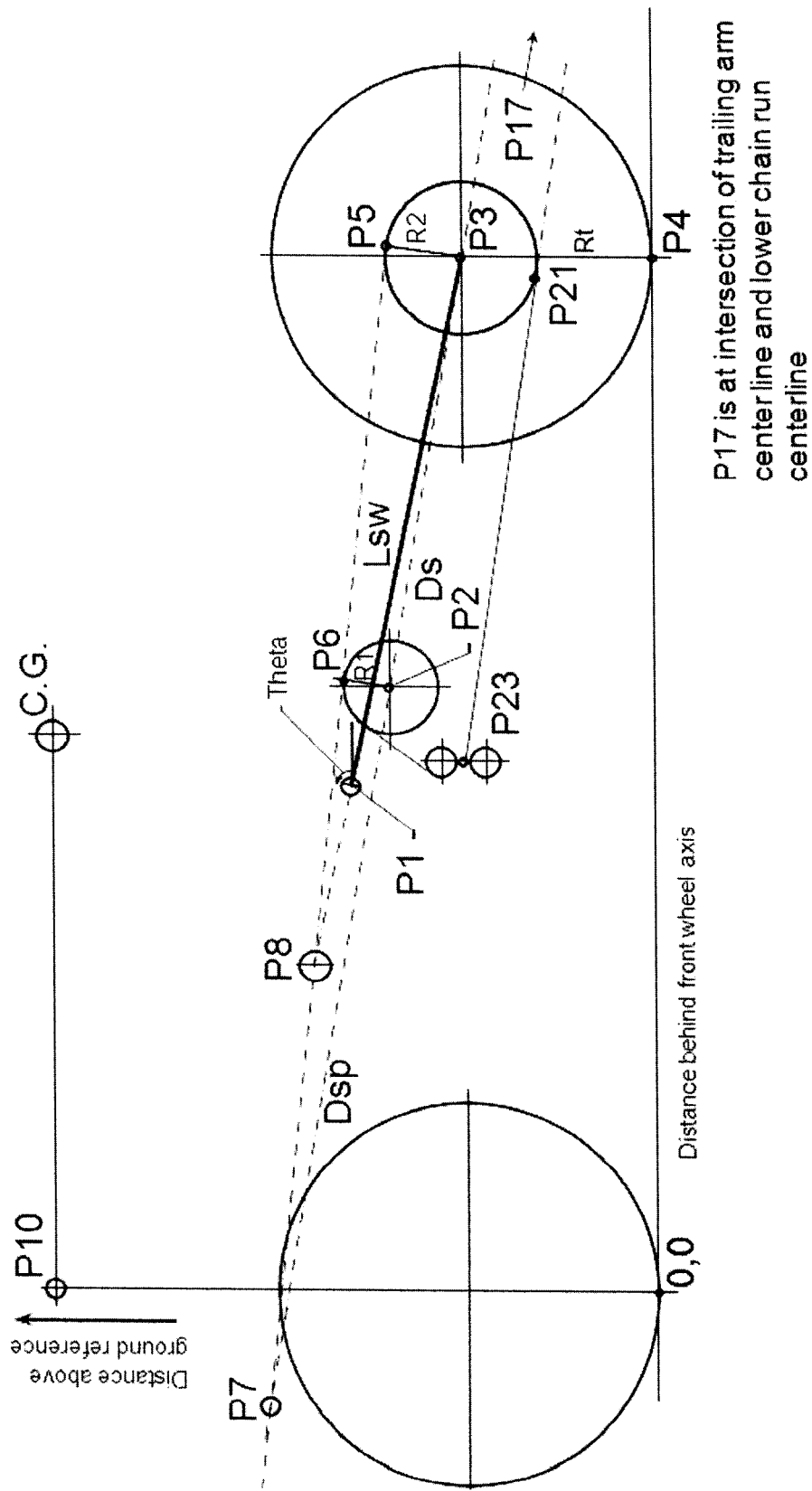

GEOMETRY FOR IMPROVED DRIVELINE-SUSPENSION COUPLING OF NARROW LEANING COMMUTER VEHICLES

CROSS-REFERENCE TO RELATED APPLICATIONS

This application claims the benefit of the filing of U.S. Provisional Patent Application Ser. No. 61/828,084 filed on May 28, 2013, and the entire disclosure thereof is incorporated herein by reference.

SEQUENCE LISTING OR PROGRAM

There are six MATLAB® computer program script files supplied in Appendices A through E, sequentially listed in one text file, attached to this specification and incorporated herein by reference.

BACKGROUND OF THE INVENTION

1. Field of the Invention

The present invention relates generally to a driveline and suspension system for a vehicle and, more particularly, relates to driveline-suspension coupling in a narrow multi-track leaning vehicle with three or more wheels and with at least two driving wheels.

2. Description of the Prior Art

Any discussion of the prior art throughout this disclosure should not be considered as an admission that such prior art is widely known or forms part of general knowledge in the field.

Need for a Narrow Vehicle

There is a perceived need to provide narrow vehicles, such as shown in FIG. 1, to travel in crowded environments, for example in or around cities for commuting on congested streets and expressways where traffic. Such a vehicle would be able to thread through informal gaps in traffic, split lanes when legal, and may be legal for use in high-occupancy vehicle commuting lanes. In addition to being able to thread through congested traffic, a narrow vehicle would be easier to park and store compared to a typical automobile. Special narrow-width commuter vehicle lanes which could be one-half lane width (or less) could be used to improve traffic flow within the same roadway width; a four lane expressway could be turned into an eight lane expressway by just adding additional lane lines. Narrowness also improves vehicle fuel efficiency because the vehicle frontal area would be approximately one-half that of a typical automobile. The vehicle will be lighter and require less material to build. This light weight also leads to improved fuel efficiency and improved performance.

Roll Instability Problems with Narrow Vehicles

This narrowness creates a problem with vehicle roll instability. The National Highway Traffic Safety Administration (NHTSA) uses the Static Stability Factor (SSF=Tk/(2*Hcg)), which is equal to the vehicle track width (Tk) divided by two times the vehicle Center of Gravity Height (Hcg), as a measure of vehicle roll stability. A vehicle with a lower SSF has a higher chance of rolling over. A typical automobile has a SSF between 1.3 to 1.5, while a typical SUV or pick-up truck has an SSF between 1.0 and about 1.3. A narrow vehicle may have a SSF as low as 0.20. This low level of roll stability limits the narrow vehicle to very mild maneuvers and low levels of lateral acceleration to prevent the vehicle from falling over. For reference, a motorcycle has an SSF of zero; and typical running mammals are below 0.2, which implies that these animals use some sort of active control of foot location, and are essentially "leaning vehicles."

Ballast as a Solution

One solution to the problem of roll instability of narrow vehicles is to ballast the vehicle to reduce the center of gravity height (such as seen in U.S. Pat. No. 6,328,121). For any significant improvement in roll stability for a narrow width vehicle, large ballast weights would be required. Large, heavy ballast would negate many of the advantages of a narrow vehicle.

Vehicle Leaning as a Solution

Another solution is to cause the vehicle to lean into a corner, similarly to a motorcycle or running mammal. With enough leaning or tilting, the moment applied about the center of gravity (CG) by the lateral tire forces acting at ground level are reduced by the moment applied by the vertical tire forces holding the vehicle up, relative to the CG offset created by leaning the vehicle. For these moments to balance, such as on a motorcycle with narrow tires, the tangent of the lean angle from vertical (phi) is approximately equal to the Lateral Acceleration (L.A.≈tangent {Phi}). (Angle phi is in relation to true vertical.) These values are only approximately equal due to the tire width effecting the lateral location of the tire contact point due to lean; for an idealized motorcycle with zero width tires, the tangent of the lean angle from vertical is equal to the lateral acceleration for steady state cornering.

Leaning Vehicle Control Methods

There are two basic ways to control the lean of a narrow vehicle: free leaning and controlled leaning. In a free leaning narrow vehicle, the vehicle is designed to have a suspension roll stiffness which can be either close to zero (resulting in a "free leaning mode"), or stiff (resulting in a "locked roll mode"). For high speed or high lateral acceleration operation, the free leaning mode is selected, and the narrow vehicle acts like a standard motorcycle or single track vehicle. This is similar to a motorcyclist riding with his feet on the footrests. For slow speed, low lateral acceleration operation, the locked roll mode is selected, and the narrow vehicle acts as a standard multi-track vehicle with the suspension maintaining the vehicle upright. This is similar to a motorcyclist riding or stopping with his feet touching the ground.

As with a motorcycle, in the free leaning mode the operator must steer the vehicle for balance by controlling the tire contact patch location relative to the vehicle CG, thereby to apply roll moments from gravity acting on the vehicle CG. This switching between roll modes can be accomplished either by the operator alone, or with an automatic control system which determines, based on an algorithm, when to switch between the two roll stiffness modes. There may also be a hybrid system combining operator and automatic control. In a controlled leaning vehicle (e.g., as seen in U.S. Pat. Nos. 5,765,846 and 4,423,795), some form of automatic control and actuator system are used to control the suspension to lean the vehicle into a turn, or to use steering torques to control tire contact patch location, or a combination of the techniques.

A New Vehicle Type, Such as a Narrow Leaning Vehicle, Must have Better Stability and Dynamics than the Current Fleet For a new type of narrow, multi-track vehicle to be viable, it must have at least the same and preferably better stability and dynamics than vehicles it would be supplementing or replacing in the current fleet. A "free leaning" narrow vehicle would be considered to be supplementing the motorcycle fleet because it would have similar dynamics to motorcycles. A "controlled leaning" narrow vehicle would be considered to be supplementing the automobile fleet, because the controlled leaning system would give the vehicle automobile-like dynamics not requiring "counter steer" by the driver. The new type vehicle must not have any "bad habits" or other instabilities as compared to the fleet it would be joining.

Required Lean Angles

For a narrow vehicle to perform adequately while sharing roadways with motorcycles, automobiles and heavier vehicles, relatively large lean angles equal or greater than 30° are required (Tan(30°)≈0.6 g lateral acceleration). To allow for 1 g lateral acceleration, a lean angle of approximately 45° is required. This amount of lean or tilt requires suspension wheel travels (up-and-down in the vehicle coordinate frame) on the order of the vehicle track width. For example, a vehicle with a 20-inch track width would require each wheel to have greater than ±10 inches of wheel travel from nominal ride height, assuming vertical suspension travel in the vehicle coordinate frame. It is difficult to achieve such a large amount of wheel travel, relative to track width, with conventional automotive suspension types on a driven axle (such as Short-Long-Arm (SLA), McPherson Strut, or Swing Axle suspensions) due mainly to the limits of drive shaft joint angularity on driven axles. Some prior art narrow leaning vehicles with multi-track driven wheels have used some form of trailing arm suspension, which can be more readily designed with the required amount of wheel travel for a given track width.

Known Narrow Leaning Vehicles with Trailing Arm Suspensions

Prior art narrow leaning vehicles with driven multi-track axles generally use chain or belt drive systems due to the large wheel travel required for adequate lean angles. To eliminate chain path variations as the driven wheel moves over the range of suspension travel, the driving pinion typically is located coaxially with the trailing arm pivot, such as the configuration shown in U.S. Pat. No. 4,003,443 to Boughers, a drawing figure from which is depicted in FIG. 2A herein. Some form of "static" chain path length adjustment is required in such configurations to adjust for wear and manufacturing tolerances. Other prior art leaning vehicles use a shaft drive to transmit the power to the trailing arm suspended wheels, in a similar fashion to shaft drive motorcycles; a shaft drive universal, or constant velocity, joint coaxially ordinarily is located to the trailing arm pivot axis.

Driveline-Suspension Coupling

Trailing arm suspensions exhibit a phenomenon called "driveline-suspension coupling" (DSC), in which longitudinal (i.e. front-to-back-to-front) driveline forces couple into vertical suspension forces and motions between the vehicle's sprung mass and unsprung mass. For a vehicle with rear drive, the DSC is termed "anti-squat" when it tends to extend the suspension during forward vehicle acceleration. While this is an inherent phenomenon in trailing arm suspensions, other types of suspension systems, such as short-long arm (sometimes also referred as double A-arm), semi-trailing arm, swing axle, McPherson or Chapman strut and multi-link independent suspension can be designed to have anti-squat behavior. "Driveline" refers generally to the powertrain assembly which finally delivers rotary power to the driven wheel(s) of a vehicle, including by example a looped chain or belt with operably connected driving and driven sprockets/pinions, also including a driveshaft and associated universal joints and links.

For a Multi-Track Leaning Vehicle DSC Creates Undesirable Roll Dynamics

This coupling between drive forces and suspension forces creates a roll stability problem in narrow multi-track leaning vehicles. For typical known geometries, such as shown in FIG. 2B-I, a large roll moment is created by the DSC which causes the vehicle to increase the lean of the vehicle as the drive forces are increased. In typical operation, this problem is expressed when the vehicle is exiting a turn and accelerating. As illustrated by FIG. 2B-I, the respective lifting forces LF, LF' (acting on lines through the respective tire contact patch centroids, TrCpt and TrCpt') are unequal during acceleration due to the anti-squat. Under this condition, the application of drive force causes the vehicle to lean into the turn even more, exactly the opposite of the operator's desires. This problem also creates an unstable and dangerous operating condition, since the drive forces increase vehicle speed while also tightening the turning radius, which requires increasing levels of tire traction. This is the first problem with known multi-track leaning vehicle driveline suspension geometries: unstable vehicle behavior during acceleration. Reference is made to FIG. 2B-II herein, showing a typical motorcycle during a turn. If it is assumed that the tires have zero width, then the lifting force LF created by driveline-suspension coupling lifts the motorcycle in the vehicle vertical plane only, and does not impart a deleterious roll moment. If tire width is considered, the tire contact patch centroid and the contact force shift to the left for a left turn, as indicated by the dotted line in FIG. 2B-II. This shifted force provides a slight restoring moment to the motorcycle, straightening it up as it is accelerated out of a turn.

Undesirable Roll Dynamics Only Affect Narrow Multi Track Vehicles

Narrow multi-track vehicles exhibit the foregoing undesirable roll dynamics which can cause vehicle instabilities and increased difficulty of operator control during combined operation of turning and longitudinal acceleration. Neither motorcycles (single track vehicles), nor automobiles (multi-track vehicles with small lean angles) exhibit these undesirable behaviors. For motorcycles, the tire forces acting in the vertical vehicle plane are reasonably aligned with the vehicle's center of gravity, and cannot produce a large roll moment acting on the vehicle. Although automobiles have a large track width between the right and left tires, the small lean angles and small suspension wheel travels associated with typical maneuvers do not provide very large differences between the respective anti-squat vertical lifting forces of the right and left suspensions. The roll moments created by these differences are small when compared to the roll moment created by the lateral acceleration during cornering and the roll stiffness provided by the suspension system. Thus, significant roll instability due to driveline-suspension coupling is unique to narrow multi-track vehicles, especially to such vehicles with free leaning control.

Suspension Coupling During Acceleration

Attention is now invited to FIG. 3, which presents four curves plotting applied roll moment (lb-ft) as a function of lean angle (degrees). The curves of the figure were plotted using the MATLAB program with empirical input. The curve A shows the magnitude of this destabilizing roll moment for a nominal narrow leaning vehicle with typical motorcycle chain-driven, rear trailing arm, geometry. It is assumed in FIG. 3 that both driven wheels have the same chain (or drive belt) tension and approximate driving force. (This equality could be realized with the use of a differential incorporated into the intermediate shaft, supplying power to both driver pinions of the final flexible loop drives to each of the driven wheels (see, e.g., U.S. Pat. No. 4,003,443). Some known narrow leaning vehicles have reduced the destabilizing drive-induced roll moment by increasing the trailing arm length, or by locating the driving pinion coaxially with the trailing arm pivot, or in some cases using driving pinion diameters equal to the driven pinion diameters (see, e.g., European Patent Publication EP1702773A2, website www.naro.co.uk, and U.S. Pat. No. 5,611,555, www.moebius.es/ccalleja/). FIG. 3 illustrates at curve B typical magnitudes of the unstable roll moment for a nominal narrow leaning vehicle incorporating such known drive geometries. Although such modifications reduce the destabilizing leaning moment, compared to that of the typical motorcycle drive geometry, the destabilizing roll moment is still relatively large. Increasing trailing arm length reduces the roll instability, but practical considerations impose a limit on the length of the trailing arm. This is the second problem with prior art narrow leaning vehicles: long trailing arms are difficult to contain within the vehicle envelope. In FIG. 3, curve C represents the roll moment during acceleration for an apparatus having an improved geometry according to the present disclosure, plotted with empirical data from a tested prototype, optimized for minimum roll moment. The geometry provides the least amount of roll disturbance from the driveline, which is stabilizing for lean angles below 40°. For larger lean angles, the roll moment is very slightly unstablizing (positive). Curve D of FIG. 3 depicts the roll moment during acceleration for a vehicle with the improved geometry, optimized for a minimum stabilizing geometry. This geometry always provides for a stabilizing geometry over the complete range of lean angles, although a slightly more stabilizing roll moment occurs over mid-range lean angles as compared to curve C.

To provide a better understanding of the magnitude of these DSCC-induced roll moments, FIG. 4A presents the roll moment of the nominal narrow leaning vehicle as a function of vehicle lean angle (Roll Moment=Vehicle Weight*Center of Gravity Height*Sine {Lean Angle}), assuming zero width tire contacts. FIG. 4B presents the data from FIG. 3, but normalized by the roll moment (due to vehicle lean) from FIG. 4A. (The Normalized Roll Moment due to forward thrust equals roll moment due to forward thrust divided by roll moment due to lean, all at a given lean angle). As combined reference to these graphs shows, the roll moments created from suspension coupling of drive force into suspension lift, can have a significant and unstable effect upon the turning dynamics of a narrow leaning commuter vehicle.

Suspension Coupling During Braking

In addition to the driving force creating an unstable vehicle condition, braking forces similarly can also create undesirable dynamic behavior. With the service brakes mounted onto the vehicle's trailing arm, which is typical for many motorcycles, a braking force (and resulting braking moment) acting on the trailing arm couple into the vertical suspension forces. The resulting applied roll moment, for a vehicle known in the art, is shown as curve A in FIG. 5A. In typical operation in which a rider is braking during turn initiation or during turning, this coupling between brake force and suspension forces tends to rotate the vehicle back toward true vertical, against the rider's desire to lean into the turn. Although this effect of this braking driveline-suspension coupling is not as potentially dangerous as the driving force coupling problem, the vehicle is more difficult to control than a typical motorcycle. This dynamic affect of a floating brake geometry, for a known vehicle, with the brake stay parallel to and of about equal length of the trailing arm, is indicated as curve B in FIG. 5A.

Curve C of FIG. 5A presents the roll moment during braking for a tested prototype apparatus according to this disclosure, with the improved geometry optimized for minimum roll moment over the range of suspension travel/lean angles. The innovative geometry provides the least amount of roll disturbance attributable to braking. For larger lean angles, the roll moment is very slightly "pro-lean in." In the figure, curve D presents the roll moment during braking which had a lower roll moment due to braking in the mid-range of lean angles, but is more "pro-lean in" at the high lean angles. Compared to vehicles known in the art, either of these innovative geometries has negligible brake/roll coupling.

Reference is made to FIG. 5B, presenting enlarged detail of curves C and D from FIG. 5A, while FIGS. 5C and 5D present the normalized roll moment due to braking. This geometry improves the vehicle dynamics only slightly as compared to the typical geometry. This is the third problem with known narrow leaning vehicles: undesirably poor vehicle roll dynamics during braking. A fourth problem with known narrow leaning vehicles is that there is necessarily reduced vehicle performance, because power and braking performance are deliberately reduced in an effort to ameliorate vehicle stability and/or handling problems. A fifth problem with known narrow leaning vehicles is the increased vehicle operator training and/or skill levels required for operation, due to poor vehicle dynamic behavior and handling qualities.

Suspension Coupling During Engine Braking

Engine braking (as distinguished from service braking) in narrow leaning vehicles creates similar issues of coupling longitudinal forces into vertical suspension forces to create similar roll stability problems. This effect will be of comparatively smaller magnitude than for either engine drive or service braking, because engine braking torques are typically of smaller magnitude than engine drive or service braking torques.

The Dynamics of Trailing Arm Suspension

Confusion appears in the prior art about the dynamics of trailing arm suspensions. Trailing arm suspensions have been used in multi-track vehicles as well as in single track vehicles. An excellent reference for multi-track vehicle suspensions is Milliken, although little is discussed therein concerning "pure trailing arm" suspensions. Milliken, W. F., et al., "Race Car Vehicle Dynamics," SAE International, Warrendale, Pa., 1995. (ISBN 1-56091). This may be because modern multi-track vehicles do not, in general, use this type of suspension. Milliken notes that the pure trailing arm suspension type has structural and weight problems. (The wheel essentially is cantilevered from the trailing arm pivot, and the trailing arm therefore must be strong in bending in all directions.) The pure trailing arm also has performance issues (no camber gain of the wheel, no toe change and the roll center is on the ground). The Milliken authors review only a basic trailing arm type, with the wheel brake fixed to the trailing arm and the wheel driven by a half-shaft, parallel to the trailing arm pivot axis, from a sprung mass-mounted differential. The variations of trailing arm suspensions, such as floating brakes, shaft, or chain drive are not discussed. Nor are the effects of large vehicle roll angles. This may be expected, as most multi-track vehicles generally limit roll angles to less than ±10°.

In contrast to most multi-track vehicles, modern single track vehicles (motorcycles) universally use trailing arm suspensions on the rear, although it typically is called a "swing arm" suspension. This is unsurprising, as the problems associated with employing trailing arm suspensions in multi-track vehicles become advantages in single track vehicles (where to cantilever the suspension from the center of the vehicle and to have no camber gain, no toe change, and a roll center located on the ground are desirable). Because the trailing arm suspension is the dominate rear suspension type for single-track vehicles, considerable effort has been spent on developing it and its variations for motorcycles as well as bicycles. There are three basic known variations, which will be called: simple trailing arm (similar to Milliken "pure trailing arm"), trailing arm with torque link, and arbitrary trailing arm with torque link. To reduce the confusion on trailing arm suspension dynamics, and to place the present invention in context with these dynamics, a brief review will be presented.

Load Transfer Due to Acceleration

When a ground vehicle is accelerated, the tires produce forces acting on the ground to accelerate the vehicle. Because the vehicle's center of gravity is above the ground, the tire forces create a moment which pitches or rolls the vehicle forward (or backward), and which changes the vertical load on the tires. This change in load is called load transfer. If the vehicle has suspension, this load transfer creates suspension motions: forward acceleration generates front lift and rear squat, while deceleration creates front dive and rear rise. In addition to acceleration creating these load transfers, aerodynamic forces and slopes will also produce load transfer, but this will not be discussed further. The vehicle parameters which affect longitudinal load transfer are the vehicle wheelbase, center of gravity height, mass, and the actual acceleration. The longitudinal position of the mass does not affect the load transfer, but does affect the actual loads on the tires. If a vehicle can accelerate sufficiently quickly, the load transfer can reduce the respective tire load to zero lifting the tire off the ground (a "wheelie" or a "stoppie"), creating a pitch instability.

Thus, as a vehicle accelerates forward or decelerates (during braking), a load transfer occurs between the front and rear of the vehicle, attributable in part to the above-ground height of the vehicle's center of gravity, which creates a moment during the longitudinal acceleration. The load transfer ordinarily compresses and extends the suspension. With suspension coupling, as provided by a driveline suspension coupling coefficient, some of this load transfer is reacted by the suspension linkages. In the case of a motorcycle or a suspension according to the present disclosure, this linkage reaction is through the trailing arm suspension and drive element (i.e., chain or shaft drive) and in the case of braking, though a brake torque link or the like. In the case of 0% anti-squat, the linkages provide no reaction to the acceleration moment (due to the center of gravity above the ground). In the case of 100% anti-squat, the linkage provides sufficient reaction to counterbalance exactly the load transfer due to the acceleration moment. With more than 100% anti-squat, the rear of the vehicle actually will lift up during acceleration, rather than squatting (a somewhat unnerving behavior of some shaft-drive motorcycles). The force split between the linkages and the springs does not change the load transfer on the tires which is only a function of the acceleration and the height of the center of gravity.

The load transfer during acceleration has important effects on vehicle behavior. The load transfer from the suspension springs reacts to motion of the sprung mass, so when a vehicle is accelerated, the following effects occur: 1) the tires push forward the bottom of the sprung mass; 2) the sprung mass rotates; 3) such rotation compresses/extends the suspension springs (and tires also); and 4) the springs push on the tires more or less. As a result, the load transfer due to acceleration is applied to the tire ground contact patches. This process takes time and the springs cushion the sprung mass and smooth out the load transfer.

The load transfer from the suspension linkage reacts to the forces applied to the linkage. This creates a direct path from the longitudinal forces provided by the tires into the sprung mass, there is no cushioning or time delay due to motion of the sprung mass. Also, the load transfer through the suspension linkages typically puts more force into the linkages. This can add to the "stiction" (static friction) to the suspension which tends to "lock up" the suspension reducing the suspension suppleness and vehicle ride quality. Motorcycles frequently are provided with roller bearings in the trailing arm pivots, with the result that static friction is less of an issue.

DSC Anti-Squat and Anti-Rise in Rear Suspensions

Anti-squat, as a result of driveline-suspension coupling (DSC), in a rear suspension reduces the motion of the suspension due to load transfer. As mentioned above, trailing arm suspensions naturally exhibit this behavior due to DSC, which is a function of the drivetrain and suspension geometry (kinematics), and not the suspension's force components (suspension kinetics, i.e., springs or dampers). During forward acceleration, due to DSC the suspension linkages (primarily the trailing arm and/or torque link) tend to push the unsprung mass (including e.g., trailing arm and wheel) down toward the ground and to lift the sprung mass (reducing the rear squat due to load transfer). Conversely, during forward deceleration, the suspension linkages tend to lift the unsprung mass and to pull downward the sprung mass (which has a relatively reduced effect because the tire on the driven wheel can be lifted off the ground, thereby reducing tire traction).

Quantifying Anti-Squat and Anti-Rise in Simple Trailing Arm Rear Suspensions

Reference to FIG. 6 conveys understanding of DSC effects during the acceleration of a vehicle having a trailing arm suspension. FIG. 6 illustrates a simple prior art trailing arm rear suspension on a motorcycle 50. The complete system includes a trailing arm 51, a rear wheel 54 (rotatable around wheel axis Wp), a motorcycle sprung mass 63, a front suspension 64 and a front wheel 65. A driving torque DT is applied between the trailing arm 51 and the wheel 54, which torque generates a driving force DF acting at the ground on a tire contact patch (at TrCpt in the figure) pushing the vehicle 50 forward. A reaction torque RT, which is equal and opposite to the DT, is applied to the trailing arm 51 (assuming the trailing arm has no mass or inertia). The RT acts tending to rotate the trailing arm 51 backwards (per direction arrow RT in the figure), lifting the motorcycle's sprung mass 63 via the trailing arm pivot TAp, and extending the suspension. The driving force DF ultimately acts through the trailing arm pivot TAp with both a horizontal force HF and vertical force LF, as seen FIG. 6. These forces are components of a single resultant force R acting along an imaginary line defined between the tire contact patch centroid TrCpt and the trailing arm pivot TAp. This imaginary line is called the "Line of Action," LoA. The lifting force LF acts against the squat (that is, squat due to due to load transfer), and reacts through the TrCpt in a plane perpendicular to the trailing arm pivot axis TAp. This lifting force is analogous to the destabilizing lifting forces shown diagrammatically in FIG. 2B-I. In the case of a braking torque, the forces have negative values (reversed in direction), but have the same geometry. The trailing arm pivot (TAp) is an important point (in the two-dimensional vehicle vertical plane), because the forces acting between the unsprung mass (primarily the trailing arm 51 and wheel 54) and the sprung mass 63, occur at this point. Because of this importance, the trailing arm pivot is given an addition name, the "Actual pivot and Force center" labeled ApFc in the figures.

FIG. 7 is a top sectional view of a prior art shaft drive, simple trailing arm, motorcycle rear suspension (similar to that seen in FIG. 6) cut along a plane defined by the trailing arm pivot TAp and the wheel axis Wp. Rotary power is transmitted via a drive shaft 62. The driving torque DT is created by a driving pinion 57 working against a crown wheel 58. A braking torque can be created by the brake caliper 59 working against the brake disc 60. A torque on the drive shaft 62 or a universal joint 61 is reacted by the trailing arm pivot axis TAp, and does not impart torque to swing the arm 51 about the pivot axis TAp. If provided, a hub motor could provide torque in a similar manner as the shaft drive, producing torque between the trailing arm 51 and the wheel 54.

FIG. 8 provides a side view of the motorcycle 50 of FIG. 6 without the rear wheel 54 and trailing arm 51 shown. Shown in FIG. 8 are two possible pivot locations on the sprung mass, first trailing arm pivot TAp1 and second trailing arm pivot TAp2, with corresponding lines of action, first line of action LoA1 and second line of action LoA2. LoA1 is drawn from the tire contact patch centroid through the location of the center of gravity CG for the vehicle system, while LoA2 is drawn from the centroid of the tire contact patch through the point of intersection of a vertical line through the front axle and the horizontal line at the center of gravity height, Hcg. These lines and pivot locations are impractical, but they illustrate two important special cases.

To simplify the analysis, it is assumed that the CG is located evenly between the two wheels of the motorcycle (e.g., at about one-half the wheelbase length), and that the Hcg is equal to one-half the wheelbase. It also is assumed that the suspension forces act vertically in line with the locations of the respective front and rear wheel axes. (It should be noted that although these assumptions are made, if the front suspension were at the true fork angle, that the rear suspension were not located in line with the rear axle, and the CG was closer to either end, identical results could be determined but the real issues would be obscured by needless detail.) In addition to the above innocuous assumptions, it is assumed that the unsprung masses at each end of the vehicle are mass-less, and that full rear tire driving force DF is used to accelerate the sprung mass only.

For the first case with LoA1 passing through the CG, during acceleration the lifting force LF1 equals the driving force DF1. If the vehicle accelerates at 1 g, then the LF1 equals the total vehicle weight, and the suspension force that was holding up the rear up lifts the sprung mass until the suspension spring (not shown) is unloaded. Not only does the vehicle's rear not "squat," it lifts up significantly and prevents the sprung mass from pitching because the front suspension is not loaded by the acceleration.

Continued reference is made to FIG. 8. For the second case with LoA2 passing through the Hcg above the front axle, the lifting force LF2 equals half the driving force DF2. If the vehicle accelerates at 1 g, then LF2 just counteracts the increase in load transfer due to acceleration. The rear suspension neither lifts nor squats, although the front suspension lifts due to load transfer away from the front. This condition and geometry is considered to be 100% anti-squat. (If the unsprung masses weren't zero, than some of the driving force DF would be required to accelerate the rear unsprung mass and the lifting force LF would be slightly smaller, so the anti-squat would be slightly less than 100%). A third fanciful case may also be considered in which the trailing arm pivot TAp is located on the ground and the LoA also is directed on the ground. Although impractical, the LF would be zero and there would be 0% anti-squat.

FIG. 9 illustratively summarizes the foregoing discussion, and depicts different lines of action (from the rear tire contact patch centroid) for a given percent anti-squat. Case 2 is represented in FIG. 9 by the 100% anti-squat line of action (directed between the tire contact patch and the intersection of the line at center of gravity height Hcg, as also depicted in FIG. 8). (A case number 1 isn't shown in FIG. 9, but would represent 200% anti-squat.) A 50% anti-squat line is halfway (along the vertical line through the front wheel axis) between the 100% and 0% anti-squat lines, with the 0% anti-squat LoA being at ground level. A minus fifty percent (−50%) anti-squat line of action is shown, representing a pro-squat case, in which the lifting force LF is negative and increases the vehicle squat by pulling the rear of the vehicle down during forward acceleration.

The above figures imply that avoiding an excessively high anti-squat DSC effect is fairly difficult with typical shaft drive motorcycle geometries. These high amounts of anti-squat create an undesirable up and down motion of the motorcycle as the throttle is changed. For motorcycles with high power levels, the rear suspension may extend to full droop under acceleration, effectively locking up the rear suspension. The suddenly changing tire loads due to throttle application can also excite tire hopping and chatter, which reduces traction for both longitudinal and lateral directions.

Anti-Squat in Trailing Arm with Torque Link Rear Suspensions

FIG. 10 presents a side view of a prior art (Moto Guzzi® V11 Sport) trailing arm with torque link rear suspension on the motorcycle 70. The system includes a trailing arm 71, a torque link 72, a crown wheel carrier 76, an axle 75 (with axis Wp), a rear wheel 74, a motorcycle sprung mass 83, a front suspension 64 and a front wheel 65. The trailing arm 71 is revolutely mounted to the sprung mass 83 by the trailing arm pivot TAp. The rear wheel axle 75 is fixed to the trailing arm 71 parallel to the trailing arm pivot TAp. The crown wheel carrier 76 is revolutely mounted about the axle 75, and the torque link 72 constrains the rotation of the carrier 76. (The torque link 72 may be either above or below the trailing arm 71.) In this arrangement, the driving torque produced between the crown wheel carrier 76 and the rear wheel 74 cannot be transmitted to the sprung mass 83 by the trailing arm 71, because the trailing arm can only transmit forces along its longitudinal axis. The sprung mass 83, trailing arm 71, crown wheel carrier 76 and torque link 72 thus constitute a planar four-bar linkage system, which linkage defines the motion of the crown wheel carrier 76 as the suspension moves up and down. An imaginary point called a "Virtual pivot and Force center," labeled VpFc, is the instant center of rotational motion of the wheel carrier 76, and is analogous to the ApFc of the simple trailing arm rear suspension system of FIG. 6. The Line of Action LoA for this type of rear suspension is shown in FIG. 10 as defined between the tire contact patch centroid TrCpt and the Virtual pivot and Force center VpFc. With this type of trailing arm rear suspension, there is greater design flexibility than for the simple trailing arm suspension of FIGS. 6 through 8, thereby allowing for a wider range of anti-squat, especially lower amounts of anti-squat.

FIG. 11 provides a top sectional view of a prior art shaft drive, trailing arm with torque link, motorcycle rear suspension, the view cut along a plane defined by the trailing arm pivot TAp and the wheel axis Wp. The driving torque DT is created by a driving pinion 77 working against the crown wheel 78, both of which are enclosed in the crown wheel carrier 76 on the axis 75 of the wheel 74. A braking torque may be created by the brake caliper 79 working against the brake disc 80. The torque on a drive shaft 82 is reacted by the trailing arm pivot axis TAp, and does not impart torque to swing the arm 71 about the pivot axis TAp. This type of rear suspension would require two universal joints 81, as well as a slip joint in the drive shaft (not shown), to provide the required degree of freedom of the crown wheel carrier 76. If provided, a hub motor would provide torque in a similar manner as the shaft drive, producing torque between a hub motor carrier (similar to the crown wheel carrier) and the wheel 74.

Anti-Squat in Arbitrary Trailing Arm with Torque Link Rear Suspensions

FIG. 12 shows a prior art (BMW® Paralever) arbitrary trailing arm with torque link rear suspension on a motorcycle 90. This arbitrary trailing arm system includes of a trailing arm 91, a torque link 92, an arbitrary pivot 93, a crown wheel carrier 96, a wheel axle 95 (about axis Wp), a rear wheel 94, a motorcycle sprung mass 103, a front suspension 64 and a front wheel 65. The trailing arm 91 is revolutely mounted to the sprung mass 103 by the trailing arm pivot TAp1. The arbitrary pivot 93 is fixed to the trailing arm 91 with its axis (TAp2) parallel to the axis of the trailing arm pivot TAp1. The crown wheel carrier 96 is revolutely mounted about the arbitrary pivot 93 axis TAp2, and the torque link 92 constrains the rotation of the carrier 96. The torque link 92 is allowed to rotate about pivot TLp2 connecting the torque link 92 and the crown wheel carrier 96, and about the pivot TLp1 between the torque link 92 and the motorcycle chassis 103. The wheel axle is revolutely mounted on pivot Wp to the crown wheel carrier 96 which is parallel to the arbitrary pivot 93 axis TAp2. In this arrangement, the driving torque produced between the crown wheel carrier 96 and the rear wheel 94 cannot be passed to the sprung mass 103 by the trailing arm 91, which can transmit forces along its longitudinal axis only. The sprung mass 103, trailing arm 91, crown wheel carrier 96 and torque link 92 make up a planar four-bar linkage system which defines the motion of the crown wheel carrier 96 as the suspension moves up and down. A point called a "Virtual pivot and Force center," VpFc, is the instant center of rotation of the axle carrier 96, and is analogous to the ApFc of the simple trailing arm rear suspension of FIG. 6. The line of action for this type of rear suspension is between the tire contact patch centroid TrCpt and the Virtual pivot and Force center, VpFc. As with the trailing arm with torque link rear suspension of FIG. 10, this type of trailing arm suspension has greater design flexibility than the simple trailing arm suspension from FIGS. 6 through 8, allowing for a wider range of anti-squat, especially lower amounts of anti-squat.

FIG. 13 is a top sectional view of a prior art shaft drive arbitrary trailing arm with torque link motorcycle rear suspension (similar to that seen in FIG. 12) cut along imaginary planes defined by the trailing arm pivot TAp1, arbitrary pivot 93 axis TAp2, and the wheel axis Wp. (Typically, these three pivot axes are not disposed in a single imaginary plane.) There is a drive shaft 102 for transmitting rotary power. The driving torque DT is created by a driving pinion 97 working against a crown wheel 98, both of which are enclosed in the crown wheel carrier 96. A braking torque may be created by the brake caliper 99 working against the brake disc 100. The torque on the drive shaft 102 is reacted by the trailing arm pivot axis TAp1, and does not impart torque to the swing arm 91 about the pivot axis TAp1. This type of rear suspension requires two universal joints 101 in the drive shaft 102 to provide the required degree of freedom of the crown wheel carrier 96. If provided, a hub motor would provide torque in a similar manner as the shaft drive, producing torque between a hub motor carrier (similar to the crown wheel carrier) and the wheel 94.

Anti-Squat in Chain Driven Trailing Arm Rear Suspensions

FIGS. 14 and 15 present prior art trailing arm rear suspensions with chain drive on a motorcycle 110, which feature a trailing arm 111, a drive chain 112, with an upper run 112u and a lower run 112l, a wheel axle 115, a rear wheel 114, a driven pinion (or sprocket) 116, a driving pinion 117, a motorcycle sprung mass 123, a front suspension 64 and a front wheel 65. The trailing arm 111 is revolutely mounted to the sprung mass 123 by the trailing arm pivot TAp. The rear wheel axle 115 is fixed to the trailing arm parallel to the trailing arm pivot TAp. The rear wheel 114 is revolutely mounted to the axle 115. The driven pinion 116 is torsionally mounted to the rear wheel 114 either rigidly or through a compliant coupling and is centered about the axle 115 and engages with the chain 112. The chain 112 is also engaged with a driving pinion 117, and through the upper run 112u and the lower run 112l, drives the driven pinion 116. The chain 112, or flexible endless drive, can only transmit power through tension, the upper run 112u drives the vehicle forward. During engine braking, the lower chain run 112l is under tension and slows the vehicle down.

The chain driven trailing arm suspension can be analyzed in much the same way as the trailing arm with torque link, except that the tensioned chain run replaces the torque link and instead of pivots at each end of the torque link, the chain mates with the pinions at tangent points between the chain and pinion. FIG. 14 represents the vehicle accelerating forward with the upper chain run under tension. The Virtual pivot and Force center VpFc of the rear wheel is determined at the point the trailing arm centerline crosses the upper run chain center line. The Line of Action is then drawn between the tire contact patch centroid TrCpt and the Virtual pivot VpFc. The amount of anti-squat can then be determined in the same way as presented in FIG. 9 by calculating the height that the Line of Action crosses the vertical line through the front axle relative to the CG height Hcg.

FIG. 15 represents the vehicle decelerating under engine braking with the lower chain run under tension. The Virtual pivot and Force center VpFc of the rear wheel is determined at the point the trailing arm centerline crosses the lower chain run center line. The Line of Action is then drawn between the tire contact patch centroid TrCpt and the Virtual pivot VpFc. The amount of anti-rise can then be determined in the same way as presented in FIG. 9 by calculating the height that the Line of Action crosses the vertical line through the front axle relative to the CG height Hcg.

FIG. 16 presents a top section view of a prior art chain driven trailing arm motorcycle rear suspension cut along planes defined by the trailing arm pivot TAp, the wheel axis, and the axis of the driving pinion. (Typically, these axes are not coplanar.) The driving torque DT is created by the upper chain run 112u pulling on the driven pinion 116. During engine braking, the lower chain run 112l pulls on the driven pinion 116. For durability reasons, an endless chain 112 with no master link is typically used on street motorcycles or a synchronous toothed belt which requires less maintenance and allows longer life than a chain. It can be seen from FIG. 16, that to replace the chain or belt requires that the trailing arm and associated hardware be removed from the vehicle, increasing the time and labor involved. This is the sixth problem with prior art leaning narrow vehicles—difficult access to vehicle driveline maintenance items such as a final chain drive element. A "chain" drive system in this disclosure refers to a class of endless flexible loop drives that include roller chain, silent chain and belt drives of both the friction variety and toothed (positive drive) variety.

FIG. 17 presents a prior art trailing arm rear suspension with chain drive on a motorcycle with a coaxial driving pinion of equal size to the driven pinion. For this special case of the chain drive trailing arm suspension, the trailing arm and chain runs are always parallel. This implies that the Virtual pivot and Force center is located at infinity. The Line of Action is therefore parallel to the trailing arm, and the anti-squat will vary as the suspension moves. With a horizontal trailing arm, the Line of Action will be along the ground with zero anti-squat. At full droop, the anti-squat will have the largest value while at full bump, the anti-squat may have a negative value resulting in pro-squat geometry.

Although not shown, a trailing arm rear suspension with chain drive on a motorcycle with a coaxial driving pinion of different size than a driven pinion could be easily imagined. For this type of a system the Virtual pivot and Force center would not be located at infinity, but at some finite distance along the trailing center line, which would be same location during acceleration or engine braking. The amount of anti-squat could then be determined based on FIG. 9.

As discussed in the foregoing description of the prior art, having reference to FIG. 2B though FIG. 17, there thus are six main problems with prior art narrow leaning vehicles, which are:
1) Unstable vehicle behavior during acceleration;
2) Difficult to package long trailing arms;
3) Undesirable poor vehicle roll dynamics during braking;
4) Reduced vehicle performance because low power and reduced braking ability are required to not induce vehicle stability or handling problems;
5) Increased vehicle operator training and high skill requirements because of poor vehicle dynamic behavior and handling qualities;
6) Difficult access to vehicle driveline maintenance items such as a final chain drive element.

The disclosures of all the patents cited hereinabove are hereby incorporated herein by reference. What is needed in the art is an improved suspension and driveline configuration which reduces or eliminates these problems.

Narrow leaning multi-track vehicles have suspension and driveline issues which are considerably different than either leaning single track vehicles (motorcycles) or low lean angle multi-track vehicles (automobiles, trucks or similar). In the case of leaning single track vehicles (motorcycles) the drive, brake and coupling forces such as lift or squat act in, or at least very close to, the vehicle vertical plane, and therefore do not provide significant roll moments acting on the vehicle. For low lean angle multi-track vehicles, because of the small lean angles (on the order of approximately 5° to 10°) the roll moments induced by driveline-suspension coupling are small when compared to roll moments due to cornering (and other lateral accelerations) in relation to the roll stiffness of the suspension. It is only in the combination in a "narrow leaning multi-track vehicle" which (a) can experience large lean angles (greater than approximately 15°) and (b) has a separation of the wheels by a track width, that creates the issues and problems with driveline-suspension coupling that create a significant and unstabilizing roll moment acting on the vehicle. Because the issues and problems associated with these significant roll moments only affect narrow leaning, multi-track, vehicles, the solutions to these issues and problems are relevant primarily or only to narrow leaning multi-track vehicles.

Accordingly, several objects and advantage of the presently disclosed method and apparatus are:
1) Elimination of unstable vehicle behavior during acceleration;
2) Improved vehicle roll dynamics during braking;
3) Improved packaging of the suspension with shorter trailing arms;
4) Improved vehicle performance with the use of increased power and braking forces without inducing vehicle stability or handling problems;
5) Reduced vehicle operator training and skill requirements by ensuring excellent vehicle dynamic behavior and handling qualities;
6) Improved access to vehicle driveline maintenance items such as a final chain drive element.

Still further objects and advantages will become apparent from a consideration of the ensuing description and drawings.

SUMMARY OF THE INVENTION

In brief summary given for purposes of cursive description only, the present "Geometry for Improved Driveline-Suspension Coupling of Narrow Leaning Commuter Vehicles" provides an improved driveline and suspension geometry that results in a stable vehicle during acceleration or braking while entering, exiting or during steady state cornering. Apparatuses embodying the improved geometry, and graphical and computational methods for determining such geometry in various embodiments, are disclosed. There thus are disclosed hereby graphical and computational methods for determining improved driveline and suspension geometries for narrow, leaning, multi-track vehicles, as well as apparatuses with geometric configurations improved thereby.

The improved driveline and suspension system hereby disclosed can be based on trailing arms of reasonable length, which can easily be packaged into the overall envelope of a narrow leaning vehicle. The result is a vehicle with excellent dynamics, even with high power and high braking capabilities, which does not require specialized operator training. This improved driveline geometry allows for improved access to maintenance items, simplifying and reducing upkeep costs. These objectives are achieved, in part, by certain embodiments of the presently disclosed apparatuses including a trailing arm type of suspension on a vehicle having two or more driven wheels, that has a geometry providing substantially constant driveline suspension coupling (DSC) over the range of suspension travel.

These objectives are also achieved, in part, by certain embodiments of the present improved driveline-suspension by a method to provide substantially constant suspension lift during acceleration or deceleration by dividing the drive or brake torques equally to each of two or more wheels, and providing a suspension and drive system with geometry that provides substantially constant driveline suspension coupling (DSC) over the range of suspension travel.

These objectives are also achieved, in part, by certain other embodiments of the present improved driveline-suspension comprising a trailing arm type of suspension on a vehicle mounting two or more driven wheels, and that has geometry providing a driveline suspension coupling (DSC) that increases with suspension compression.

These objectives are also achieved, in part, by certain other embodiments of the present driveline-suspension to provide increasing suspension lift as the suspension is compressed during acceleration or deceleration. This may be accomplished, for example, by dividing the drive or brake torques equally to each of two or more wheels, and providing a suspension and drive system with geometry that provides increasing driveline suspension coupling with suspension compression.

BRIEF DESCRIPTION OF THE DRAWINGS

Aspects, features and advantages of the invention are capable of will be apparent and elucidated from the following description of various embodiments of the present invention, reference being made to the accompanying drawings, in which:

FIG. 1 is a front perspective view of a multi-track commuter vehicle with improved driveline-suspension coupling according to the present disclosure;

FIG. 5A is a graph of vehicle applied roll moment, versus vehicle lean angle, due to brake force and suspension force coupling (only curves A and B known from prior art, curves C and D plotted according to the present invention);

FIG. 19A is a rear view of a first embodiment of a narrow leaning commuter vehicle with improved driveline-suspension coupling according to the present invention, with improved vehicle geometry which applies no destabilizing roll moment to the vehicle;

FIG. 40 is a diagrammatic side view of a vehicle with trailing arm and chain drive geometry guided by the driving pinion on the upper chain run and idle rollers on the lower chain run, with points and lengths labeled for MATLAB® optimizing and analysis files.

REFERENCE NUMERALS IN DRAWINGS

Figure 2:
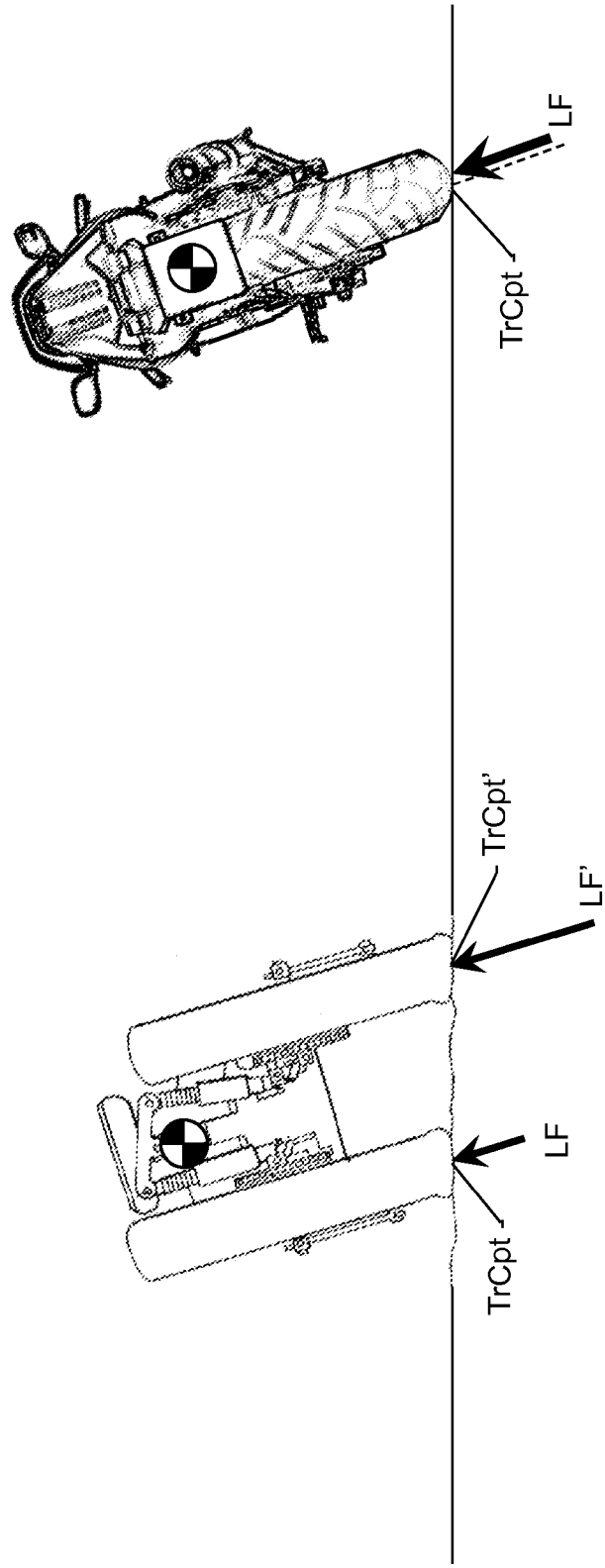
FIG. 2A is a side view of a prior art leaning tricycle.
FIG. 2B is a rear view of two prior art vehicles, in which driveline and suspension force coupling applies a destabilizing roll moment to the multi-track leaning vehicle (at I on the left of the figure) during acceleration, compared to a single track vehicle (at II on the right of the figure)

A master list of the elements relating the descriptive number to the descriptive name is provided at the end of this application for the nominal example vehicle and for the different embodiments presented. A short list of the elements of each embodiment is given in the description section of each embodiment. Similar reference numerals are used to identify similar components throughout the various views. For the sake of clarity, like elements of the nominal example vehicle between embodiments may not be labeled in each and every drawing figure. Like elements are labeled with similar numerals, but with leading series digits corresponding generally to the embodiment number under particular discussion.

Before preferred embodiments of methods and apparatuses are explained in detail, it is to be understood that the invention is not limited in its application to the details of construction and the arrangements of the components set forth in the following description or illustrated in the drawings. The methods and apparatuses according this disclosure are capable being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof, as well as additional items. The use of letters to identify steps of a method or process is simply for identification, and is not meant to indicate that the elements must be arranged, or method steps performed, in a particular order.

In this application, "chain drive" refers to the class of endless loop drive systems which may consist of roller chain, silent chain, synchronous and non synchronous belt drive or any other type drive in this class, also sprockets, pulleys, sheaves or the like will be referred to as pinions.

DETAILED DESCRIPTION OF EXAMPLE EMBODIMENTS

Overview and Description of a Nominal Example Vehicle

Apparatuses and methods are now disclosed in detail with discussions on the structure, functionality, operation and method of the various embodiments. The Geometry for Improved Driveline-Suspension Coupling of Narrow Leaning Commuter Vehicles is a subsystem which functions on a vehicle. The invention thus includes embodiments of a vehicle apparatus, and methods for improving the geometry of the driveline-suspension subsystem of the apparatus. To place the invention in context, an example nominal vehicle is used for illustration purposes. Although this vehicle is used, disclosed methods and systems can work on a wide range of vehicles and drivelines, which vehicles use a trailing arm suspension on driven wheels and require relatively large lean angles (greater than 15°).

Figure 20:
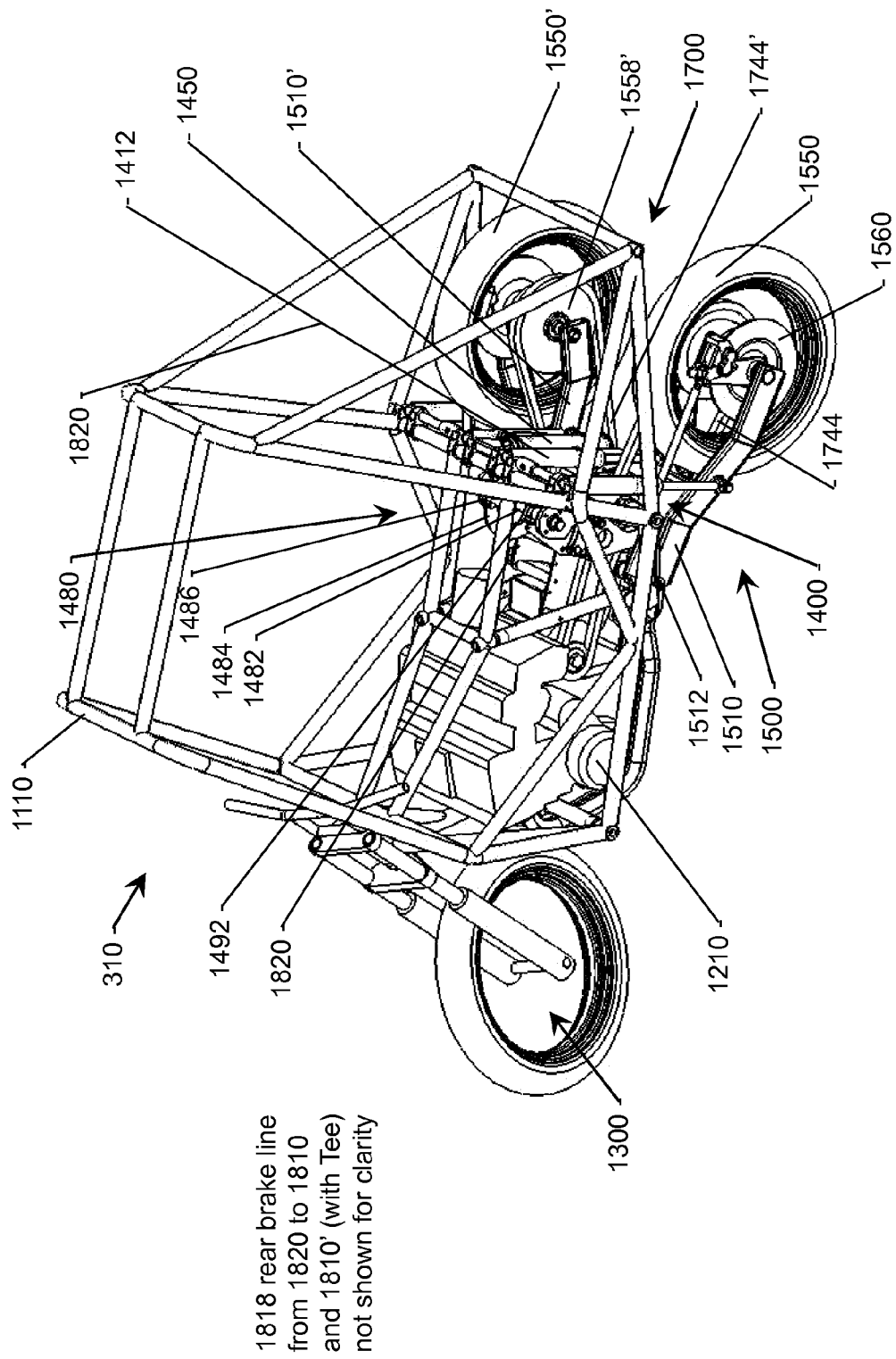
FIG. 20A is an upper rear perspective view of a first embodiment of a narrow leaning commuter vehicle with improved geometry according to the present invention.
FIG. 20B is an enlarged lower rear perspective view of the embodiment of FIG. 20A, showing an engine-transmission-differential assembly in a chassis of the vehicle.
Figure 20:
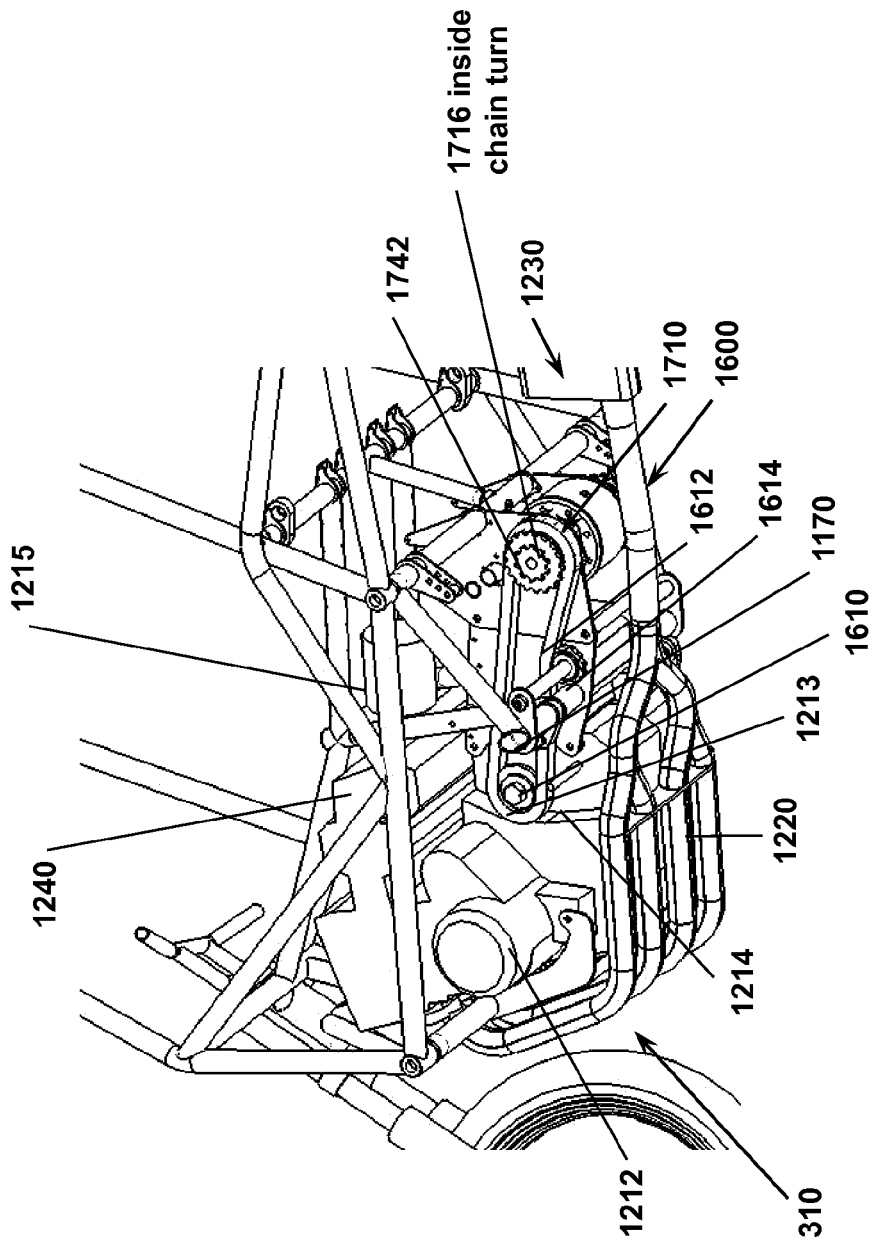

Combined reference is initially is made to FIGS. 18, 19A, 20A, 20B, 21A, 22A and 23A, showing a narrow leaning commuter vehicle 310 having three wheels. This vehicle includes a vehicle chassis structure 1110 (FIG. 20A) with trailing arm mounts 1170 (FIG. 20B), a steerable front wheel assembly 1300 (FIG. 20A), an engine transmission assembly 1210 (FIG. 20A), an intermediate drive assembly 1600 (FIG. 20B), and an independent rear suspension structure assembly 1500 (FIG. 20A) with a compliance assembly 1400 (FIG. 20A) and final drive assembly 1700 (FIG. 20A) for a pair of laterally related rear wheels 1550 and 1550' (FIG. 20A). This arrangement is substantially symmetric about a fore-and-aft vertical plane, with right-hand corresponding parts referred to by primed numerals. Although a motorcycle-type front steerable front wheel assembly 1300 is shown, other types of steerable front wheel assemblies could be used with one or two steerable wheels.

Figure 18:
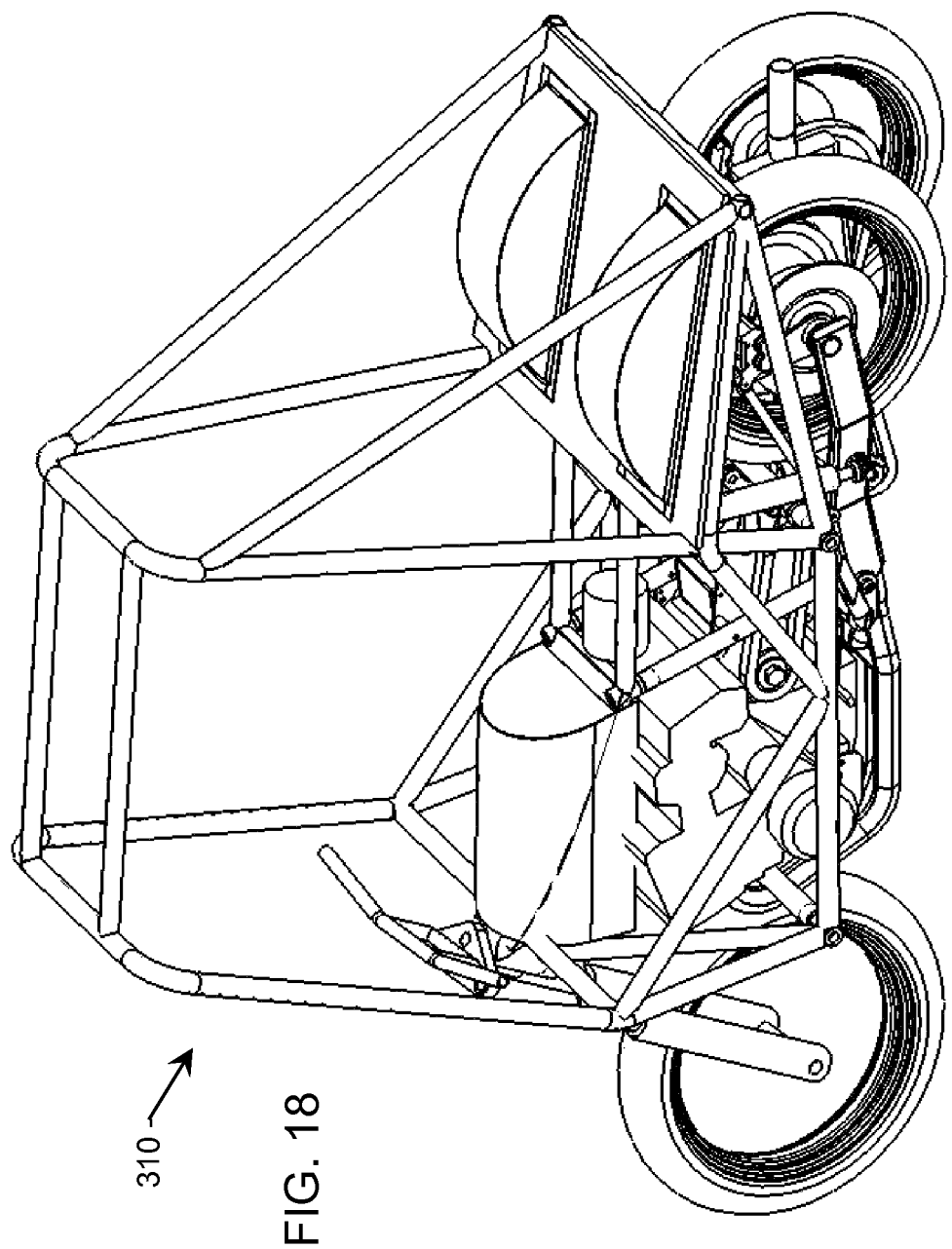
FIG. 18 is a rear perspective view of a first embodiment of a narrow leaning commuter vehicle with improved driveline-suspension coupling according to the present invention.
Figure 19:
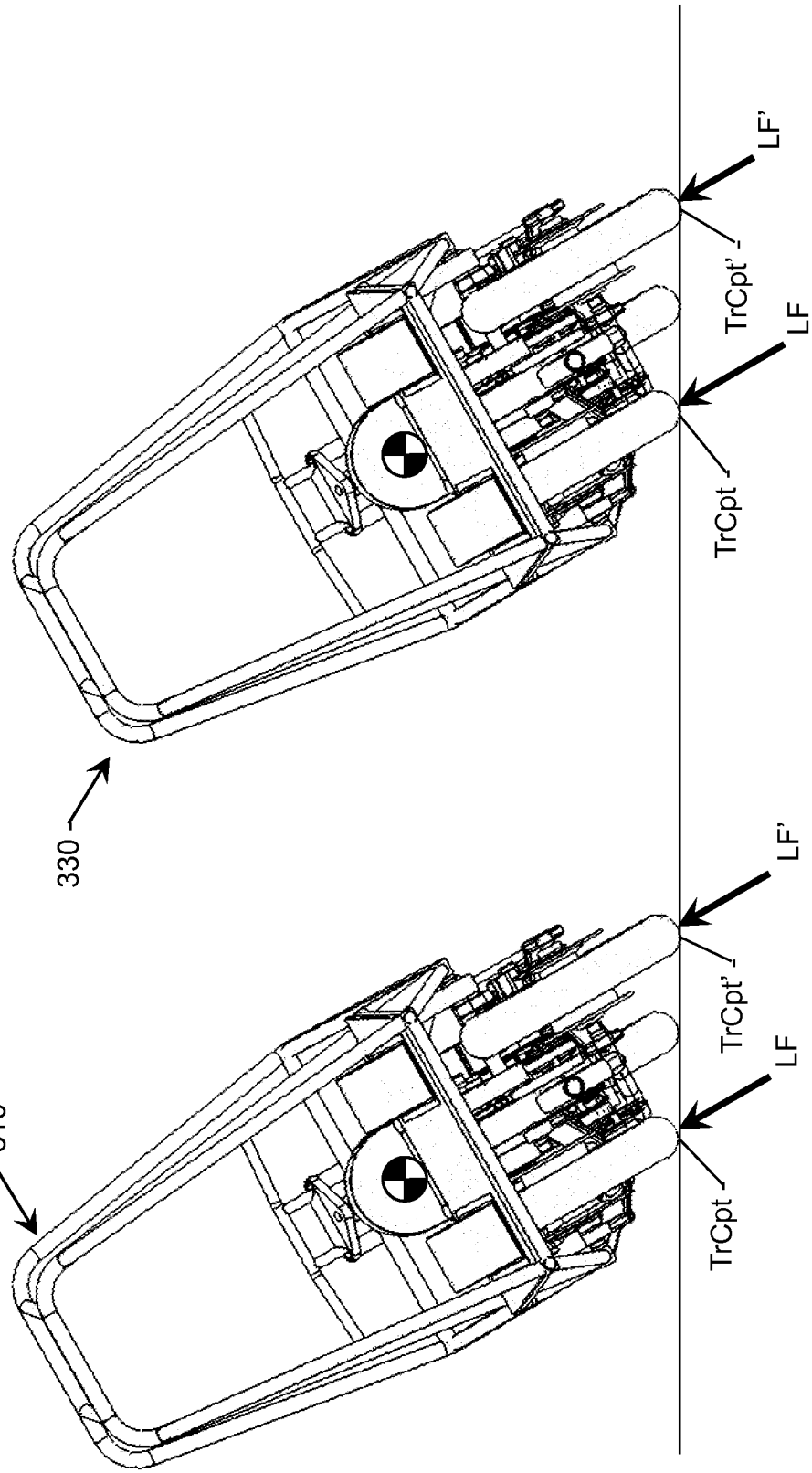
FIG. 19 B is a rear view of a second embodiment of a narrow leaning commuter vehicle with improved driveline-suspension coupling according to the present invention, with improved vehicle geometry which applies a stabilizing roll moment to the vehicle.

The rear wheels 1550 and 1550' can rise and fall separately, independently from one another, as suggested FIGS. 18, 19A and 20B, by means of the following suspension arrangement. Each rear wheel 1550, 1550' is mounted on a respective trailing arm 1510, 1510'. Each trailing arm 1510 has a corresponding trailing arm pivot 1512 (FIG. 20A) at the forward end, supporting the trailing arm to the chassis 1110 with the chassis trailing arm mounts 1170 (FIG. 20B). The rear wheels 1550 are revolutely mounted to the rear of the trailing arms 1510, with the wheel axes being parallel to the pivotal axis of the trailing arm pivots 1512 and perpendicular to the longitudinal vertical plane. This allows the rear wheels 1550 to spin in a vehicle vertical plane, and the wheel end of each trailing arm 1510 also to move (up and down) in a vehicle vertical plane. This vertical plane is referenced to the vehicle and when the vehicle leans, this vertical plane leans with the vehicle (see, e.g., FIGS. 19A-B.). Rear suspension compliance assembly 1400 includes a heave spring assembly and struts, according generally to convention for multi-track vehicles, in the rear suspension to allow the vehicle 310 to roll while providing support in the heave direction. This allows the narrow leaning commuter vehicle 310 to have motorcycle dynamics while moving. As discussed hereinabove, this is a "free leaning" method of vehicle roll control. Although this embodiment of the vehicle 310 uses a free leaning method of roll control, a vehicle employing an "active roll" control could also benefit from the improved driveline suspension geometry according to this disclosure. A generally known lockable ARB (anti roll bar) assembly may be provided so that the rear suspension can become stiff in the roll direction when the vehicle is stopped or moving slowly.

This arrangement requires relatively large suspension wheel travel for the vehicle to obtain a large lean angle. For example if the vehicle 310 leans approximately 45°, then the required up-and-down wheel travel equals or exceeds the vehicle track width. Moreover, and as indicated by FIGS. 19A and 19B, when the vehicle 310 is leaning in a turn, the amount of wheel travel may differ significantly between the inside (left in FIGS. 19A-B) and outside (right in FIGS. 19A-B) rear (driven) wheels. These large wheel travels demand that the rear suspension have excellent dynamic properties over the range of motion of the suspension.

FIG. 20B offers an enlarged view of the vehicle chassis structure 1110, with the engine 1212, transmission 1214, and with the intermediate drive 1600 and a rear differential 1710.

The engine-transmission assembly 1210 shown (FIG. 20A), shares a case making it a single assembly. A separate engine and transmission could also be used. The intermediate drive 1600 couples an intermediate driving pinion 1610 (FIGS. 20B and 21A) to a differential intermediate driven pinion 1716 (FIG. 20B) by an intermediate drive chain 1612 (FIG. 20B), which can be statically adjusted by an intermediate drive adjustable idler 1614 (FIG. 20B). The engine 1212, transmission 1214, intermediate drive 1600 and differential 1710 optionally may all be integrated together in a lighter, stronger, single case. By these components, the engine 1212 can drive through the transmission 1214, the intermediate drive 1600, to the differential 1710. The rear differential 1710 provides equal torques to its two final driving pinions 1742 and 1742' (e.g., FIG. 20B). Providing equal torques, at different output speeds which average to the input differential speed, are common with open type automotive-style differentials, and is a preferred feature of all embodiments of the apparatus.

Description of a First Embodiment

Components of the nominal vehicle and first embodiment appearing in the several views of FIGS. 18-24B are identified with label numerals:
310 chain driven, trailing arm rear suspension, on a narrow leaning commuter vehicle with neutral geometry
1110 chassis structure 1110
1170 trailing arm mounts 1170
1210 engine transmission assembly 1210
1212 engine 1212
1213 transmission output shaft 1213
1214 transmission 1214
1215 air filter 1215
1230 muffler 1230
1240 engine air box and filter assembly 1240
1300 steerable front wheel assembly 1300
1400 rear suspension compliance assembly 1400
1412 struts 1412
1450 heave spring assembly 1450
1480 lockable ARB assembly 1480
1482 ARB 1482
1484 ARB lock disc 1484
1486 ARB lock caliper 1486
1492 ARB fixed arm 1492
1493 ARB floating arm 1493
1494 ARB tie rod 1494
1496 trailing arm ARB tie rod mount 1496
1500 rear suspension structure assembly 1500
1510 trailing arms 1510
1512 trailing arm pivots 1512
1550 rear wheels 1550
1552 wheel 1552
1554 tire 1554
1556 axle assembly 1556
1558 wheel driven pinion 1558
1560 brake disc 1560
1600 intermediate drive 1600
1610 intermediate driving pinion 1610
1612 intermediate drive chain 1612
1614 intermediate drive adjustable idler 1614
1700 final drive assembly 1700
1710 differential 1710
1716 intermediate driven pinion 1716
1742 final driving pinions 1742
1744 final loop drive element 1744
1810 rear brake caliper 1810
1812 rear brake caliper floating mount 1812
1814 rear brake torque link 1814
1816 chassis rear brake stay mount 1816
1818 rear brake lines (and miscellaneous parts) 1818
1820 rear master cylinder 1820
Structure of the First Embodiment:

The basic components of the nominal example vehicle 310 which interact with the Geometry for Improved Driveline-Suspension Coupling of Narrow Leaning Commuter Vehicles are, for driving the vehicle: the differential 1710, then (for the left side of the vehicle) the final driving pinion 1742, the rear wheel driven pinion 1558, the rear wheel 1550, the final loop drive element 1744 (with upper length 1744$u$ and lower length 1744$l$ (FIG. 21A)), a chain idler 1763, and the trailing arm 1510. Mirrored components drive the right side of the vehicle, as the vehicle is substantially symmetrical bilaterally. For braking on the rear left side of the vehicle 310 the components are a chassis rear brake stay mount 1816 (FIG. 24B), rear brake caliper 1810 (FIG. 24B), rear brake caliper floating mount 1812 (FIG. 23B), rear brake torque link 1814 (FIGS. 23B and 24B), rear brake lines (and miscellaneous parts) 1818, and a rear master cylinder 1820 which supplies the same brake pressure to both the left and right rear brake calipers 1810. Mirrored components brake the right side of the vehicle, except for the single shared rear master cylinder. For clarity, the left side of the vehicle 310 will be discussed from which the right side can be inferred.

FIG. 24A is a diagrammatic top section view of the suspension and driveline configuration for a first embodiment of the inventive vehicle according to the present disclosure, cut along imaginary planes defined by the trailing arm pivot tap 1512, the wheel axis Wp, and the axis DgPc of the driving pinion 1742. (Typically, these axes are not truly coplanar, although these axes are all parallel.) Power from the intermediate drive 1600 is transferred to the intermediate driven pinion 1716 (FIG. 20B) of the differential 1710, which divides the torque equally to the two output pinions, left output pinion 1742 and right output 1742'. The final loop drive elements 1744, 1744' transmit power to the corresponding wheel driven pinions 1558, 1558', then to the rear wheels 1552, 1552' and tires 1554, 1554. There may be a known type of cushioning device provided between the wheel driven pinion 1558 and the rear wheel 1552 to attenuate high frequency vibrations, as typically used in on-road motorcycles. Because final loop drive element 1744 is a flexible loop drive, it can transmit power only through tension: the upper length 1744$u$ in tension for vehicle acceleration, and the lower length 1744$l$ for engine braking. The chain idler 1763 is not shown in FIG. 24A. The right side of the bilateral suspension subsystem is a mirror image of the left side, about the vehicle vertical centerline plane, and right side components are designated using primed numerals.

For reasons of improved dynamics, the differential 1710 and final driving pinions 1742 in preferred embodiments are located behind (i.e. toward the rear of vehicle) the trailing arm pivots 1512. Such location of the final driving pinions allows the final loop drive element 1744 to be changed easily without removal of the trailing arms 1510 and rear suspension components mounted to them. This configuration advantageously reduces labor and costs associated with replacing this maintenance item, while allowing an un-split chain or other loop drive final drive element to be used.

FIG. 24B, similar to FIG. 24A, shows diagrammatically a top section view of the suspension and driveline configuration for the inventive vehicle according to the present disclosure, cut along planes defined by the trailing arm pivot TAp (1512), the wheel axis Wp and the axis of the driving pinion DgPc, and showing a rear service brake. Although a section view, the brake caliper 1810, torque link 1814 and chassis rear brake stay mount 1816 are shown in FIG. 24B, but which are above the cutting planes of the sectional view. Braking torque is created by friction between the brake disc 1560 mounted to the rear wheel 1552 and the rear brake caliper 1810 which incorporates brake pads. The rear brake caliper 1810 is rigidly mounted to a rear brake caliper floating mount 1812, which allows the caliper mount assembly to rotate about the rear axle assembly 1556 axis (see also FIGS. 22A and 25B). The rear brake torque link 1814 reacts to the brake moment created by the interaction of the brake disc 1560 and rear brake caliper 1810 to the chassis rear brake stay mount 1816. This brake moment is reacted by the rear brake torque link 1814 as a force couple, with one force of the brake couple reacting through the rear brake torque link 1814 and the second force of the brake couple reacting through the trailing arm 1510. The trailing arm 1510 cannot react the full brake moment, because the rear brake caliper floating mount 1812 cannot transmit a moment into the trailing arm, rather only a force at the pivot on the axle assembly 1556. As discussed previously, this is a multi-link trailing arm with torque link type rear suspension.

Functionality of First Embodiment

FIG. 19A illustrates a preferred functional object of the apparatus and methods of this disclosure, which is to provide the vehicle with neutral driveline-suspension coupling under all operating conditions of the vehicle (such as traveling straight, cornering at constant speed, or either accelerating or decelerating using either engine torque or service brakes). The term "neutral" here means that a roll moment is not applied to the vehicle's sprung mass by driveline-suspension coupling. This is achieved by first providing the same longitudinal force to each wheel (the wheels being mounted on trailing arms sharing a common pivot axis) with the use of an open differential for accelerating or decelerating engine torques, or by providing the same brake actuation pressures to the wheel brakes. Second, each wheel is provided improved suspension and driveline geometry which ensures a substantially constant driveline-suspension coupling (DSC) over the range of suspension travel. When these two conditions are met, the vertical forces created by DSC are equal and balanced, thereby eliminating the roll moment acting on the sprung mass. The discussion below presents geometry and methods for determining geometry which fulfills the second condition.

During Vehicle Acceleration

Figure 21A:
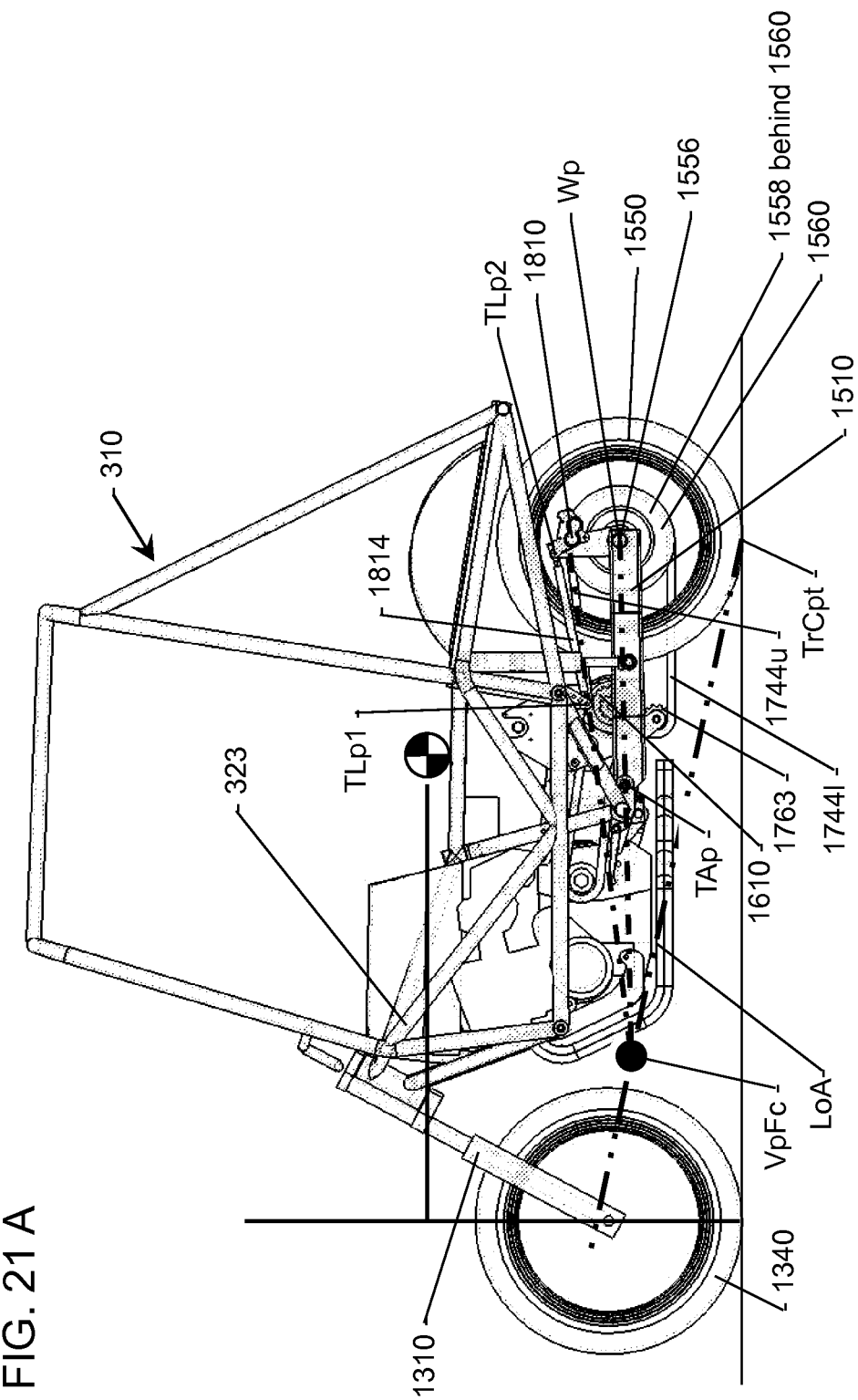
FIG. 21A is a side view of the first embodiment of the narrow leaning commuter vehicle, illustrating diagrammatically the improved rear geometry according to the invention and showing a Line of Action during acceleration.
Figure 21:
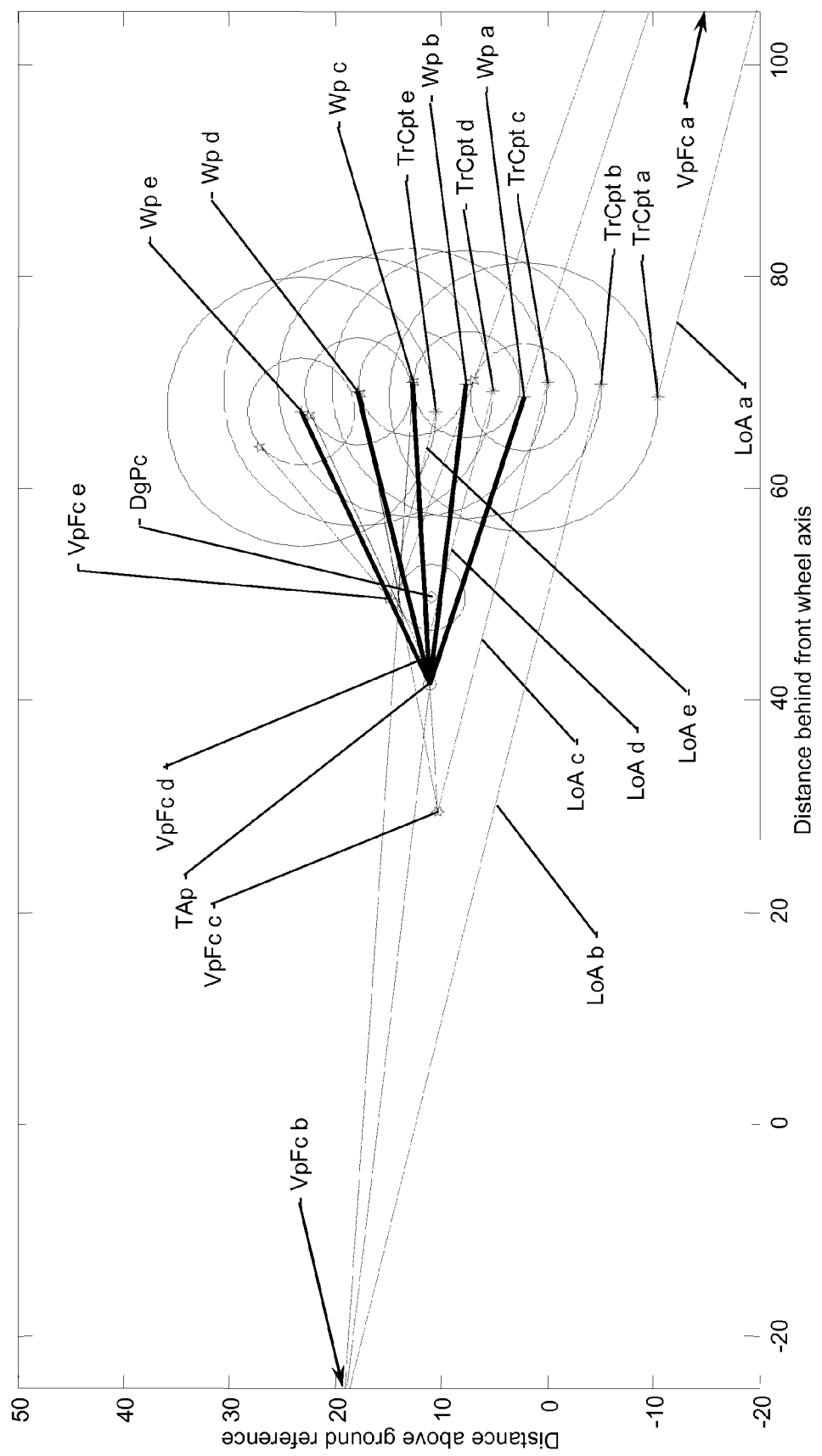
FIG. 21B is a diagrammatic side view of the first embodiment (neutral, non-stabilizing, geometry) driveline and trailing arm geometry (in five alternative positions inside the suspension range of travel) during acceleration, and showing a virtual instant center of the rear wheel due to suspension motion, and lines of action for different suspension displacements (a), (b), (c), (d), and (e)
FIG. 21C is a diagrammatic side view of the first embodiment (neutral geometry) driveline and trailing arm geometry, shown at ride height during acceleration, and also showing various lines of action corresponding to a range of various suspension displacements.
FIG. 21D is a graph of the driveline suspension coupling coefficient (DSCC), versus wheel displacement from ride height, for acceleration of the first embodiment according to the invention and over the range of suspension travel.
FIG. 21E is a graph of the normalized vehicle roll moment, versus vehicle lean angle, due to drive and suspension force coupling in the first embodiment according to the invention and over the range of vehicle lean angles to a side.
Figure 21:
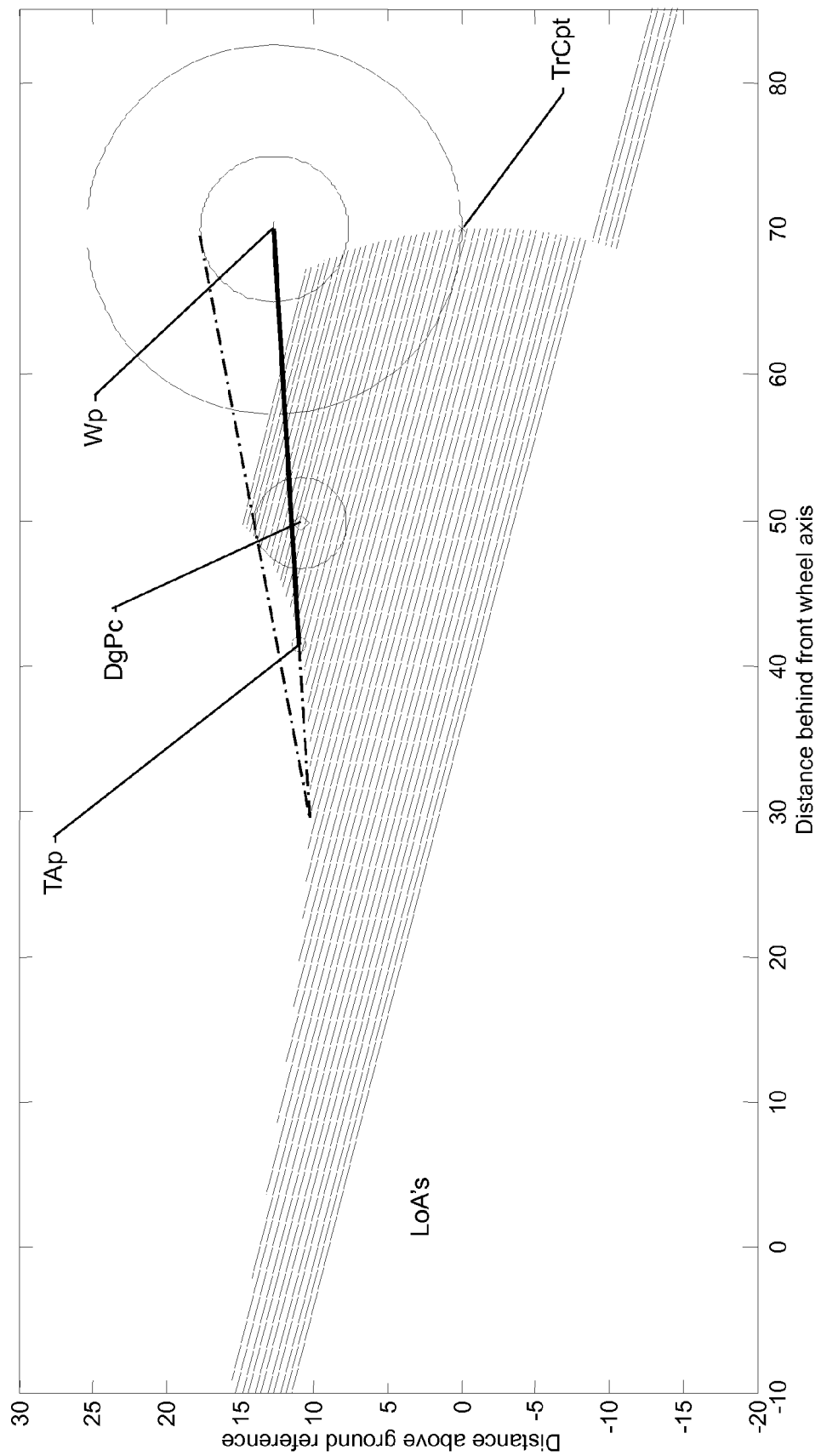
Figure 21:
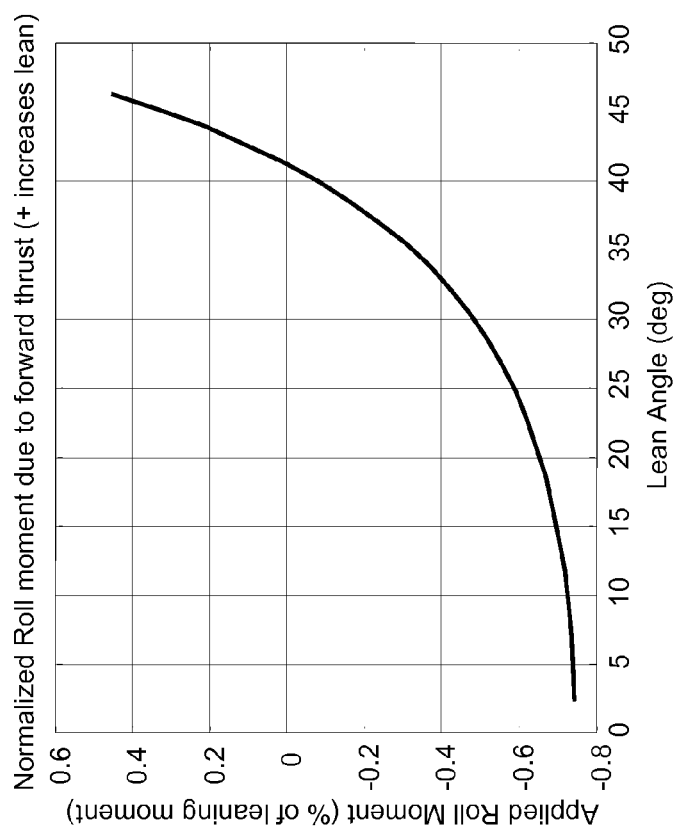
Figure 21:
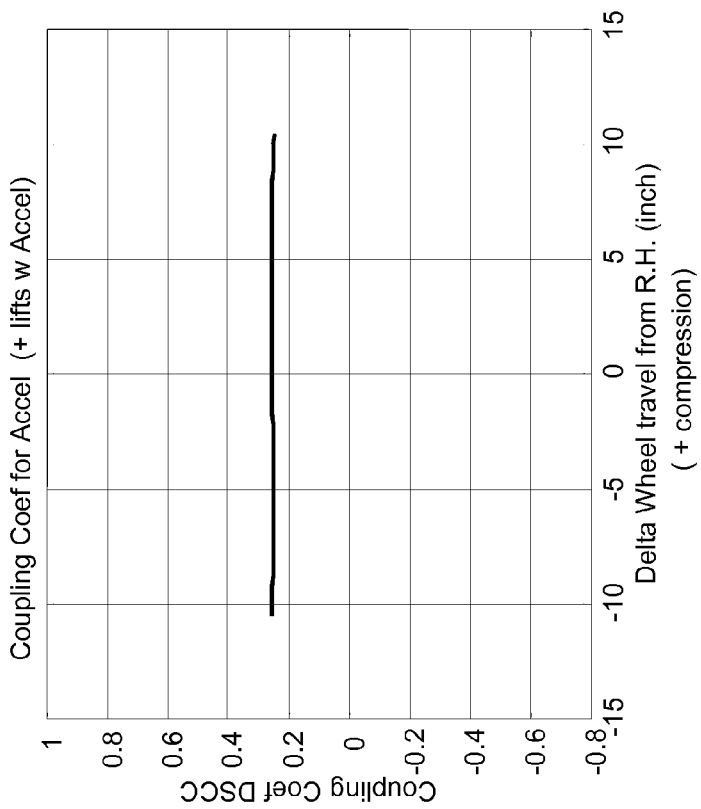
Figure 22:
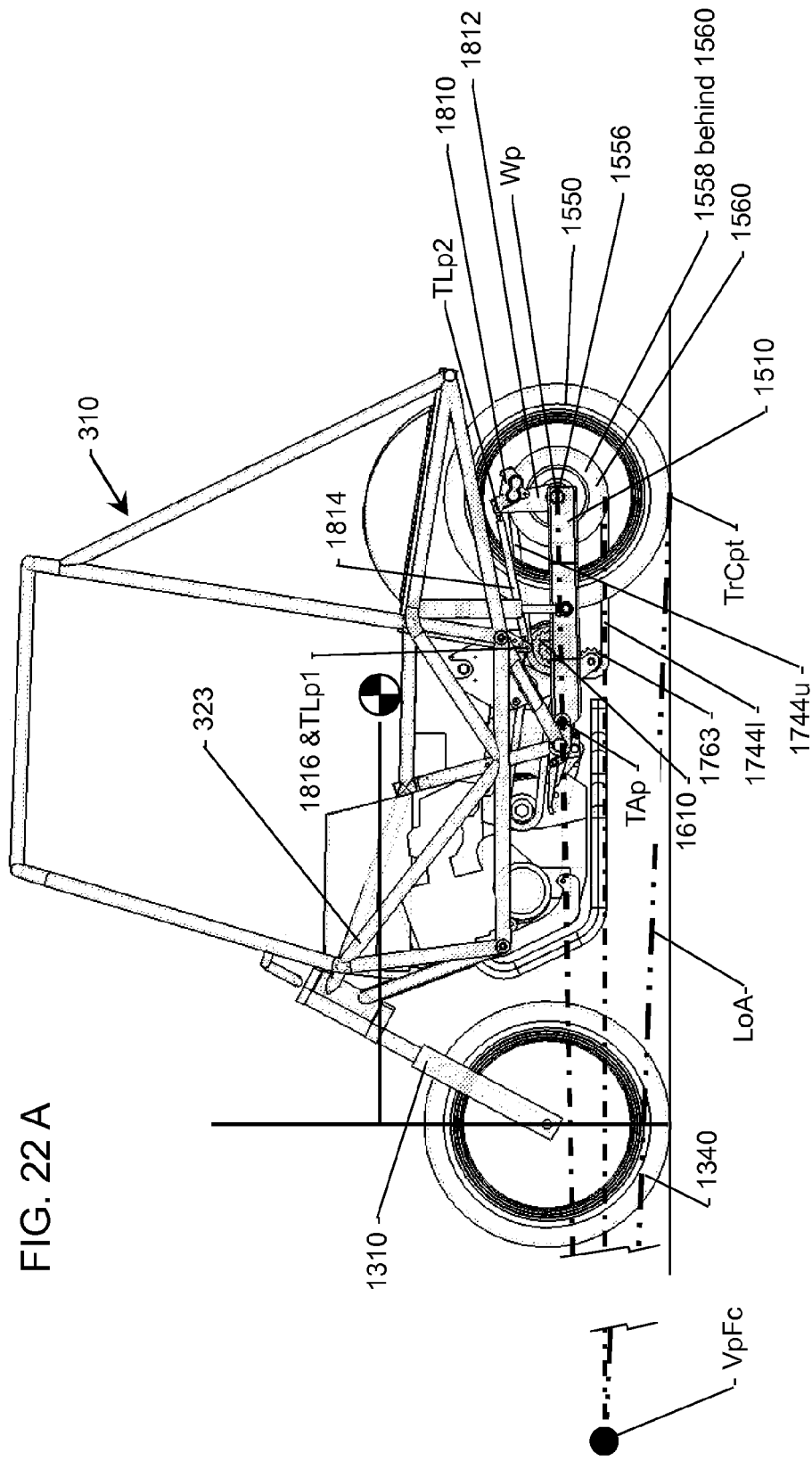
FIG. 22A is a side view of the first embodiment of the narrow leaning commuter vehicle, showing diagrammatically the rear geometry according to the invention and showing a Line of Action during deceleration (engine braking)
FIG. 22B is a diagrammatic side view of the first embodiment (neutral geometry) driveline and trailing arm geometry, at ride height during deceleration (engine braking), and showing various alternative lines of action for a range of various suspension displacements.
FIG. 22C is a graph of the driveline suspension coupling coefficient (DSCC), versus wheel displacement, for deceleration (due to engine braking) of the first embodiment according to the invention and over the range of suspension travel.
FIG. 22D is a graph of the normalized vehicle roll moment, versus vehicle lean angle, due to drive and suspension force coupling in the first embodiment according to the invention and over the range of vehicle lean angles towards a side, and for deceleration due to engine braking.
Figure 22:
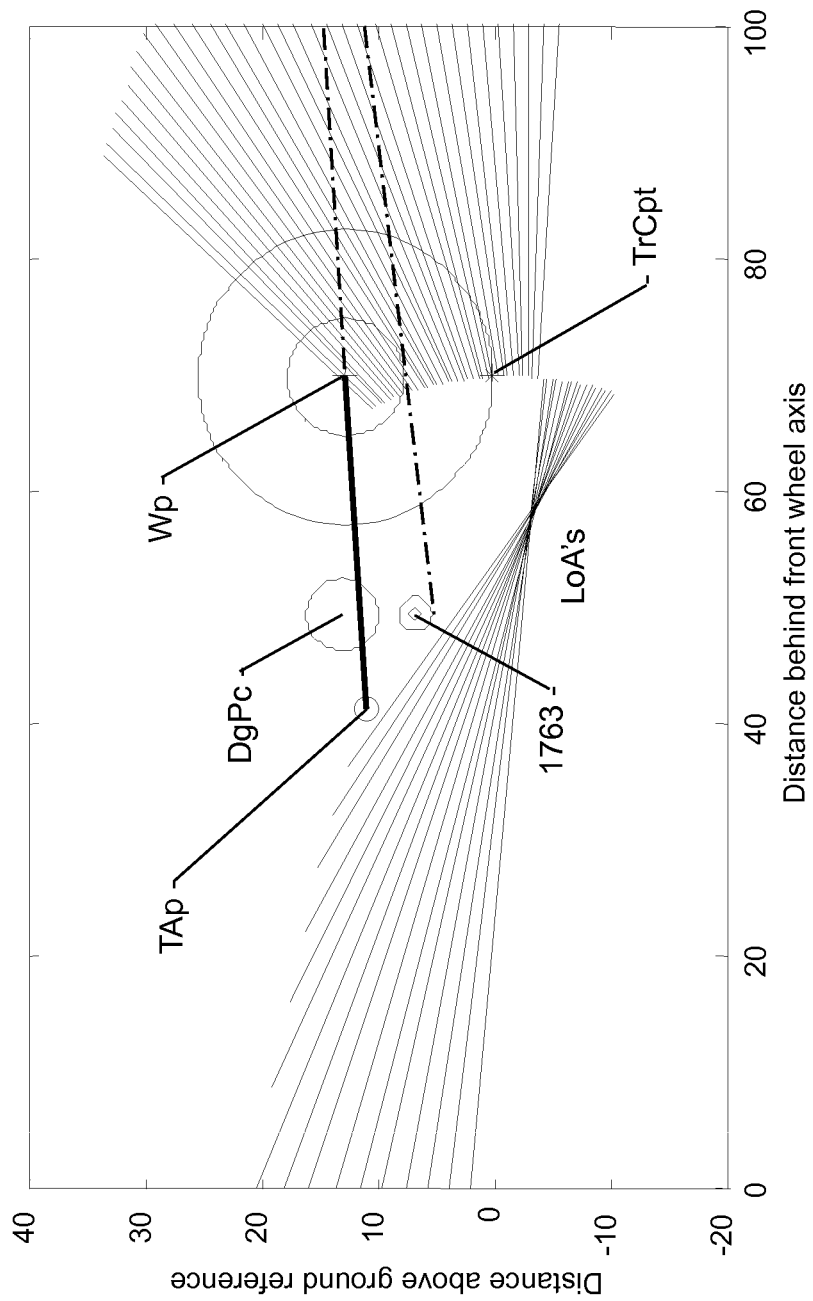
Figure 22:
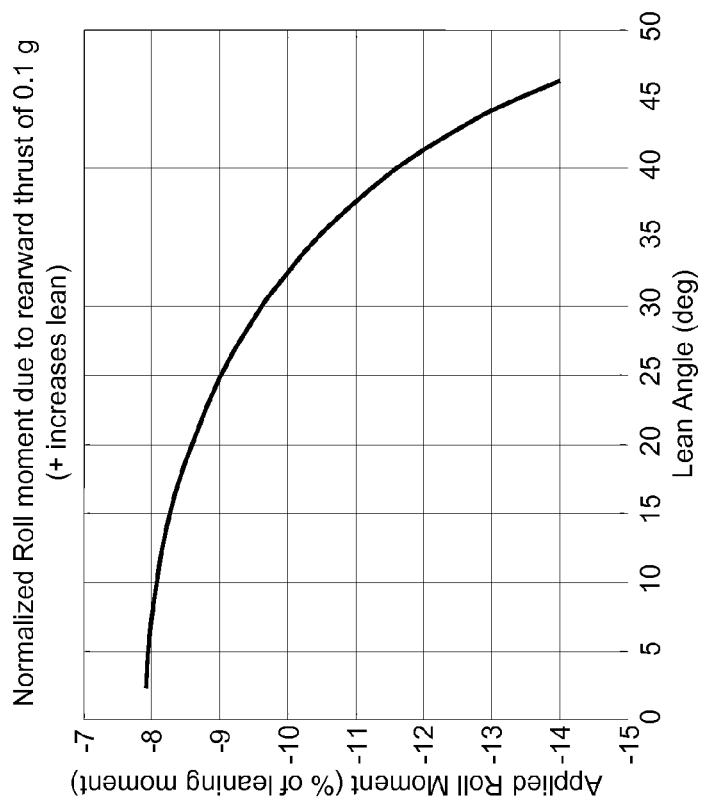
Figure 22:
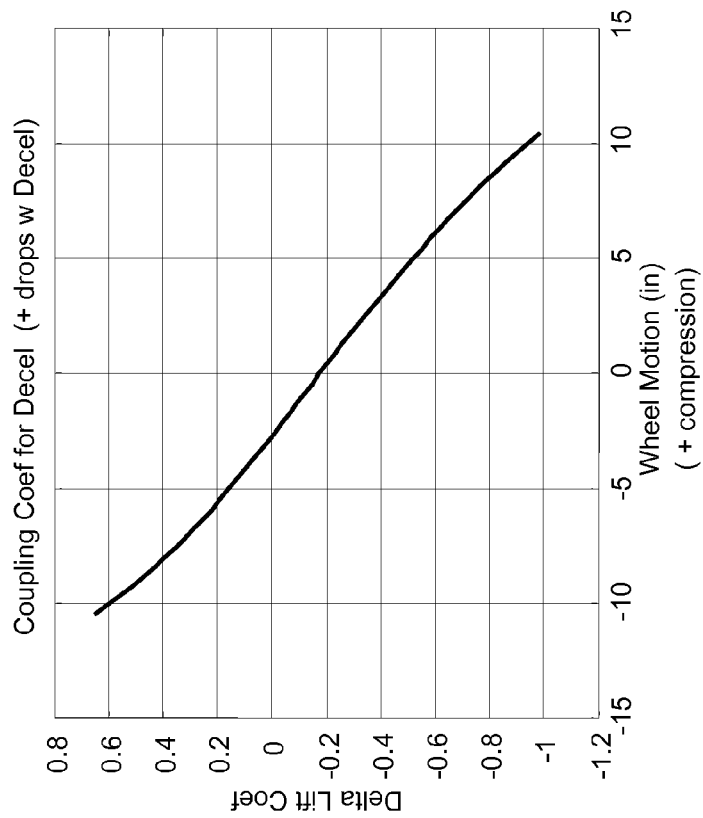

FIG. 21A presents the left side view of the nominal vehicle 310 with the first embodiment, with analytical lines drawn from the rear wheel 1550 axis (also labeled Wp), through the trailing arm pivot 1512 axis (also labeled TAp). A second analytical line is drawn over and along the upper final loop drive element 1744u. During acceleration of the vehicle, the upper length 1744u of the drive chain is under tension, and defines the coupling properties of the suspension and driveline. As discussed generally previously, these two analytical lines intersect to define the Virtual pivot and Force center, VpFc. The Virtual pivot and Force center and the tire contact point, TrCpt, define the Line of Action, LoA. This LoA represents the amount of Driveline-Suspension Coupling (DSC) between the longitudinal forces and the suspension lift force. When the vehicle is leaning, the right side wheel suspension and the left side wheel suspension will have different Lines of Action due in large part to the differing amounts of respective wheel travel (up/down). For a narrow leaning vehicle, it is the resulting lift force during acceleration which is of greater importance, because it is the difference in lifting force between the left and right suspensions that creates a destabilizing roll moment on the vehicle's sprung mass. (The anti-squat of the suspension is of secondary importance.)

Notably, the slope of the LoA represents the DSC between the drive force and the lift force, so the magnitude of the lift force is actually the slope of the LoA multiplied by the driving force. To simplify this discussion, the term "Driveline-Suspension Coupling Coefficient" (DSCC) will be used instead of "the slope of the Line of Action". Therefore, the lift created by the driveline suspension coupling of the suspension is given by Lift Force=DSCC*Drive Force. Unequal lift forces on the two rear wheels of the vehicle—and the resulting destabilizing applied roll moment—are to be avoided.

To reduce or eliminate the destabilizing roll moment acting on the vehicle sprung mass created by DSC, an open-type differential (1710) (known generally in the art) is used to provide the wheels on the two axles (1556, 1556') with the same driving force. Thus, equal driving forces are supplied to each wheel (1554) as the wheels have respective trailing arms sharing a single pivot axis. The geometric configuration of the suspension and driveline is then determined, which neutral geometry provides a substantially constant DSCC over the range of suspension travel. The same geometry is then used for all (both) the suspensions (trailing arms) sharing a common pivot axis, and their respective driveline assemblies. It is already been noted that the vehicle is symmetric about a vehicle vertical reference plane. In this way, both (all) of the wheels on a given axle will have substantially the same lift force, and the destabilizing roll moment acting on the sprung mass will be reduced or eliminated.

It is noted that having the DSCC constant over the range of suspension travel is conservative; a more precise requirement would be to have the same DSCC on each suspension of an axle for a given vehicle roll angle. The DSCC could be a curve which is symmetric about the vehicle ride height. There may then be errors between the suspension DSCCs, depending on the ride height of the vehicle (which can vary depending on irregularities in the road surface and lateral accelerations due to vehicle cornering). In a practical manner, having a constant or at least a substantially constant DSCC between the suspensions of an axle reduce the issues associated with variations in the vehicle ride height. Also in a practical manner, there are eight design parameters which define this embodiment's driveline and suspension geometry. These are: 1) the horizontal position of the trailing arm axis, 2) the vertical position of the trailing arm axis, 3) the horizontal position of the driving pinion axis, 4) the vertical position of the driving pinion axis, 5) the diameter of the driving pinion, 6) the length of the trailing arm, 7) the diameter of the driven pinion, and 8) the wheel diameter. Because of this limited set of design variables, a perfectly constant DSCC over the entire range of suspension travel is not fully achievable so a compromise must be made. Vehicle pitch angle does not affect the roll moment due to DSC, since a given sprung mass pitch angle will affect the DSCCs of both suspensions on a given axle the same amount.

FIG. 21B presents a graph of the driveline and suspension geometry for the acceleration case and condition at five different (rear wheel) suspension positions, labeled (a) through (e). This graph is in a coordinate frame which is fixed with reference to the vehicle in the longitudinal/vertical plane. The reference point (0,0) on this graph, and on similar graphs hereafter (for example, FIGS. 21C, 22B and 25C), conventionally in this disclosure is the center of the front tire contact patch (on the ground), with the front steering subassembly (front forks and wheel) directed straight ahead. The graph's horizontal distance is from this reference point along the vehicle longitudinal plane, with positive numbers progressing rearward on the vehicle towards the rear wheels. (Strictly, either the contact patch location, or the front wheel axis, or front wheel centerline can be used as the reference point, as all three are vertically aligned.) For the vertical distance in the graph, the reference height is ground height with the vehicle at ride height and upright. Positive numbers on the vertical axis are upward away from the ground, while negative numbers are below ground level. As the vehicle leans or rolls, the rear wheels must either move up (for the inside wheel) or down (for the outside wheel) relative to the vehicle coordinate frame. Thus, in FIG. 21B for example, the reference points correlated to point (c) (e.g., WpC) correspond to nominal ride height, points (a) and (b) correspond to the outside wheel (moving down) at different lean angles, while points (d) and (e) correspond to a rising inside wheel.

As can been seen from the graph of FIG. 21B, the LoA slopes (and thus the DSCC) are substantially constant over the range of suspension travels shown. (The LoAs are substantially parallel). FIG. 21C presents a similar graph (depicting the wheel and suspension seen at ride height only) of a set of multiple LoAs for the range of suspension travel of the suspension. These various LoAs are drawn between the tire contact point TrCpt and the VpFc (FIG. 21A) for the various tire positions. It is of interest to note the direction of the LoAs; at around ride height, the VpFc is forward of the wheel and generally forward of the wheel axis; while close to full droop (maximum wheel drop), the VpFc switches to behind the rear wheel. The inflection point for this switch is the suspension position where the upper chain length 1744*u* is parallel to the trailing arm 1510. Above this point, the VpFc is located at plus infinity, and below this point the VpFc is located at negative infinity. This point in the suspension travel sets the base DSCC of the suspension for acceleration.

Figure 3:
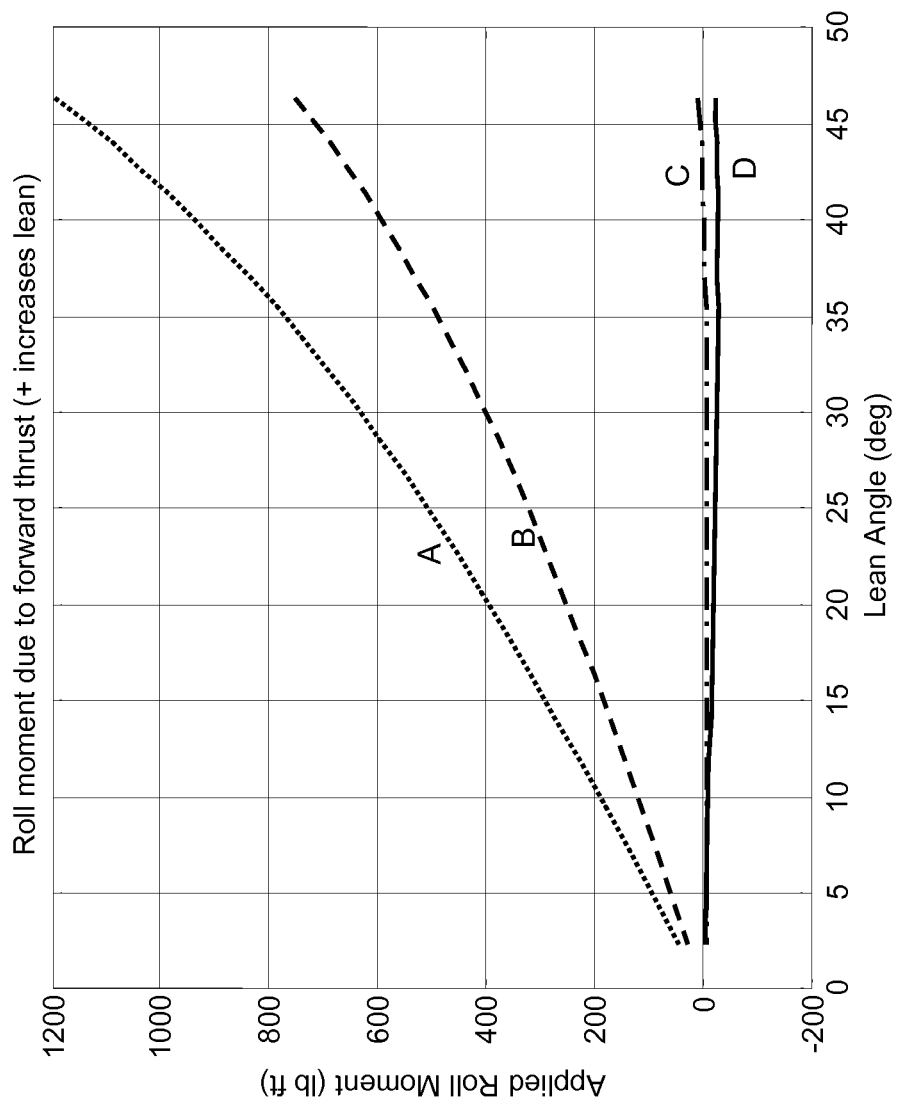
FIG. 3 is a graph of a vehicle applied roll moment, as a function of vehicle lean angle, due to driveline and suspension force coupling (only curves A and B known from prior art, curves C and D plotted according to the present invention)
Figure 4:
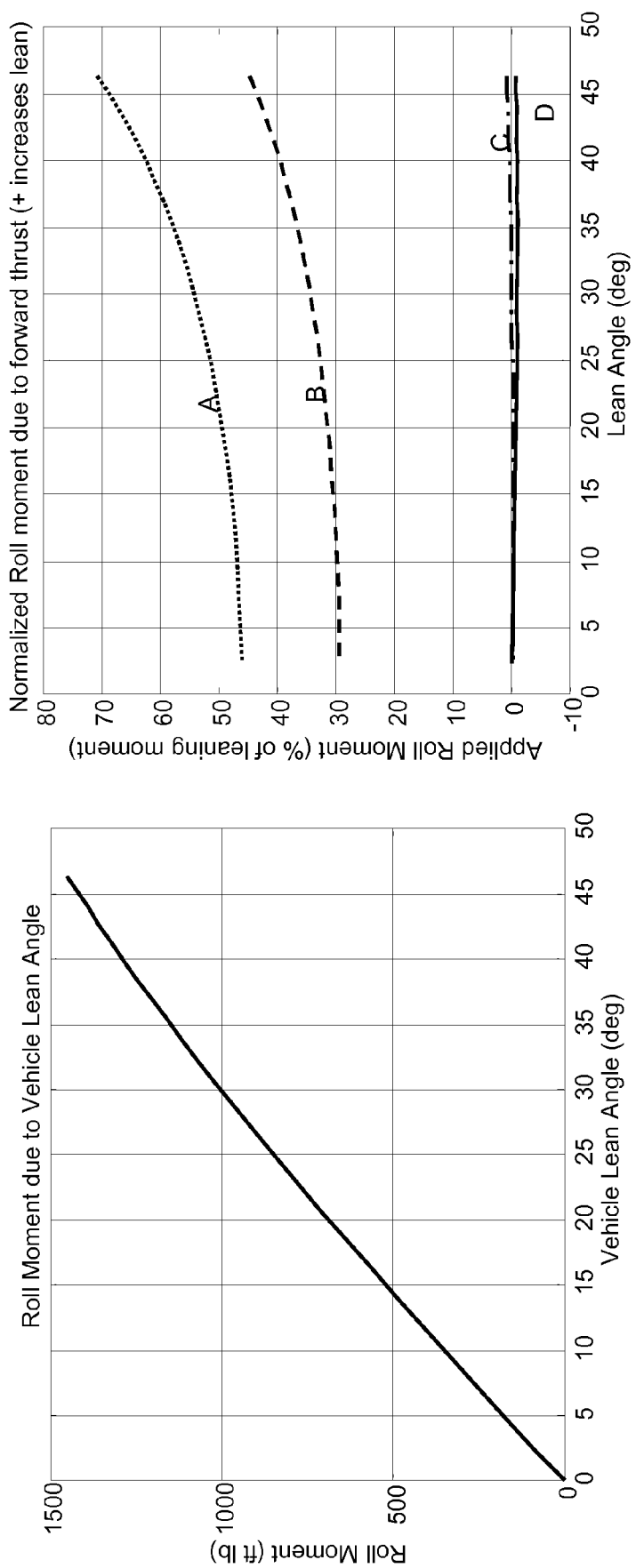
FIG. 4A is a graph known in the art of vehicle roll moment as a function of lean angle, but with no driving or braking forces applied.
FIG. 4B is a graph of normalized vehicle applied roll moment, as a function of vehicle lean angle, due to driveline and suspension force coupling (only curves A and B known from prior art, curves C and D plotted according to the present invention)

FIG. 21D presents the DSCC over the range of suspension travels for this geometry. As illustrated by this graph, the DSCC is substantially constant over the range of suspension travel. FIG. 21E plots the normalized roll moment due to forward thrust (of 0.7 g) for this geometry. Comparison of the data of FIG. 21E with that of FIG. 4B shows that the unstable roll moment due to forward thrust has been substantially eliminated. The curve presented in FIG. 21E corresponds to curve C in FIGS. 3 and 4B. A graphical and a computational method for determining and optimizing the driveline suspension geometry are discussed below.

During Engine Braking

FIG. 22A presents the left side view of the nominal vehicle 310 with the first embodiment, with an analytical lines drawn from the rear wheel 1550 axis (also labeled Wp), through the trailing arm pivot 1512 axis (also labeled TAp). A second analytical line is drawn over and along the lower final loop drive element 1744*l*. During engine braking, the lower length 1744*l* of the drive chain is under tension and thus defines the coupling properties of the suspension and driveline. As discussed previously, the intersection of these two analytical lines define the Virtual pivot and Force center (VpFc) which, with the tire contact point (TrCpt), define the Line of Action, LoA. In this embodiment, a chain idler 1763 is used to position the lower chain run 1744*l*, as well as to compensate for the variation in chain path length over the range of suspension travel. Due to the geometry of the lower chain run and the need to compensate the chain path length, it is difficult to have a constant DSCC over the complete range of suspension travel. But in practice this typically is not a problem, because the deceleration forces due to engine braking are substantially less than those for acceleration. Also, many motorcycles use a "slipper clutch" which reduces engine braking forces on the rear tires to improve vehicle handling and predictability, and which can be incorporated into a vehicle 310. A slipper type of clutch is useful to reduce the affects of engine braking on roll moments acting on a narrow leaning vehicle. An automatic transmission has a similar function as a slipper clutch during engine braking, by reducing the torque and forces on the driveline. Active engine throttle control could be used to minimize engine braking during high lean angle cornering, also reducing the affects of non-constant DSCC during engine braking Shaft-driven or hub motor-driven embodiments of the present apparatus have improved DSC during engine braking, but such embodiments also tend to be higher cost compared to chain or belt final drives.

Attention is invited to FIG. 22B, illustrating the LoAs for the engine braking case in the first embodiment. These plots are not as well-controlled as for the acceleration case (FIG. 21C), as shown by the wider variation in the slopes of the several LoAs as a function of suspension travel. As with the acceleration condition, the location of the VpFc switches from locations in the front of, to locations to the rear of, the driven rear wheel.

FIG. 22C provides a plot of the DSCC during engine braking over the range of suspension travel. Although this engine braking case is not perfect, it is a significant improvement over the prior art designs. FIG. 22D presents the normalized roll moment due to engine braking, a rearward thrust with a deceleration of 0.1 g. For this geometry, the roll moment tends to "straighten out" the vehicle toward true vertical, reducing the lean angle. Using some of the methods discussed in the preceding paragraph, this roll moment could be eliminated entirely.

During Use of the Rear Service Brakes

FIG. 23A offers the left side view of the nominal vehicle 310 with the first embodiment, with analytical lines drawn from the rear wheel 1550 axis (also labeled Wp), through the trailing arm pivot 1512 axis (also labeled TAp). A second analytical line is drawn over and along a rear brake torque link 1814, which link reacts the brake torque from a rear brake caliper 1810 acting on the brake disc 1560. The rear brake caliper 1810 is mounted to a rear brake caliper floating mount 1812, which incorporates a bearing allowing the rear brake caliper floating mount 1812 to pivot about the axis Wp of the wheel's axle assembly 1556.

During braking by rear service brakes, the rear brake torque link 1814 is under compression and thus defines the coupling properties of the suspension and driveline. As discussed previously, these lines define the Virtual pivot and Force center, VpFc, which along with the tire contact point, TrCpt, define the Line of Action, LoA. (Although the rear brake torque link 1814 is shown in FIG. 23A situated above the trailing arm 1510, it could also be located below the trailing arm, resulting in different levels of anti-rise during braking. If the torque link were below the trailing arm, the reaction force in braking would then be in tension.

Reference is made to FIG. 23B, which is a simplified diagrammatic side view of the rear brake geometry according to the system of FIG. 23A. Shown schematically is a trailing arm 1510 with torque link rear suspension type of trailing arm system. As with the chain drive acceleration or engine braking geometries, it is important that the respective DSCCs of the wheels on the axle are substantially equal as the vehicle leans, to reduce roll moments created by DSC. Anti-rise properties of the suspension and driveline are of secondary importance, although in general the anti-squat and anti-rise properties of the improved geometries discussed are much improved when compared to typical geometries used on motorcycles or automobiles. During braking, the longitudinal forces acting on the rear wheel act to slow the vehicle down and are opposite in sign than acceleration forces, so instead of creating a lifting force acting on the vehicle sprung mass, the coupled force acts to pull down the sprung mass with a positive DSC. This is considered to be anti-rise instead of anti-squat.

Figure 5:
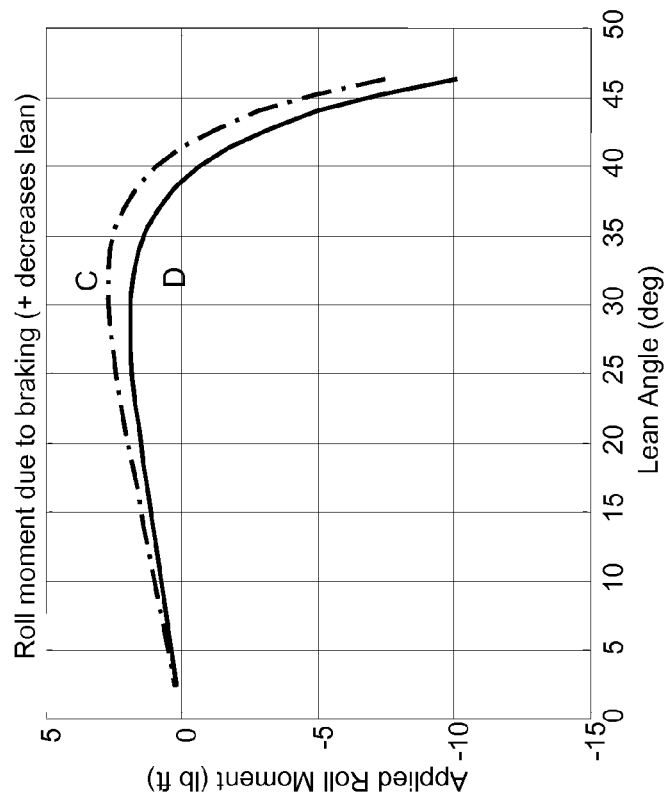
FIG. 5 B is a graph of vehicle applied roll moment, as a function of vehicle lean angle, due to brake and suspension force coupling, providing in enlarged detail from FIG. 5A data close to horizontal axis.
Figure 5:
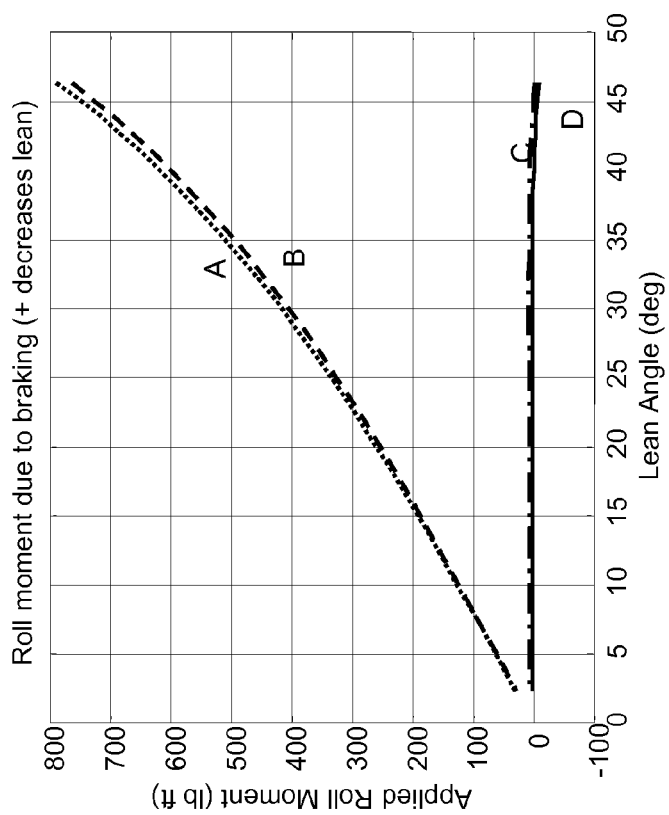
Figure 5D:
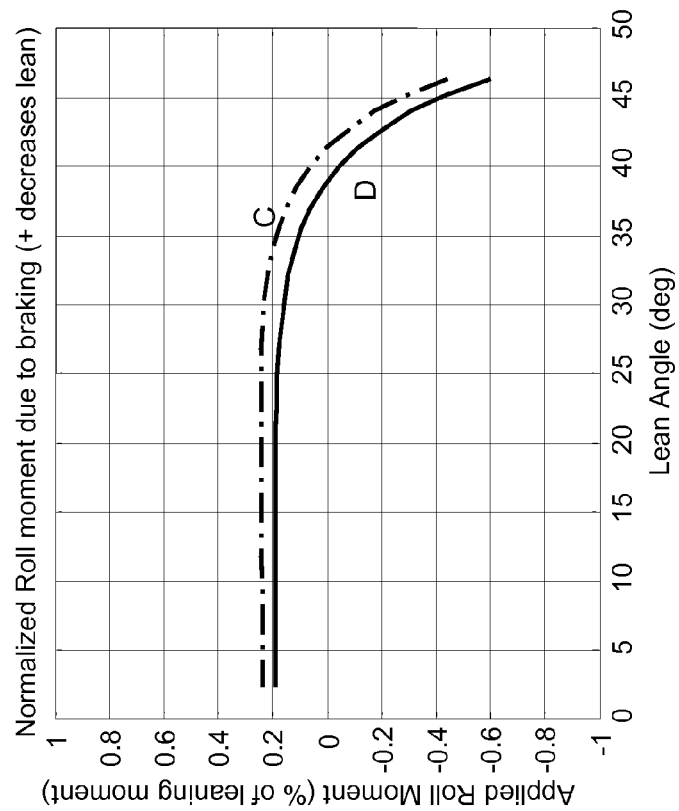
FIG. 5D is a graph of normalized vehicle applied roll moment, as a function of vehicle lean angle, due to brake and suspension force coupling, providing in enlarged detail from FIG. 5C data close to horizontal axis.
Figure 5C:
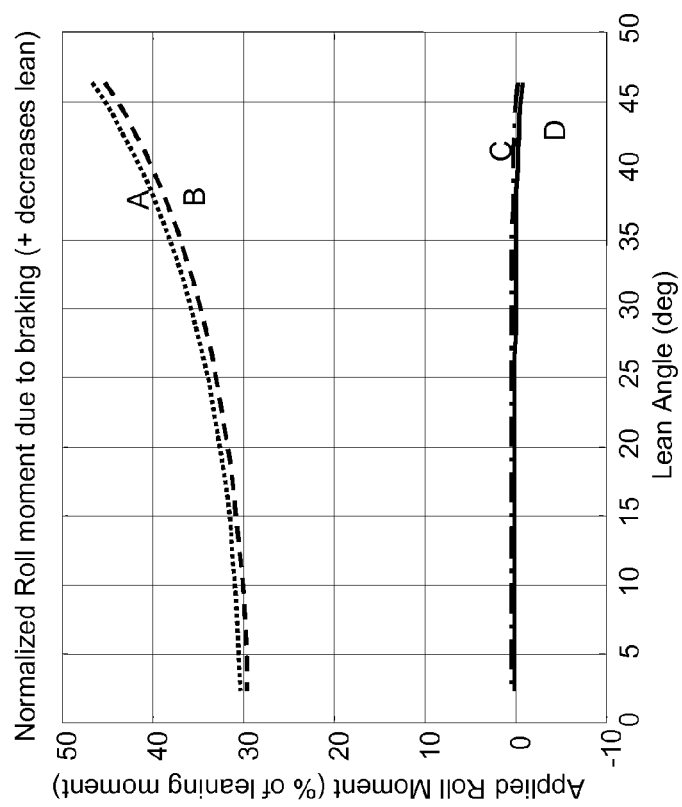
FIG. 5C is a graph of vehicle normalized vehicle applied roll moment, as a function of vehicle lean angle, due to brake and suspension force coupling (only curves A and B known from prior art, curves C and D plotted according to the present invention)
Figure 23:
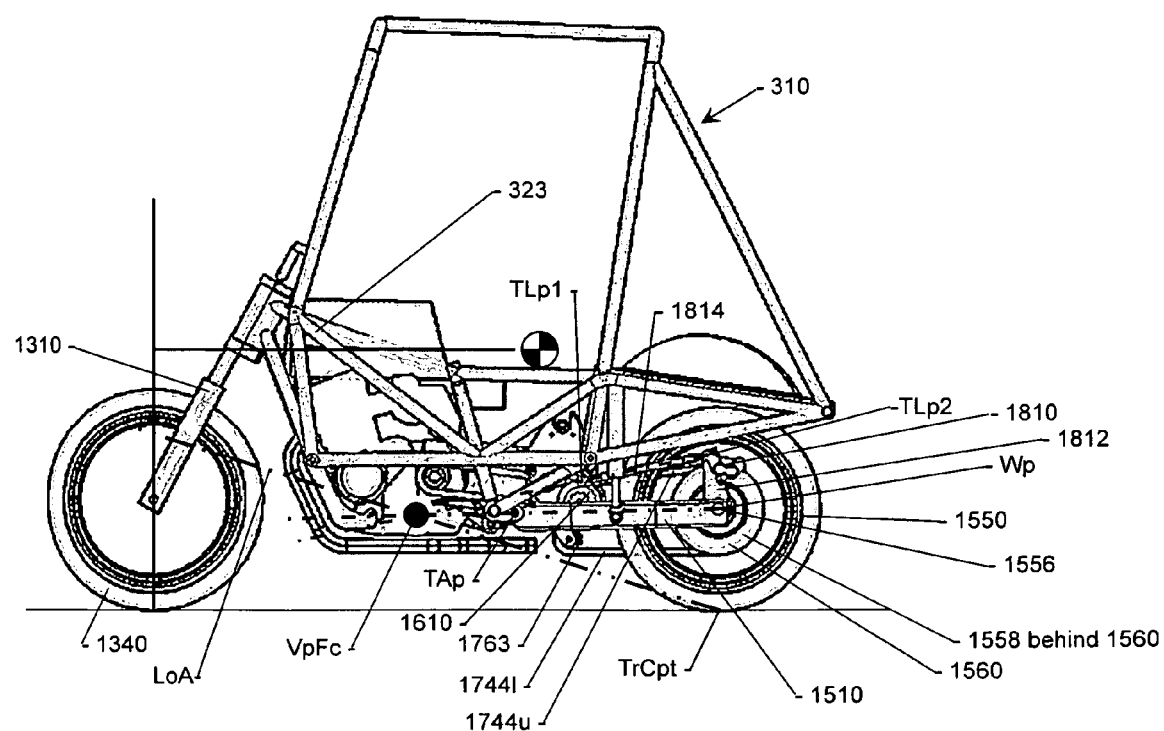
FIG. 23A is a side view of the first embodiment of the narrow leaning commuter vehicle, showing diagrammatically the rear geometry according to the invention and showing a Line of Action during service braking.
FIG. 23B is a diagrammatic side view of general multi-link trailing arm geometry pivoting about the wheel axle, and according to the first embodiment of the invention.
FIG. 23C is a diagrammatic side view of the first embodiment of the present invention (neutral geometry) driveline and trailing arm geometry, shown at ride height, during braking and showing various alternative lines of actions for a range of suspension displacements.
FIG. 23D is a graph of the driveline suspension coupling coefficient (DSCC), versus wheel displacement from ride height, for deceleration due to service braking of the first embodiment over the range of suspension travel.
FIG. 23E is a graph of normalized vehicle applied roll moment, versus vehicle lean angle, due to drive and suspension force coupling in the first embodiment of the invention during service braking and over the range of vehicle lean angles.
Figure 23:
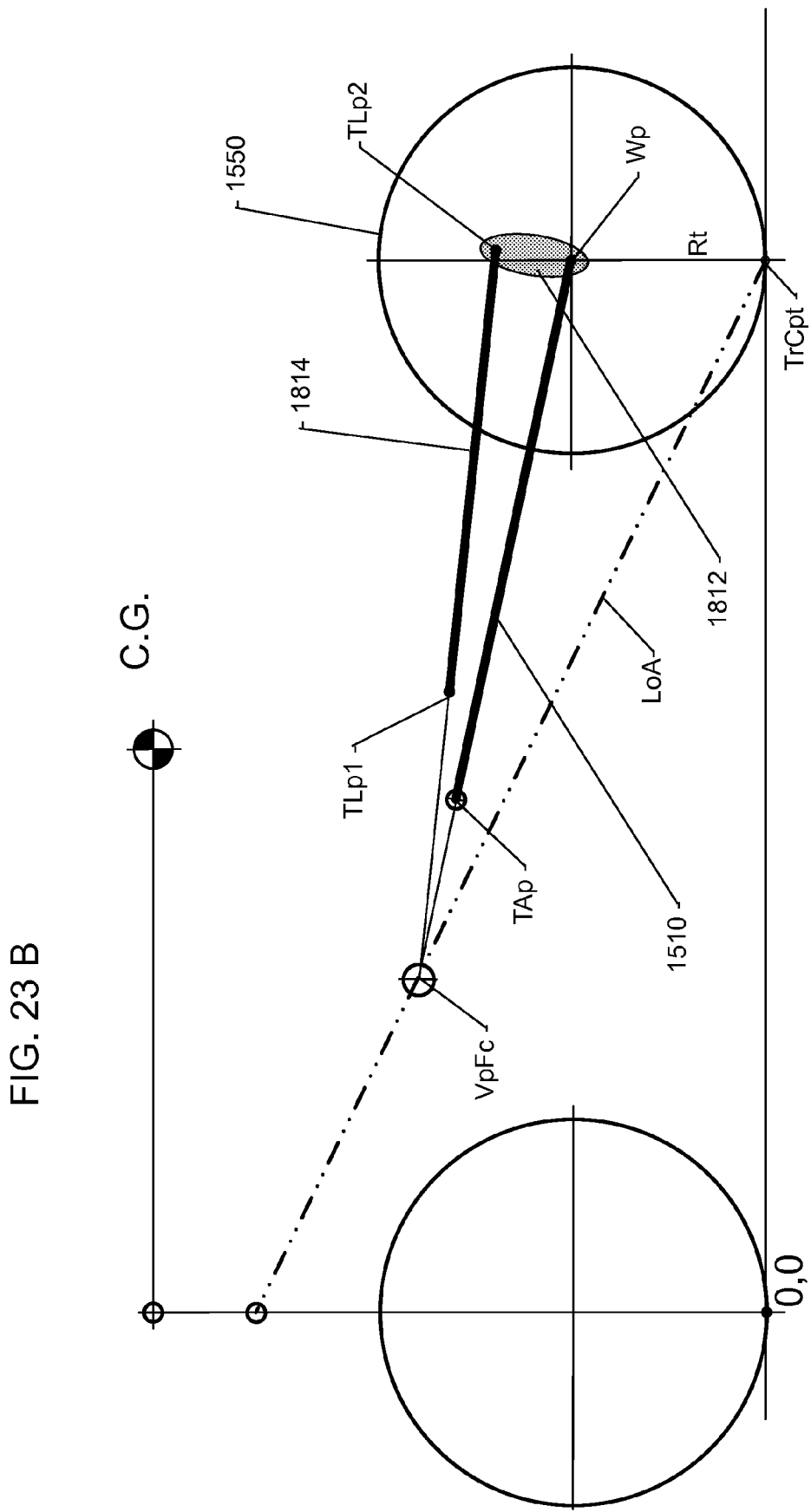
Figure 23:
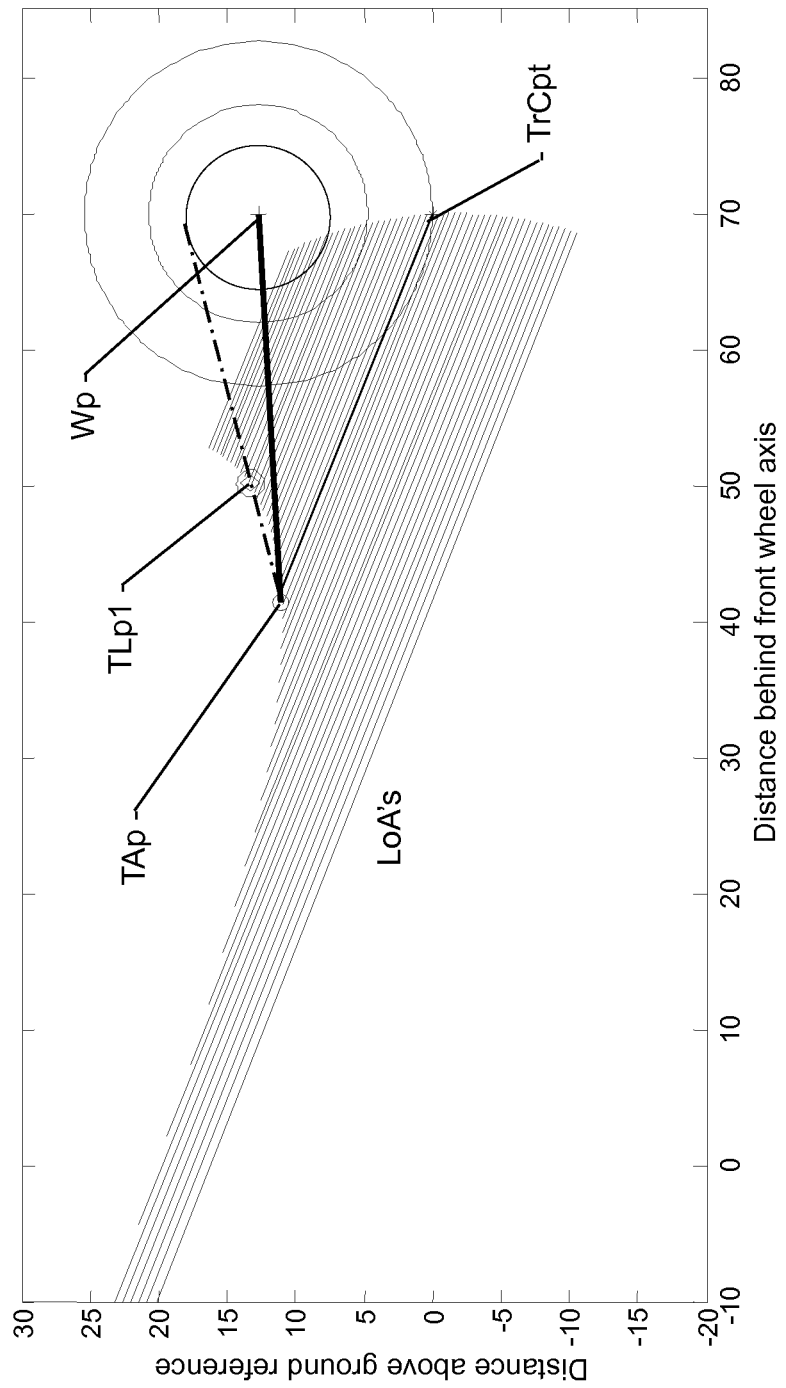
Figure 23:
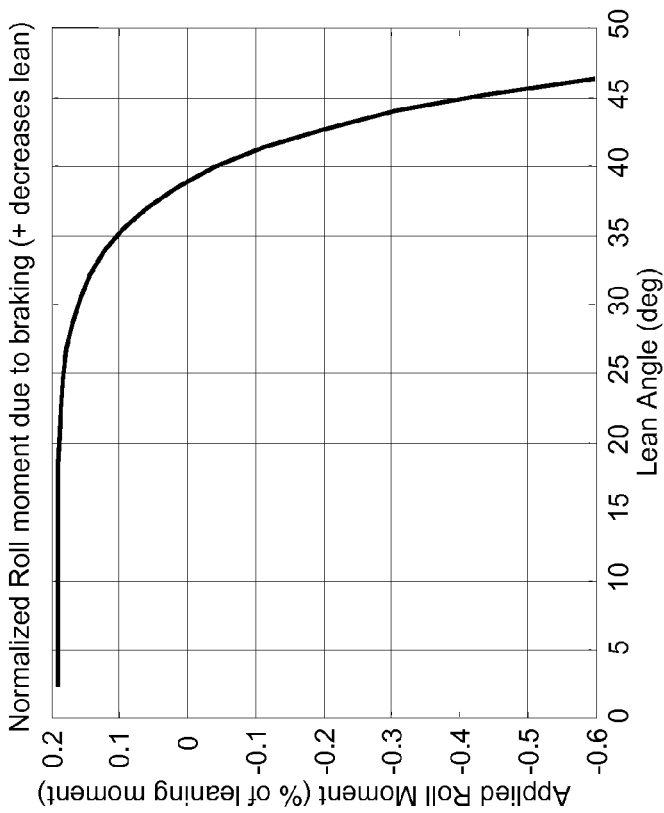
Figure 23:
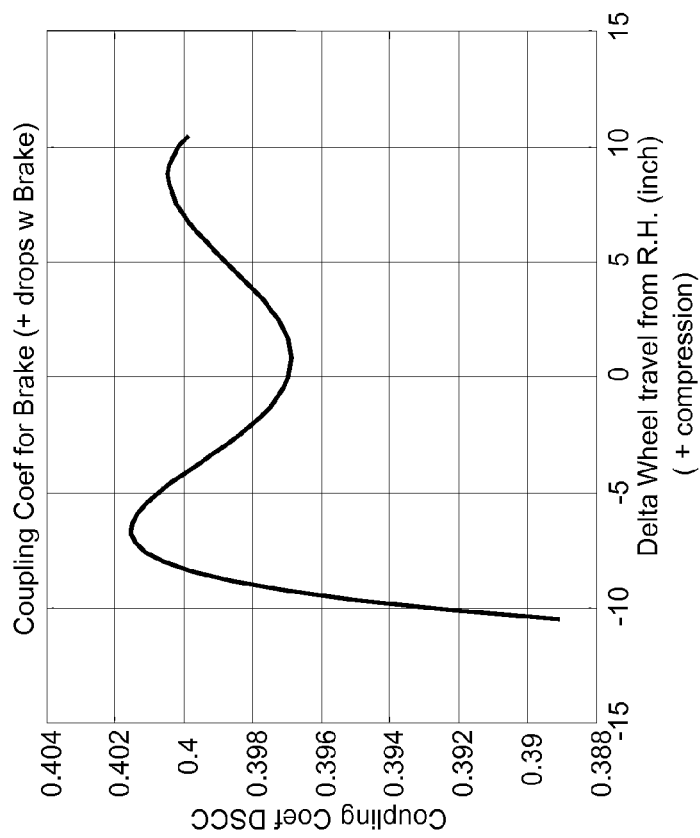
Figure 24:
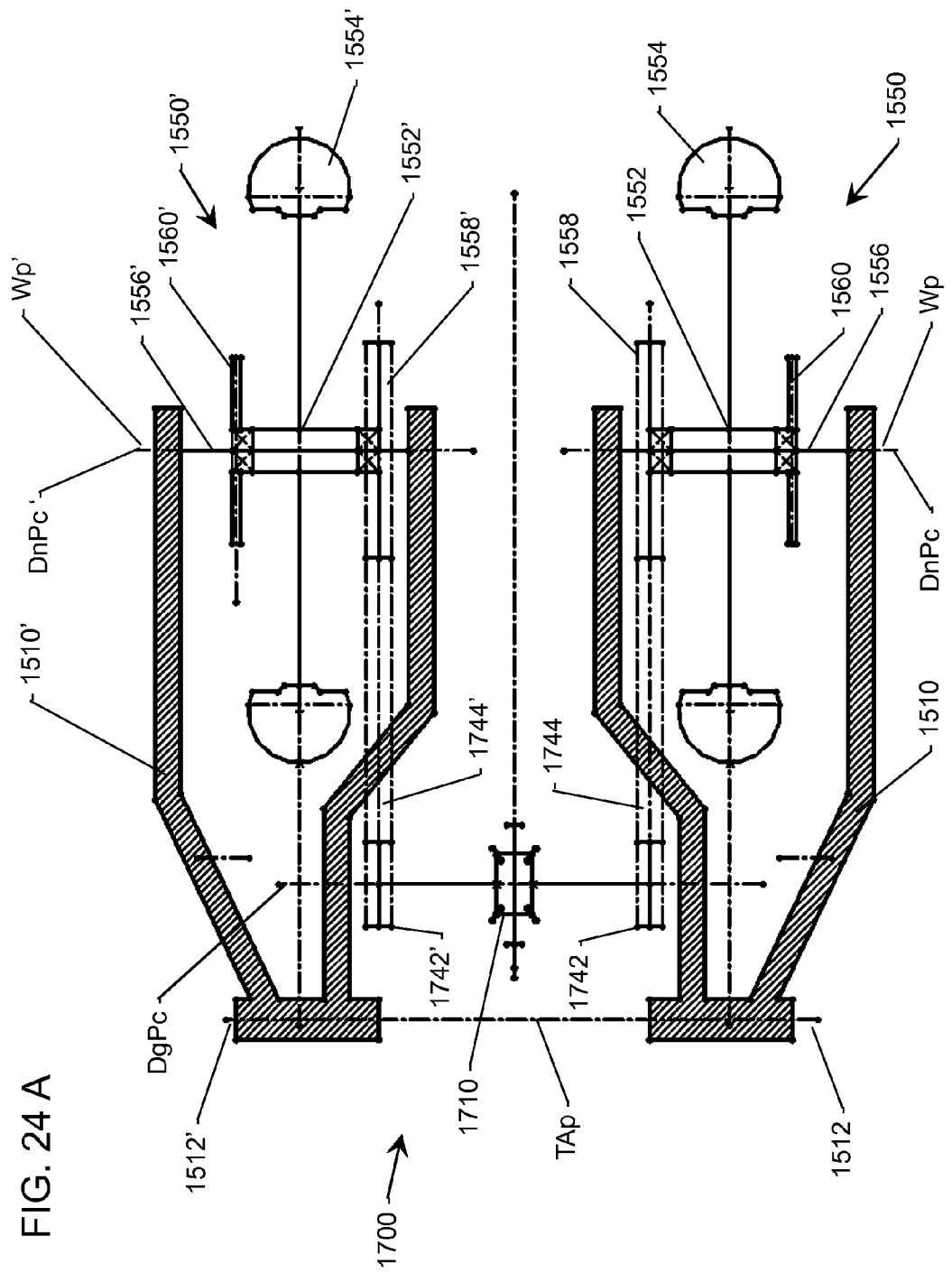
FIG. 24A is a diagrammatic top sectional view of a driveline with chain drive and double-sided trailing arm according to a first embodiment of the present invention.
FIG. 24B is a diagrammatic top sectional view of a driveline with brake actuator and double trailing arm with torque link about axle according to a first embodiment of the present invention.
Figure 24:
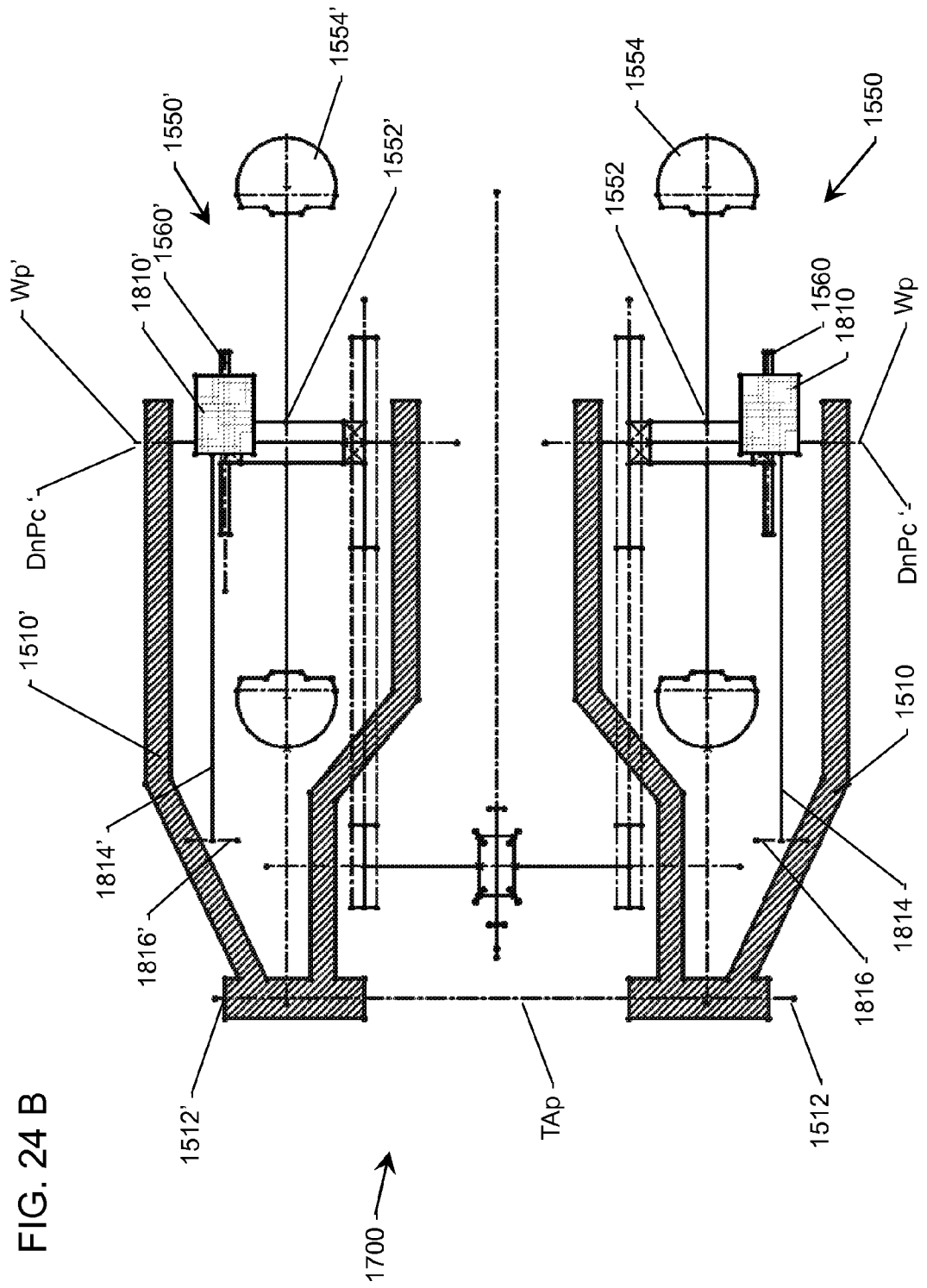

FIG. 23C therefore presents a graph similar to that of FIG. 21C (with FIG. 21C graphing the acceleration condition) for the service braking case and condition, with the wheel and suspension depicted at ride height only, and showing a set of LoAs for the range of suspension travel of the suspension. Again, the LoAs are drawn between the tire contact point TrCpt and the VpFc. FIG. 23D presents, on a magnified scale, the DSCC over the range of suspension travels for this geometry. As can been seen from the data of FIG. 23D, the DSCC while not absolutely constant, is substantially constant over the range of suspension travel. FIG. 23E plots the normalized roll moment due to service braking (of 0.7 g) for this geometry. When compared to FIG. 5A, FIG. 23E shows that the unstable roll moment due to braking has been substantially eliminated. The data curve presented in FIG. 23 E corresponds to curve C in FIGS. 5A-D. A graphical and a computational method for determining and optimizing the driveline suspension geometry are discussed below.

Operation of First Embodiment

The main advantage of the Geometry for Improved Driveline-Suspension Coupling of Narrow Leaning Commuter Vehicles according to the present disclosure is that it provides a narrow leaning multi-track vehicle with excellent dynamic properties and which can be used with high power engines and braking systems—without exhibiting the bad behaviors manifest in prior art vehicles of this type.

During vehicle acceleration, the differential 1710 provides the left and right side final driving pinions 1742, 1742' with equal torque. The final drive transmits this torque to the rear wheels (1550, 1550') with the improved geometry providing substantially equal lifting forces acting on the vehicle sprung mass while the vehicle is turning or going straight. Because the lifting forces are substantially equal on the two sides of the vehicle, there is little destabilizing roll moment acting on the vehicle.

During engine braking, the improved geometry provides improved squatting or anti-rise forces on the sprung mass over most lean angles during turning. If the vehicle has a slipper clutch, an automatic transmission, or some form of engine control for reducing engine braking, little longitudinal engine braking forces are applied by the rear tires, so there is also little roll moment applied to the vehicle sprung mass even in the limited conditions were the DSCC between the rear wheels are not substantially equal.

During braking of the vehicle when the vehicle is starting a turn or already in a turn, the improved geometry does not create any roll moment on the vehicle sprung mass. This improves rider control and allows the narrow leaning vehicle to have handling qualities similar to that of a standard motorcycle, without any bad habits due to suspension driveline coupling. This embodiment also allows the final chain drive to have a different amount of driveline and suspension coupling than the braking case.

Method of Use of First Embodiment:

Graphical Method for Determining Driveline-Suspension Geometry for Acceleration

With reference again to FIG. 21B, a two-dimensional planar graphical method, according to the present disclosure, for determining the geometrical configuration for improved driveline-suspension coupling of the narrow leaning vehicle is now described, for the acceleration condition by way of leading example. This is an iterative design method based on an initial starting design, which will be termed the "nominal design." As discussed, there are eight principal design parameters, which are: (1) the horizontal position of the trailing arm pivot axis (TAp); (2) the vertical position of the trailing arm pivot axis; (3) the horizontal position of the driving pinion axis; (4) the vertical position of the driving pinion axis; (5) the diameter of the driving pinion, (6) the length of the trailing arm; (7) the diameter of the driven pinion; and (8) the driven wheel diameter. In the method, the suspension travel is considered a design variable, which is allowed to vary throughout the desired suspension travel range. Generally characterized, the method includes the following process. First, using best informed judgment an estimated nominal value is selected for each of the eight principal design parameters. Second, again using best judgment, the relevant driveline and suspension components of the nominal design are located in two dimensions (as by drawing, e.g., graphically, using a CAD-CAM drafting program, if desired) to show the parameters of the trailing arm pivot axis position, the trailing arm length (along its centerline), the driven pinion diameter, and the rear wheel diameter, all depicted at vehicle ride height (e.g., initially in nominal case), except that the position of the driving pinion axis and the diameter of the driving pinion are not immediately shown. Third, a design variable value is selected for the slope of the Line of Action, which slope is equal to a desired DSCC. In this method, "design parameters" are fixed quantities/values, while "design variables" may vary as a function of suspension position (or travel). Fourth, the LoA is drawn to extend from the depicted tire contact point (TcCpt), both forward and rearward, at the selected desired LoA slope. Fifth, the Virtual pivot Force center (VpFc) is determined at the intersection between the trailing arm axis (extended as necessary) and the LoA. (If the LoA and trailing arm axis are parallel, the VpFc is considered to be located at infinity.) Sixth, a desired upper chain line (e.g., line to be defined by a desired location of upper chain length 1744u) is drawn in as a line tangent to the driven pinion (which pinion is concentric with the rear wheel) and through the VpFc (which is located at the intersection of the selected LoA and trailing arm axis). If the VpFc is at infinity (trailing arm axis and desired LoA are parallel), the desired upper chain line is drawn tangent to the driven pinion and parallel to the trailing arm axis and the selected LoA. This procedure is then repeated for several "new" alternative suspension positions away from the vehicle's ride height position (but within a reasonable range of suspension positions). For each alternative suspension position, an associated new LoA is drawn through the respective tire contact point at each alternative wheel position, and parallel to the original, first depicted LoA.

From this iteration, a set of graphically depicted desired upper chain lines is generated. Based on the generated set of desired upper chain lines, the driving pinion diameter, and the location of the driving pinion axis, is determined by drawing a circle (corresponding to the driving pinion circumference) which is tangent to as many of the depicted desired upper chain lines as possible. The greater the number of desired upper chain lines that are depicted, the better the diameter and axis of the driving pinion can be determined, as the number of desired upper chain lines that are tangential to the driving pinion circle are visually optimized. (Further optimization can be carried out by performing a sensitivity analysis by varying the nominal design parameters to determine the optimal set of design parameters which achieves the minimum error for the upper chain lines to the driving pinion diameter and size.) Once the location of the driving pinion axis and the driving pinion diameter are thereby determined, the overall preferred geometric configuration of the driveline and suspension, for improved driveline-suspension coupling, has been determined graphically for the desired driveline-suspension coupling coefficient and for the initial set of parameters. Any perceived intolerable error can then be addressed by changing a design parameter (e.g., trailing arm length), and repeating the process using the changed parameter as an initially selected parameter.

Selecting a value for the slope of the Line of Action (DSCC) is an exercise in informed judgment, and necessarily involves a certain amount of guesswork. Indeed, deciding upon a suitable amount of DSCC may be one of the least understood aspects of vehicle design. As a general rule of thumb, the minimum amount of DSCC (anti-squat) needed to provide some suspension travel under maximum acceleration conditions, based on a desired suspension spring rate, is employed. Luxury cars with soft springs and high centers of gravity, for example, tend to have on the order of around 50%, while performance cars with stiff springs may have 20% or less. Motorcycles, which normally have relatively higher centers of gravity than cars, have larger amounts of DSCC. Motorcycles with trailing arms and chain/belt drive may have, commonly, between about 30% to about 70% anti squat (DSCC, at ride height, the DSCC can vary considerably over the range of suspension travel), while shaft-drive motorcycles may have over 100% due to the cost and complexity required to reduce the amount of anti-squat associated with those drivelines. Accordingly, for methods and apparatuses according to the present disclosure, as with conventional motorcycles the initial choice in the amount of anti-squat (DSCC) is based on the general layout, suspension system packaging, the desired performance level, the desired vehicle ride height (and center of gravity height), the vehicle intended use of the motorcycle (commuting, high performance, and associated desired spring rate) and drive type.

The foregoing graphical method for determining driveline-suspension geometry method may be further elaborated. Accordingly, an embodiment of the method for improving performance of a driveline and suspension of a leaning vehicle having a first driveline, a first rear driven wheel on a first trailing arm suspension, a second driveline, and a second rear driven wheel on a second trailing arm suspension (the suspensions having a shared pivot axis wherein the driven wheels are movable independently of each other over a range of suspension travel) generally includes the steps of: (1) determining a driveline-suspension geometry which results in a substantially constant driveline-suspension coupling over the range of suspension travel, or in a progressively increasing driveline-suspension coupling during suspension compression during vehicle acceleration, or in a progressively increasing driveline-suspension coupling during suspension compression during vehicle braking; (2) providing the drivelines and the suspensions with the determined suspension-driveline geometry; and (3) supplying equal driving forces to the driven wheels. Determining the driveline-suspension geometry can be done using a graphical method or a computational method. After the driveline suspension geometry is thus determined, various embodiments of an apparatus according to the present disclosure can be fabricated by providing the vehicle with the suitably determined geometry.

Figure 6:
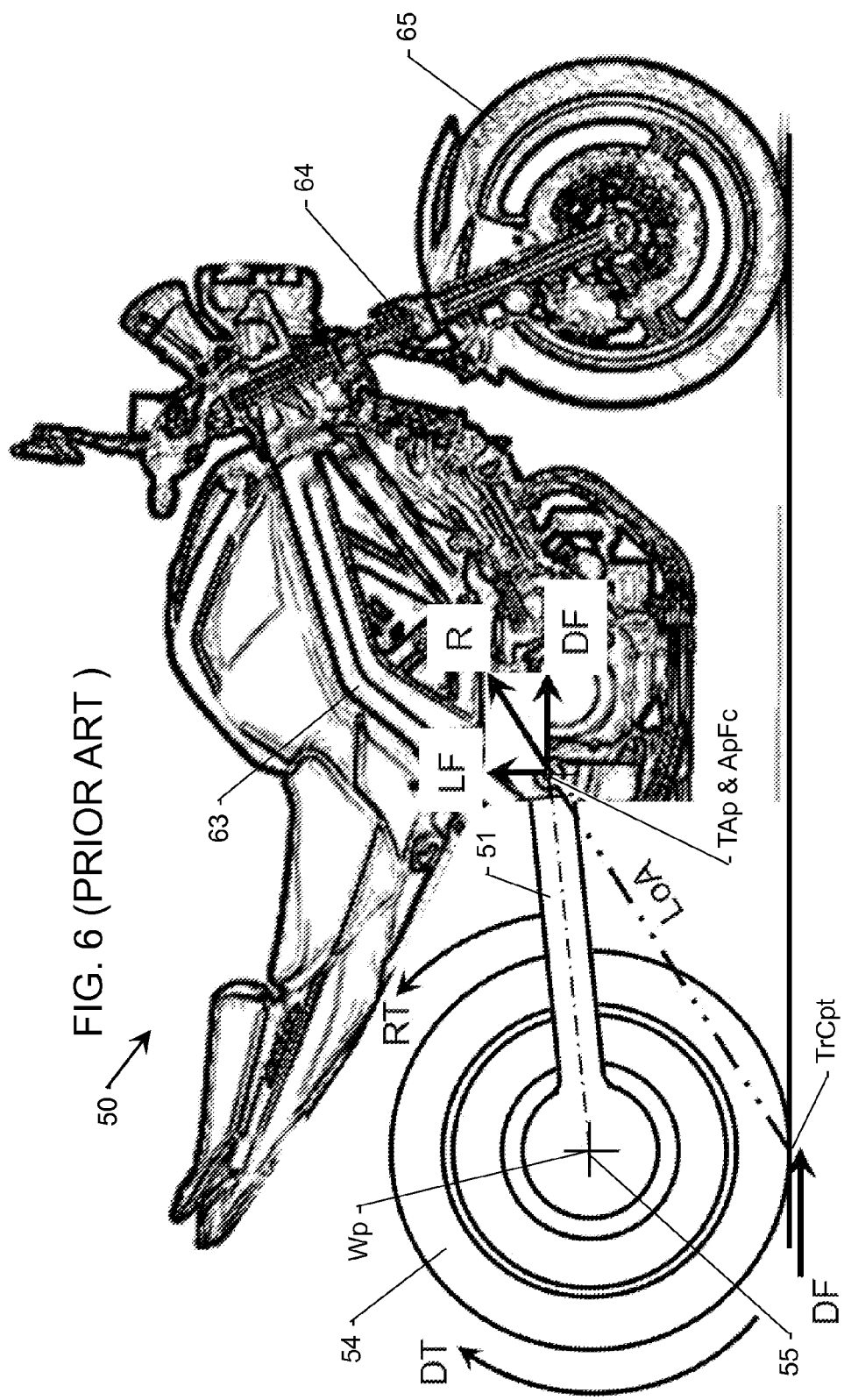
FIG. 6 is a side view of a prior art, single track vehicle, with trailing arm rear suspension and torque source, illustrating a "Line of Action" (LoA) which line represents the driveline-suspension coupling between the longitudinal forces and the suspension lift force on the vehicle.
Figure 7:
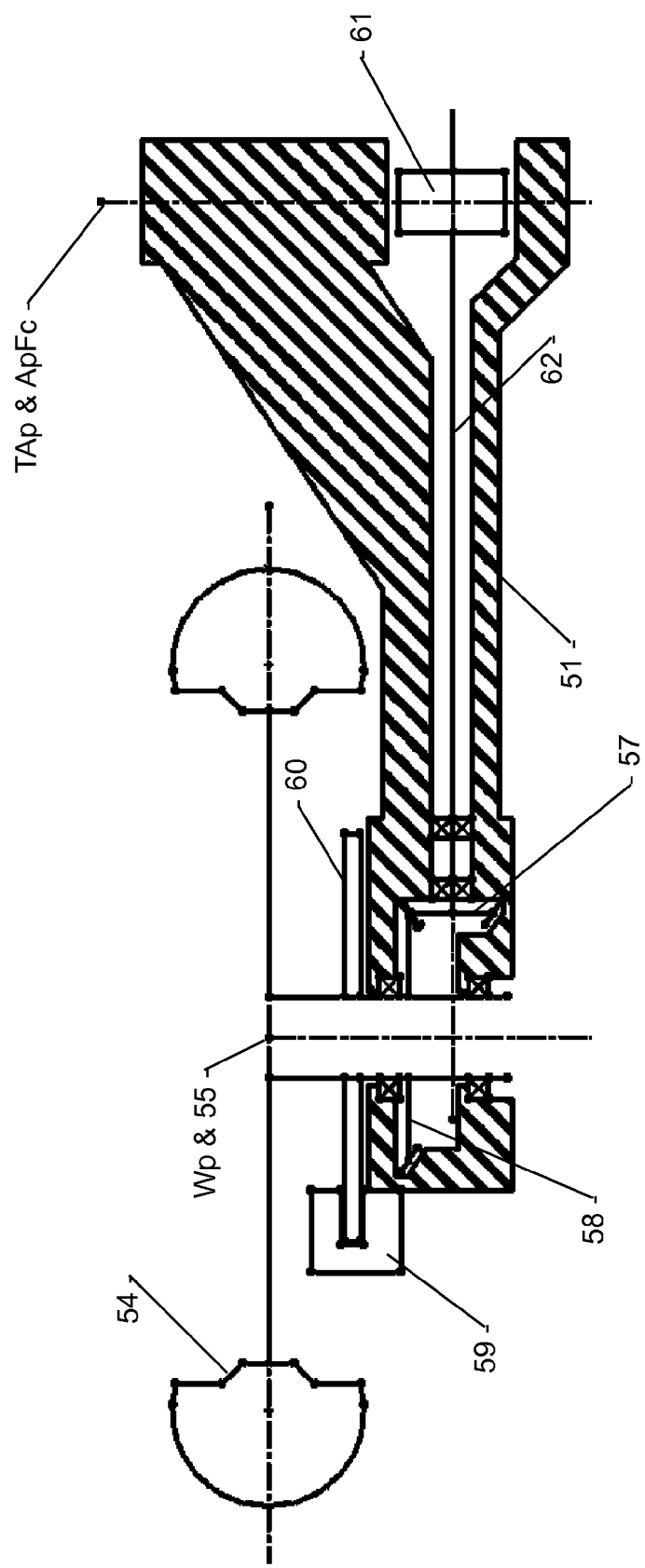
FIG. 7 is a top sectional view of a prior art single track trailing arm rear suspension schematic; very generally in accordance with FIG. 6.
Figure 8:
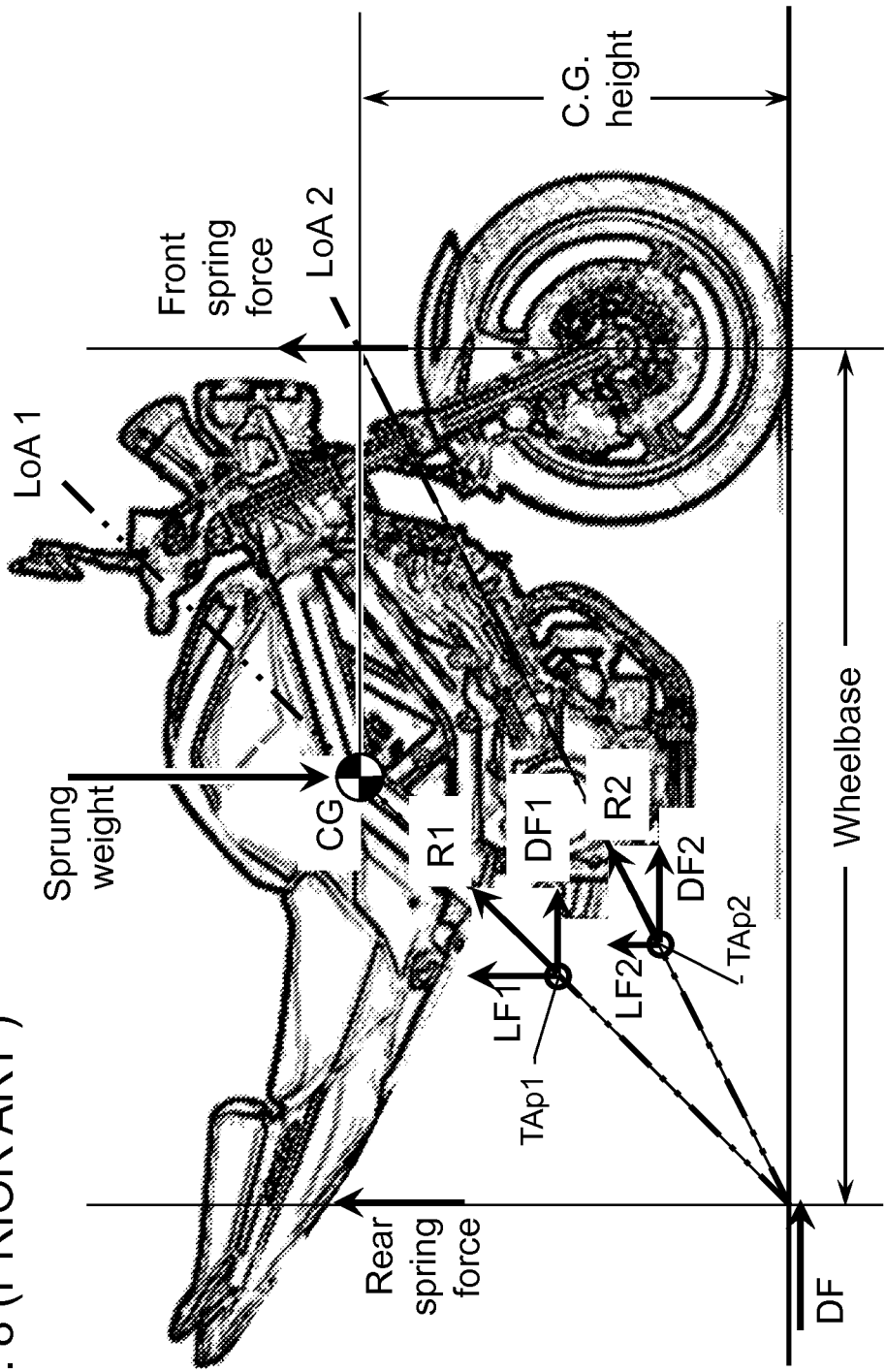
FIG. 8 is a side view of a prior art single track vehicle with a trailing arm rear suspension (with external drive force) and showing two special cases of "Lines of Action" (LoAs)
Figure 9:
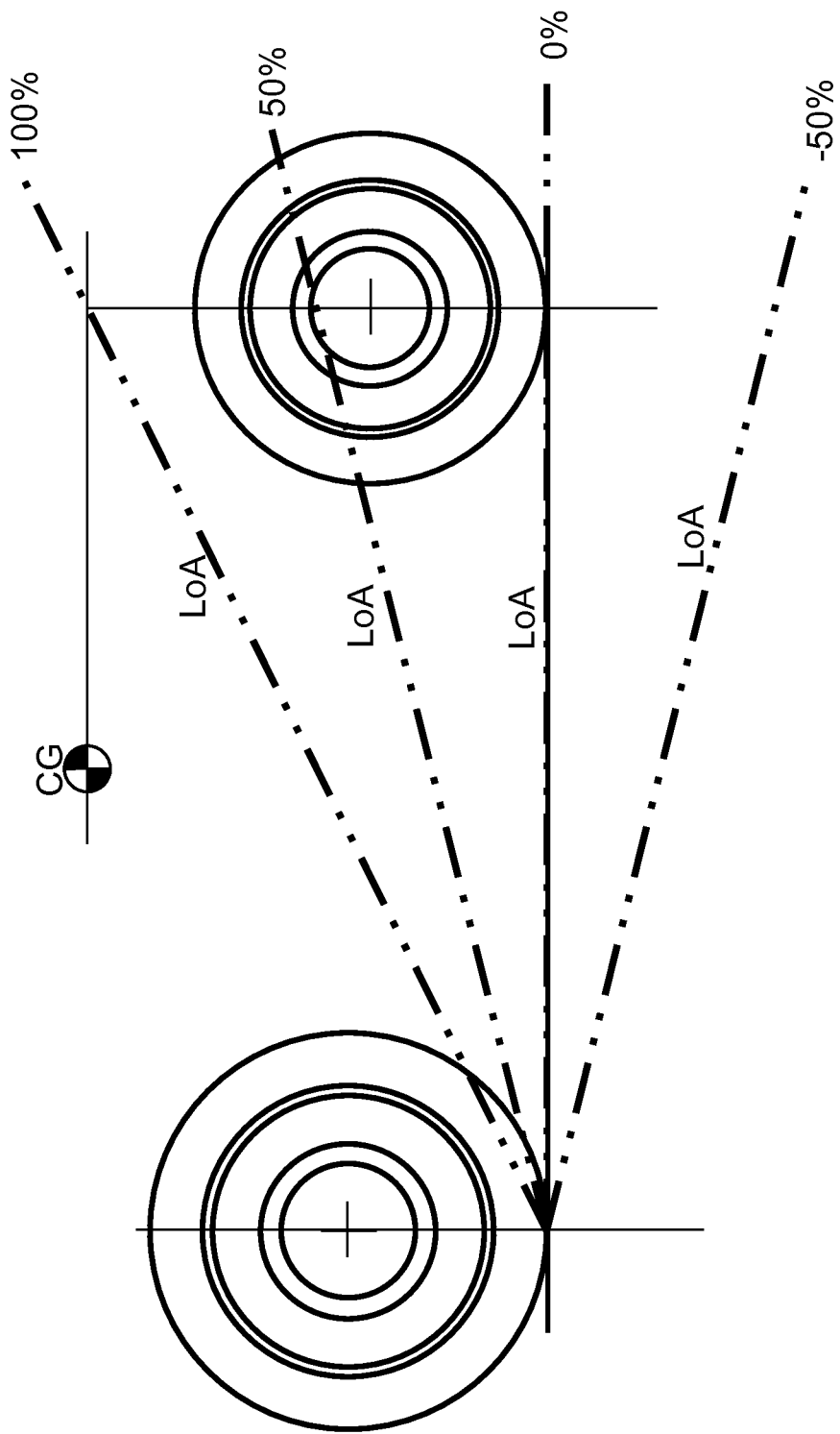
FIG. 9 is a side diagrammatic view of a prior art relationship between a vehicle's "Lines of Action" and its anti-squat and anti-rise behaviors.
Figure 10:
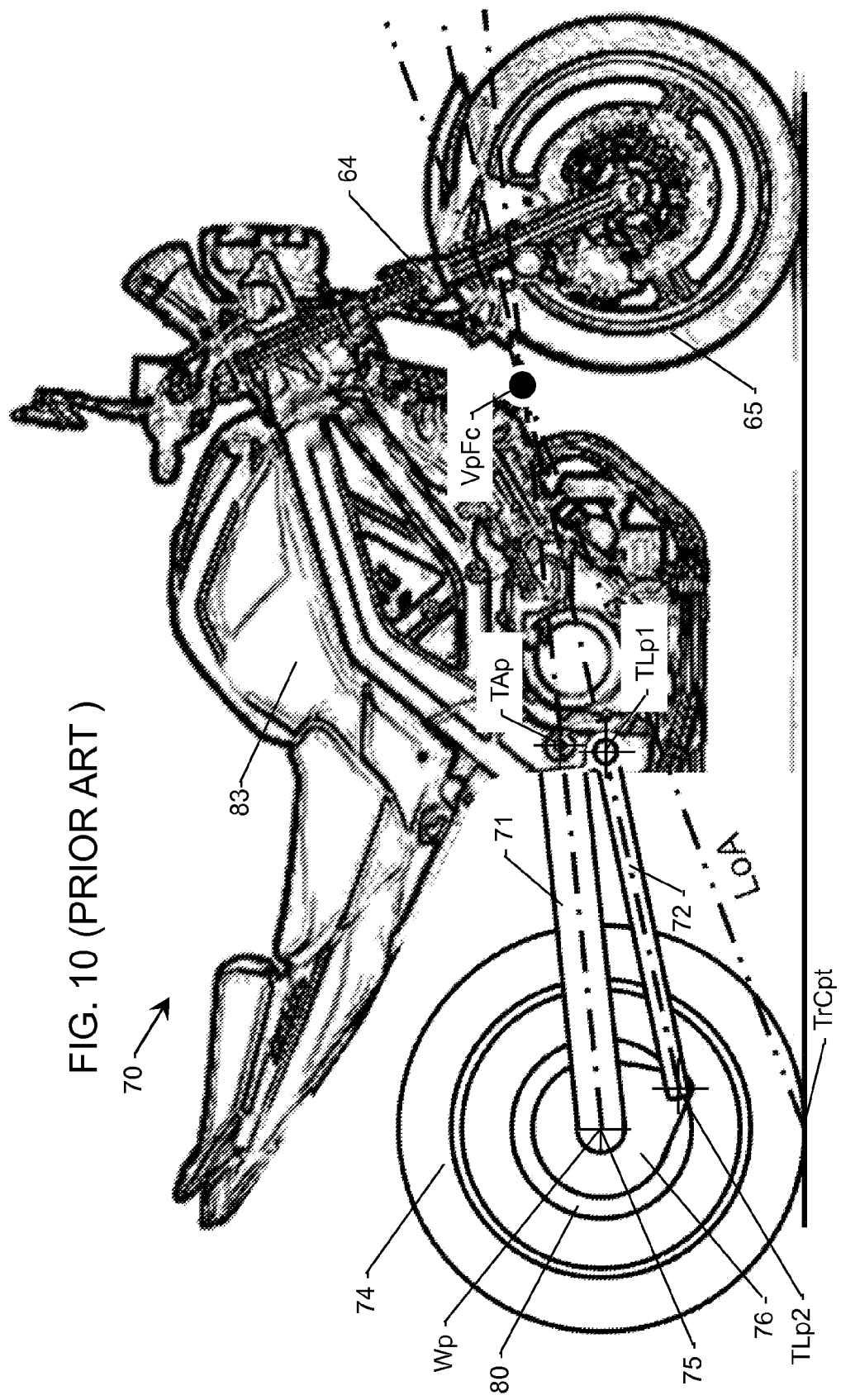
FIG. 10 is a side view of a prior art single track vehicle with a trailing arm with torque link type of rear suspension about rear axle, and showing associated "Lines of Action"
Figure 11:
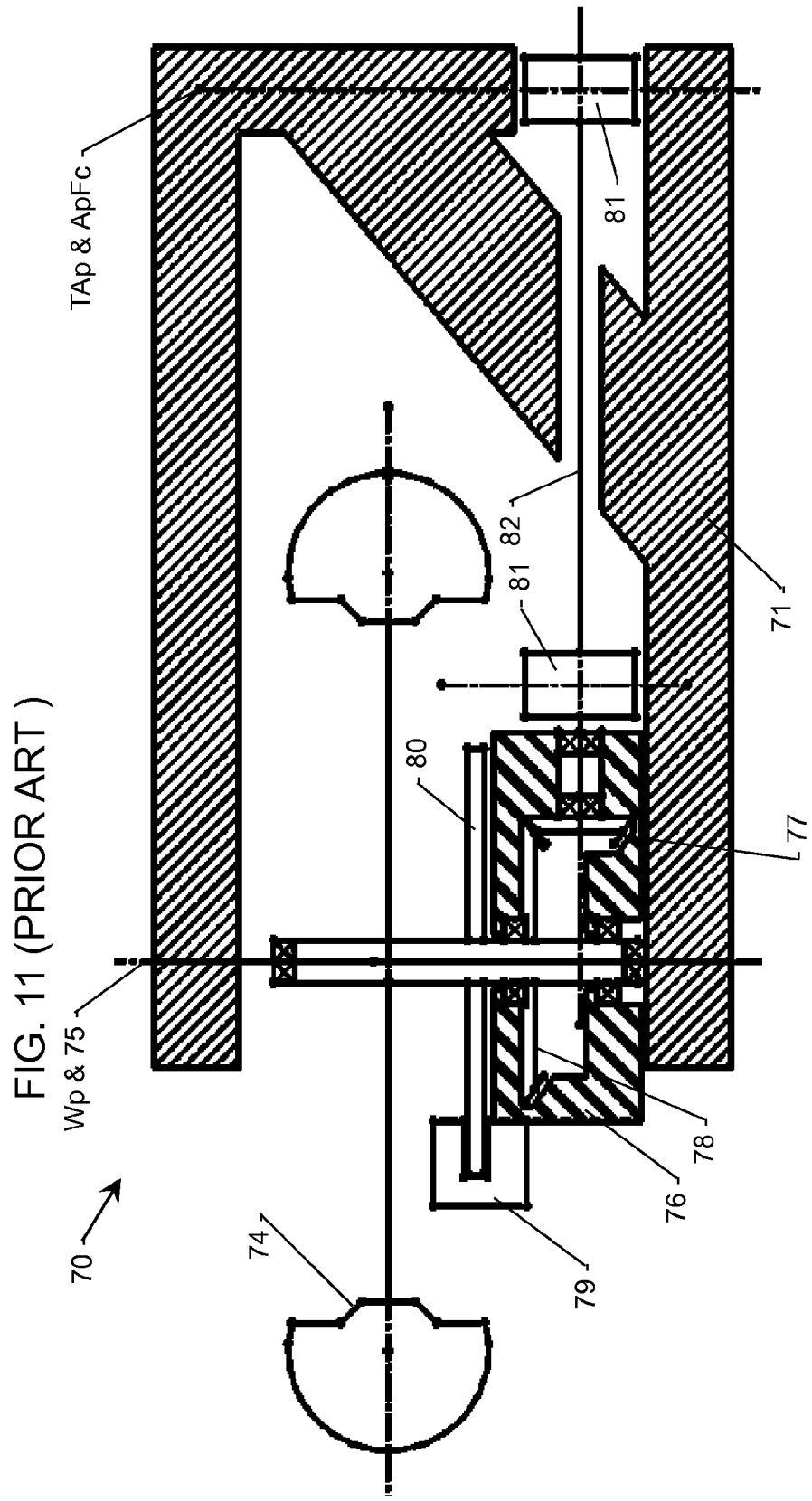
FIG. 11 is a schematic top sectional view of a prior art single track trailing arm with torque link type of rear suspension about rear axle, and with a shaft drive; similar configuration is used for known hub motor drive and floating brake suspension systems.
Figure 12:
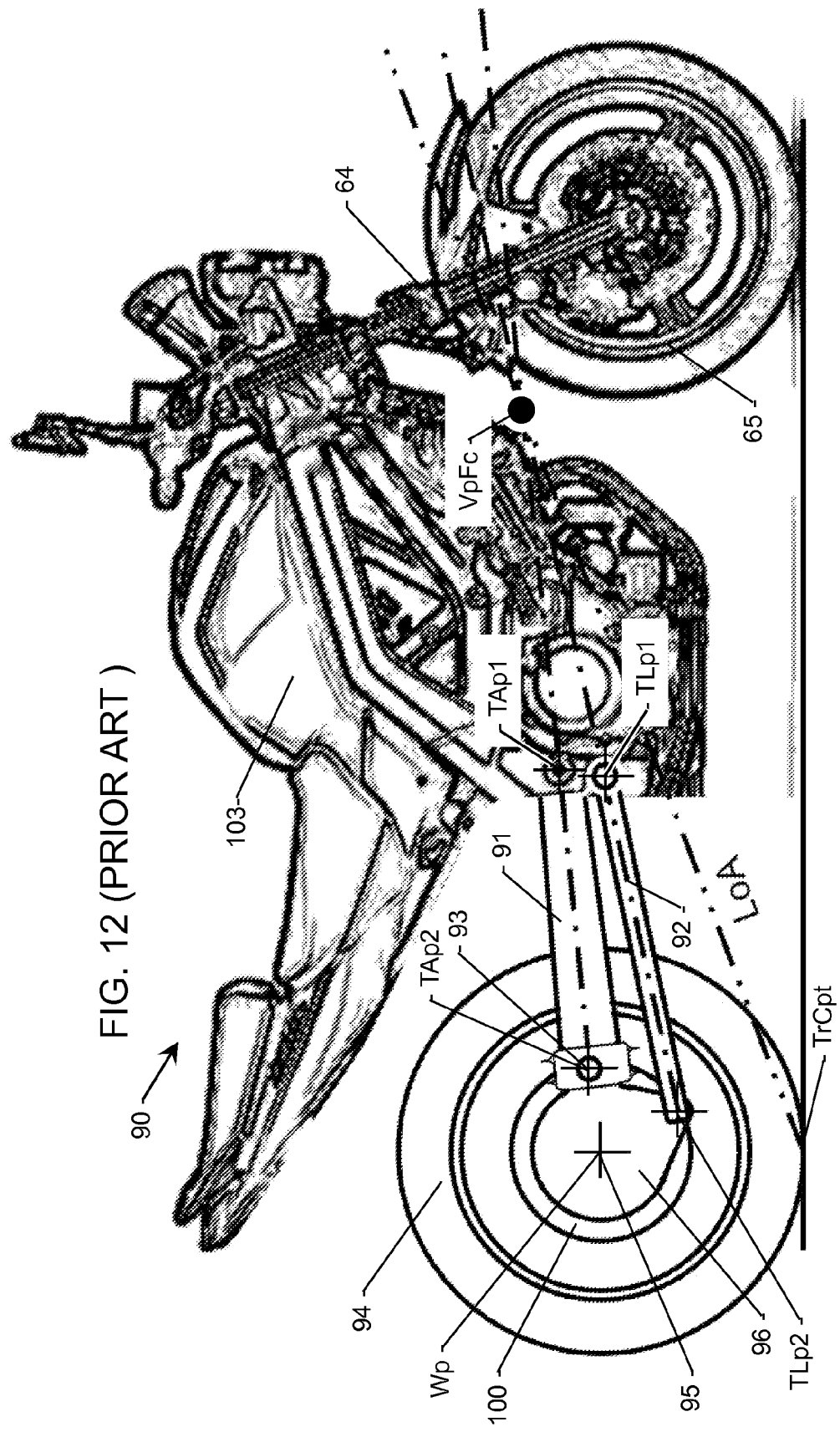
FIG. 12 is a side view of a prior art single track vehicle with a trailing arm rear suspension about arbitrary point and with a torque link, showing an associated "Line of Action"
Figure 13:
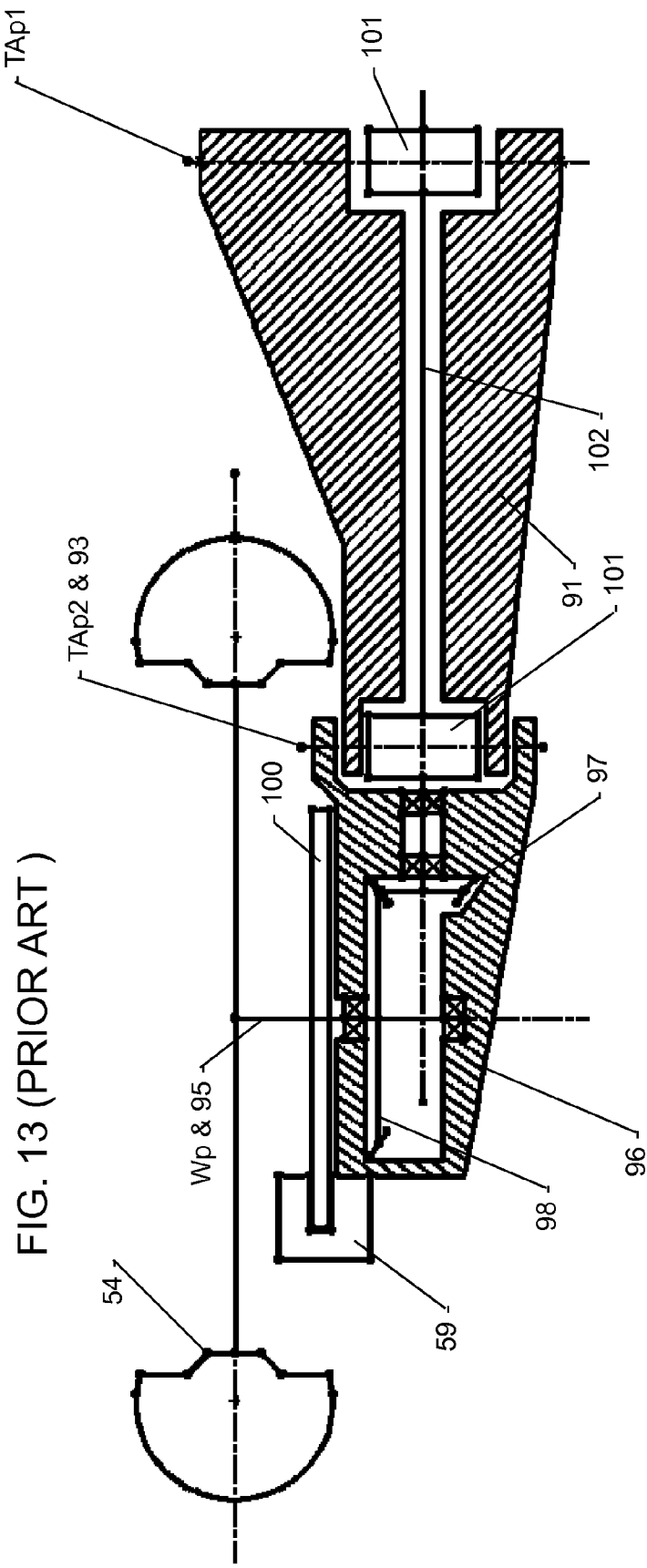
FIG. 13 is a schematic top sectional view of prior art single track trailing arm with torque link rear suspension about arbitrary point, and with a shaft drive; similar geometric configuration can be used for known hub motor and brake suspensions.
Figure 14:
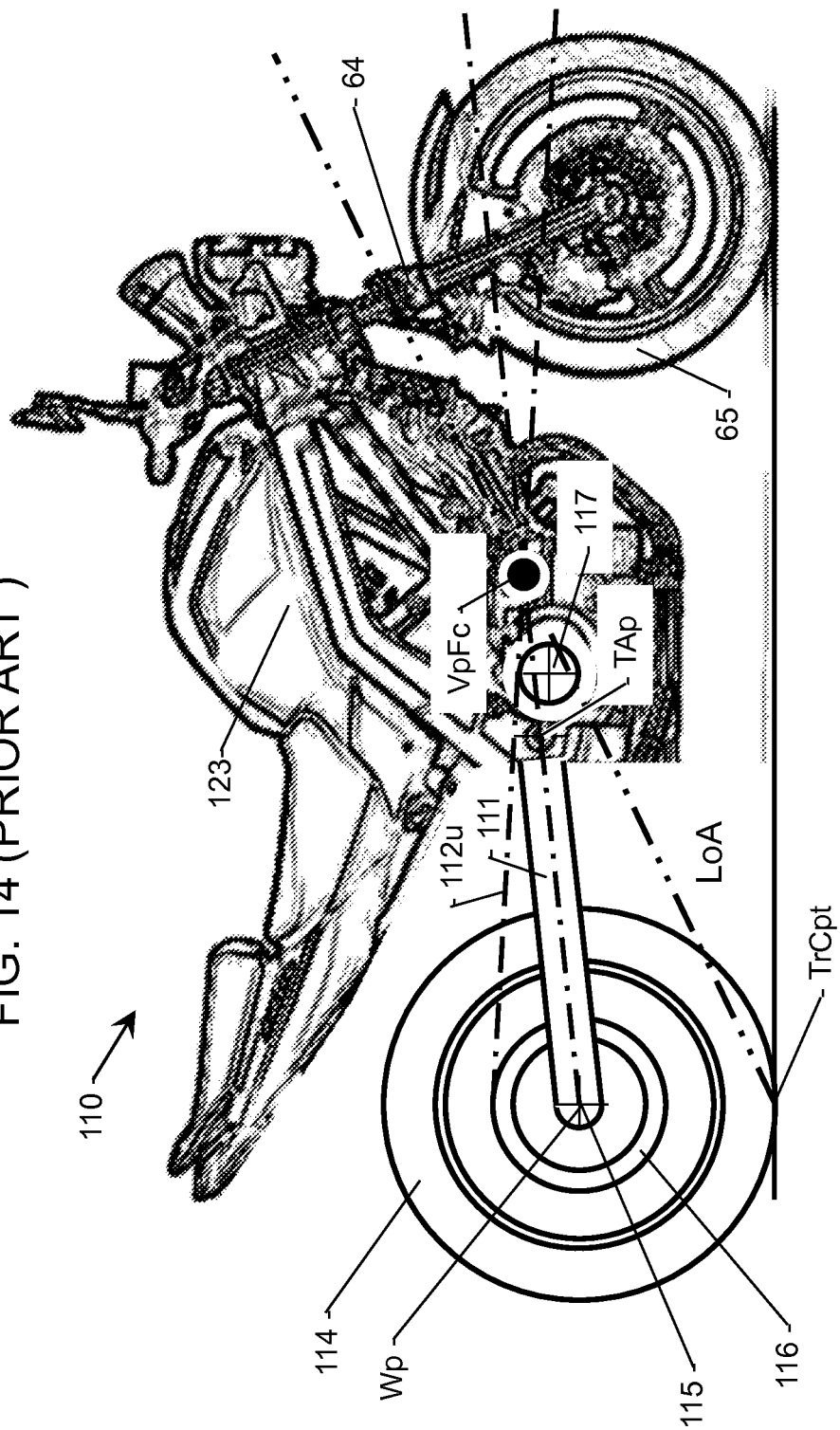
FIG. 14 is a side view prior of a prior art single track vehicle with a trailing arm rear suspension with chain drive, showing an associated "Line of Action" under acceleration (i.e., top run of drive chain in tension)
Figure 15:
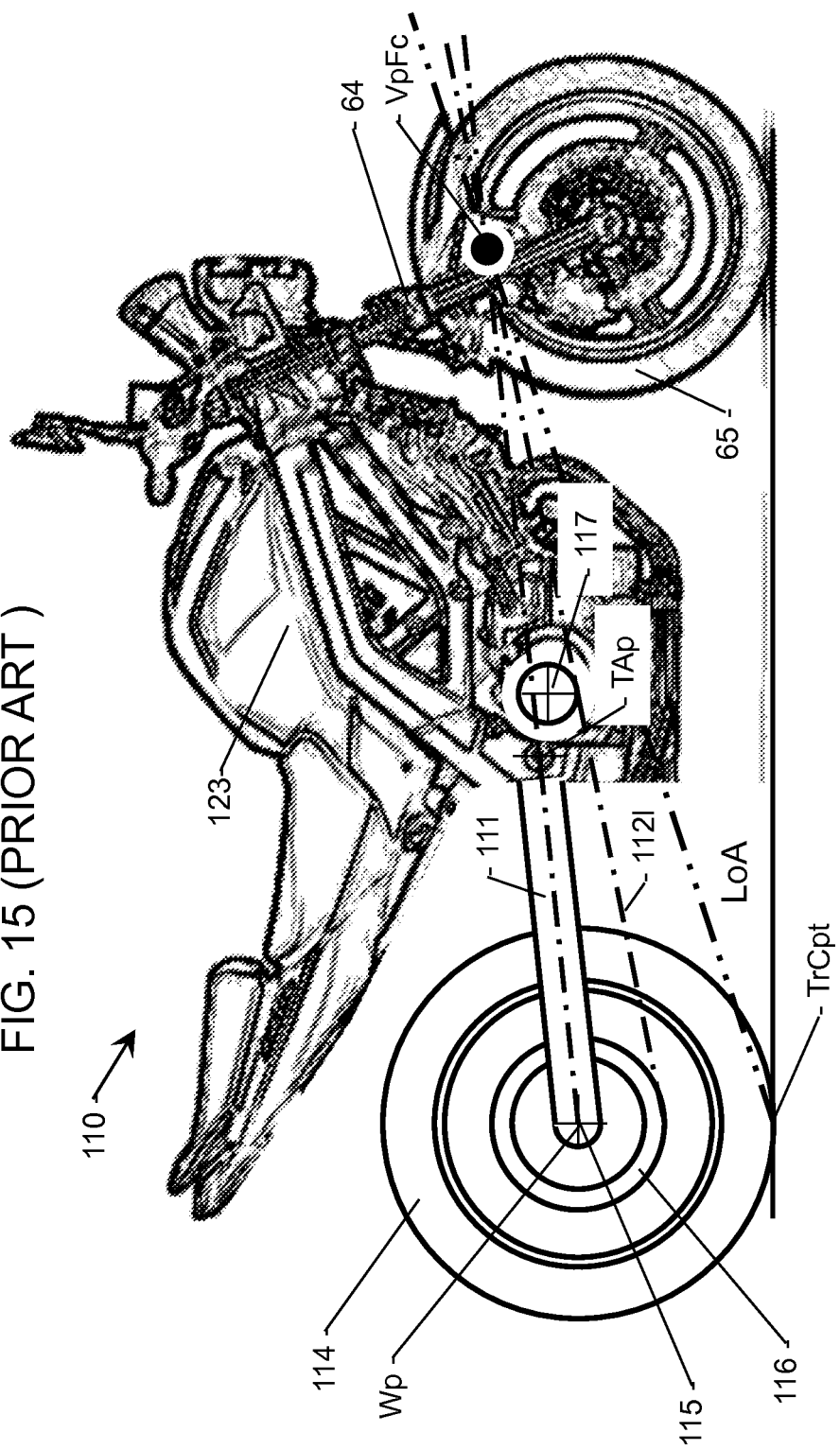
FIG. 15 is a side view of a prior art single track vehicle with trailing arm rear suspension with chain drive, showing an associated "Line of Action" under deceleration due to engine braking (i.e., bottom run of drive chain in tension)
Figure 16:
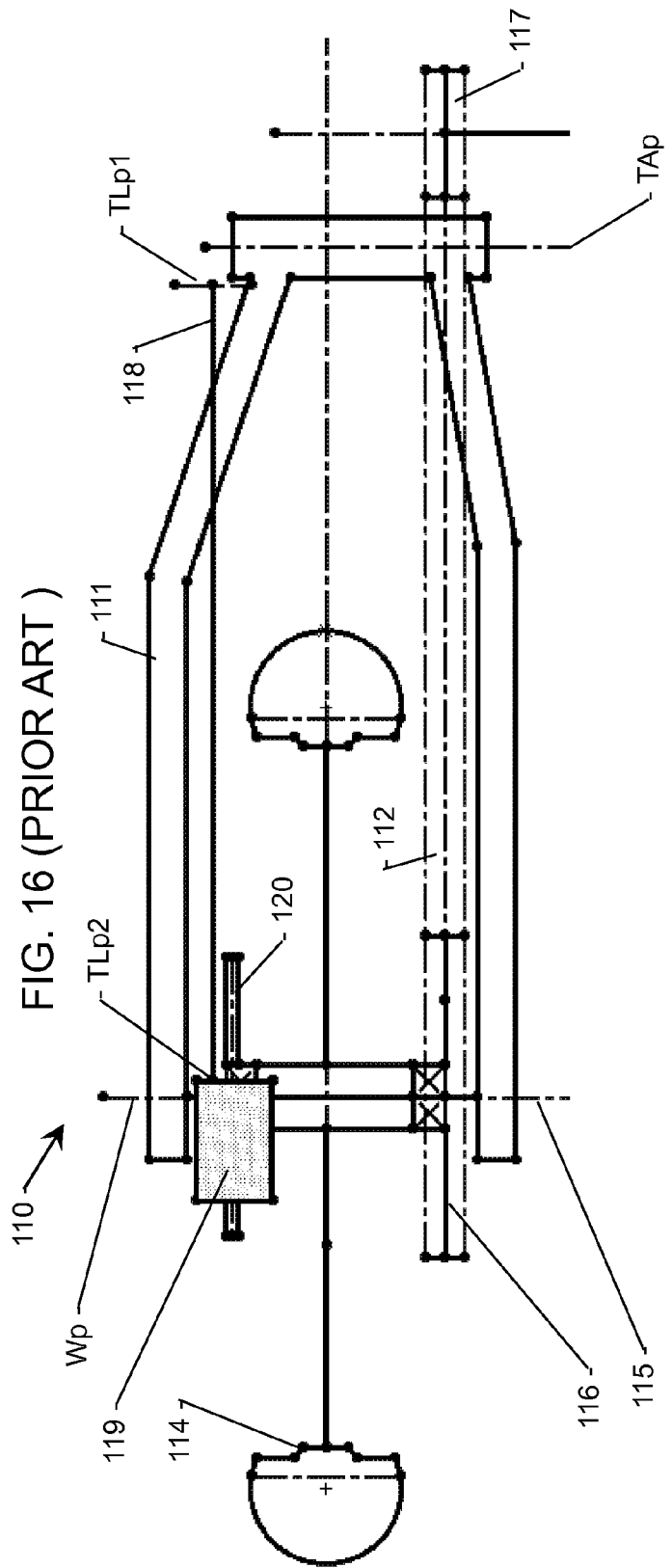
FIG. 16 is a schematic top view of a prior art single track trailing arm rear suspension with chain drive and floating brake.
Figure 17:
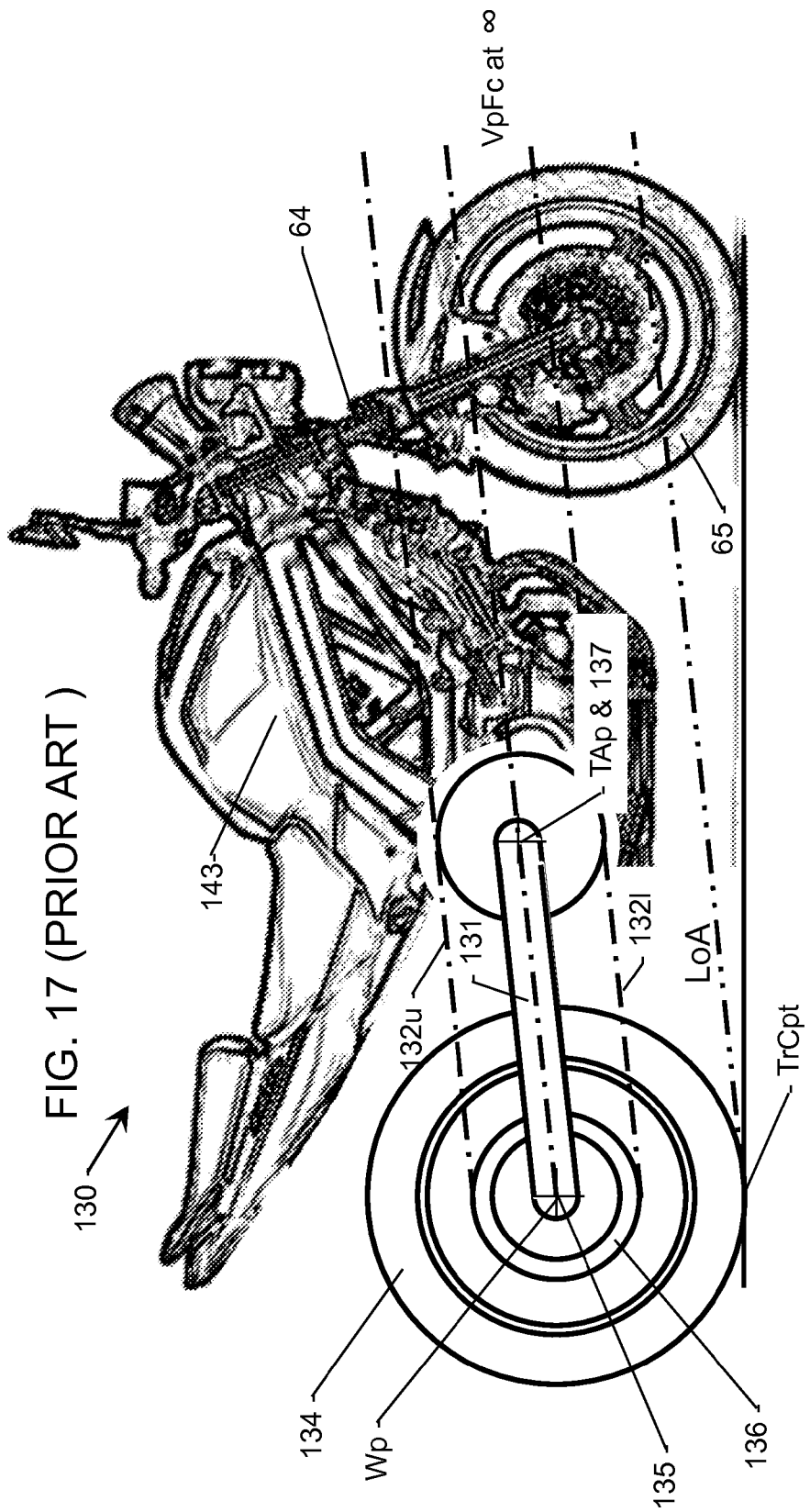
FIG. 17 is a side view of a prior art single track vehicle with a trailing arm rear suspension with a chain drive having equal-diameter driving and driven pinions coaxial with the trailing arm pivot and the rear wheel axle, respectively, and showing an associated "Line of Action"

The graphical method for determining a suspension-driveline geometry is performed in two dimensions, e.g., in a virtual digital environment. In the graphical method the step of determining a suspension-driveline geometry can be succinctly characterized as including the first step of estimating initial values for driveline-suspension design parameters (the horizontal position of the trailing arm pivot axis, the vertical position of the trailing arm pivot axis, the length of the trailing arm, and the diameter of the driven pinion—with the horizontal and vertical position of the driving pinion axis, and the driving pinion diameter, to be determined graphically. The driveline and suspension components are then located at a (first or initial) selected position and according to the estimated initial values. The next step is selecting a slope of a line of action (i.e., of a resultant force, resulting from a vehicle driving force, acting through the shared pivot axis, as illustrated in FIG. 6). The line of action is then located for the selected position of the driveline and suspension components, and a virtual pivot force center for the driveline and suspension components is determined. There follows the step of locating a chain run line.

After a first chain run line is located, the driveline and suspension components are located at an alternative selected position and according to the estimated initial values; an alternative slope of the line of action is selected accordingly, and the line of action for the alternative selected position of the driveline and suspension components is located. An alternative virtual pivot force center for the driveline and suspension components at the alternative selected position of the driveline and suspension components is then determined, followed by locating a corresponding alternative chain run line. It is noted that the foregoing steps are repeatable, such that a plurality of alternative selected drivel/suspension components preferably are taken, and a plurality of corresponding alternative pivot force centers and chain run lines generated. The two or more chain run lines are then used to determine a position and a diameter for the driving pinion. It is seen that the steps of locating driveline and suspension components at an alternative selected position, selecting an alternative slope of the line of action, locating the line of action for the alternative selected position of the driveline and suspension components, determining an alternative virtual pivot force center for the driveline and suspension components at the alternative selected position of the driveline and suspension components, and locating an alternative chain run line, can be repeated one or more times prior to a concluding main step of using the chain run lines to determine a position and a diameter for a driving pinion. The step of locating a chain run line may comprise locating an upper chain run line for a condition of vehicle acceleration.

The method can be executed such that the step of determining a driveline-suspension geometry is for determining a neutral driveline-suspension geometry which results in a substantially constant driveline-suspension coupling over the range of suspension travel, which involves selecting a plurality of equal alternative slopes of the line of action. Or, as discussed further herein, determining a driveline-suspension geometry may be for determining a stabilizing driveline-suspension geometry that results in a progressively increasing driveline-suspension coupling during suspension compression, and which involves selecting a plurality of progressively increasing alternative slopes of line of action. (Suspension compression is due to vehicle lean ("inside" suspension compresses); vehicle acceleration, from engine driving force, then provides the longitudinal force which then is coupled into the roll moment. Indeed, and as discussed further, there may be an alternative method wherein the step of determining a driveline-suspension geometry is for determining a mildly destabilizing driveline-suspension geometry, for example which results in a progressively decreasing driveline-suspension coupling during suspension compression due to vehicle acceleration, involving selecting a plurality of progressively decreasing alternative slopes of line of action.

Computational Method for Determining Driveline-Suspension Geometry for Acceleration Appendix A to this disclosure is a MATLAB® program script file which performs a two-dimensional analysis, similar to the graphical method described above, but using complex algebra. A review of the appendices discloses to one skilled in the art the fundamental methodology of the computational method. By way of summary, in a first embodiment of the computational method, the first step for determining a driveline-suspension geometry is the selecting values for an initial set of driveline-suspension design parameters. The driveline and suspension components are then located at an initial position and according to the initial set of driveline-suspension design parameters, which permits computing algebraically (e.g. with a digital computer) a calculated location of an initial line of action of a resultant force, resulting from a vehicle driving force acting through the shared pivot axis (as seen generally in FIG. 6), and corresponding to the initial position of the driveline and suspension components. The driveline and suspension components are then located at a plurality of alternative positions and according to the initial set of driveline-suspension design parameters, which in turn again permits the computing, algebraically, of a plurality of calculated locations of alternative lines of action of a resultant force, resulting from a vehicle driving force acting through the shared pivot axis, and corresponding to each of the plurality of alternative positions of the driveline and suspension components. Values for an alternative a set of driveline-suspension design parameters are then selected to optimize the variation between the calculated locations of the initial and alternative lines of action.

The step of selecting values for an alternative set of driveline-suspension parameters may further include the step of optimizing at least one design parameter value to minimize variation in the calculated locations of the initial and alternative lines of action. This method may include the finer steps of selecting an initial desired slope of the initial line of action, selecting alternative desired slopes of the alternative lines of action, computing algebraically calculated slopes of the initial and alternative lines of action; and calculating at least one error between at least one of the desired slopes of the lines of action and at least one of the calculated slopes of the lines of action. At least one design parameter value can then be optimized to minimize the at least one error.

In an alternative version of the computational method, the step of determining a driveline-suspension geometry comprises the steps of: (a) selecting values for an initial set of driveline-suspension design parameters; (b) locating driveline and suspension components at an initial position and according to the initial set of driveline-suspension design parameters; (c) selecting an initial desired slope of a line of action of a resultant force, resulting from a vehicle driving force, acting through the shared pivot axis (see FIG. 6) and corresponding to the initial position of the driveline and suspension components; (d) computing algebraically an initial calculated slope of a line of action corresponding to the initial position of the driveline and suspension components; (e) calculating an error between the initial desired slope of a line of action and the initial calculated slope of a line of action; (f) locating driveline and suspension components at an alternative position and according to the initial set of driveline-suspension design parameters; (g) selecting an alternative desired slope of a line of action of a resultant force, resulting from a vehicle driving force, acting through the shared pivot axis and corresponding to the alternative position of the driveline and suspension components; (h) computing algebraically an alternative calculated slope of a line of action corresponding to the alternative position of the driveline and suspension components; (i) calculating an error between the alternative desired slope of a line of action and the alternative calculated slope of a line of action; and (j) selecting values for an alternative a set of driveline-suspension design parameters to minimize the errors between the desired slopes of a line of action and the calculated slopes of a line of action. Similarly to the graphical method, steps (g) through 16(i) can repeated any number of times, prior to the basic step (j).

With slight modifications available to a person skilled in the programming arts, this MATLAB file can optimize any of the design parameters for minimizing the variation in DSCC or to minimize the error to a desired DSCC or to minimize the error to a desired DSCC as a function of suspension position. When minimizing the variation in DSCCC, there is no desired DSCC per se, rather what is sought is that the difference between all of the measured DSCC at the different suspension travel locations has the least variation, or the least difference, between them. This difference thus is not between a desired and an "actual" (calculated), but is just between the range of actuals. There are slightly different methods to determine the magnitude of this variation over the suspension travel range of interest; such as peak to peak, or maximum difference from an average, or by a standard deviation, or even to weight the differences depending on which suspension positions could be expected to see the most use, etc. In the MATLAB script file, therefore, one of the inputs is the range of suspension travel and another is the number of points of interest. The MATLAB program calculates the DSCC for each initial and alternative suspension position of interest, and then determines a magnitude of variation between these alternatives. The standard deviation is used in the program file of the Appendix. MATLAB also has other methods to determine the magnitude of variation, including peak to peak, which are easily implemented in the MATLAB file.

To minimize the error to a desired DSCC, it is desired that the DSCC is constant over the range of suspension travel. The error is then the actual calculated DSCC for a given suspension position compared to the desired constant DSCC. For each point of interest this error is calculated. As with the above discussion, there are many ways to calculate the cumulative error for the set of calculated positions: peak to peak, standard deviation, and others, over the range of suspension travels of interest.

Or, in the case of to minimizing the error to a desired DSCC as a function of suspension position, the goal is that the DSCC has a different value for a given suspension position. In the MATLAB file, it is desired that the DSCC has a value of 0.35 at full droop (suspension in full extension) and a value of 0.45 at full bump (suspension full compressed). Between these extremes, it is desired that the DSCC varies as a linear function from 0.35 to 0.45, that is, at ride height (evenly spaced between full droop and bump) the desired DSCC preferably would be 0.40. The error for a given suspension position is calculated by determining the actual DSCC for the given suspension position, which error value is compared to the desired DSCC for that given suspension position. Once again, a cumulative error is calculated based on some combination of the set of errors for each measured suspension position.

For example, to run and optimize the files in the appendices in the MatLab® computing environment, it only needs two lines, namely:

```
(line 1)>> inputParameter2Optimize0 = [50.7578 12.4088]
(line 2)>>
    p2out=fminsearch('ChainBrake_function_revC',inputParameter2Optimize0)
```

It is within capability of one skilled in the art, having reference to the present disclosure, to run and modify the MatLab® files to optimize any of the design input parameters based on any of the error function defined in the files. But by way of added explanation, and using the MatLab script files from the appendix, an example is offered for a chain drive embodiment:

In the script file a nominal design is defined (using the file from Appendix A as an example),

```
% nominal inputs at Ride Height **************************************
wb = 67; % 70;                  % wheel base length
lswm=24.0; %24;                 % trailing arm length
delTaWT=10.5;                   % rear vertical wheel travel from ride height
npts=51;                        % number of test points
p1height=11.0+1.215;            % trailing arm pivot height
p2=49+j*12;                     % front sprocket center locat. from front wheel axle
                                    on ground
p4In=wb+0j;                     % rear wheel axle {this should be contact point} on
                                    ground initial point
chainPitch=0.75;
r1m=chainPitch/(2*sin(pi/18));      % front sprocket radius
r2m=chainPitch/(2*sin(pi/42));      % rear sprocket radius
```

For the file in Appendix A, the file is set up to optimize the driving pinion location, point p2 [note, horizontal is a real number, vertical is an imaginary number using j=sqrt(−1)]. The input to this script file is from the MatLab optimization routine (fminsearch) which will decide a new value to try as the input to the error function (i.e. inputParameter2Optimize). This script file (in the appendix) takes the new input from the optimization function, and then calculates the error based on this input over the range of suspension travel (±delTaWT=10.5, for a total travel of 21 inches). For the Appendix A file, the error (output of the script file to the MatLab optimization routine) is

```
error=abs(std(AccelLiftCoef)) % this error function is used to minimize
the standard deviation of the AccelLiftCoef
```

Using the above error function will minimize the standard deviation of the AccelLiftCoef (the DSCC for the chain drive acceleration case) over the range of suspension travels as defined in the beginning of the script file. For a more complex analysis, where it is desired to minimize the error for a variable set of DSCC which is a function of suspension travel, the error function below could be used:

```
error=abs(mean(abs(AccelLiftCoef − interp1([−11,11], [.35,.45],
deltaWTv))))
% this error function can be used to
    % minimize the error of AccelLiftCoef and a linear function of
0.35 at −11 inch travel (full droop) and
    % 0.45 at +11 inch travel (full bump)over the suspension travel
and .35 at −11 inch suspension travel
    % over the range of suspension travel
```

The error function used by the script function is the last error function which defines the variable "error". So, for the Appendix A code, the more complex error function is used. To use the simpler error function, the following error function definitions are commented out by using a leading % (the comment symbol used by MatLab®). This results in the MatLab script file ending as:

```
% error=ones (1,errn)*((p9mean−imag(p9)).^2);
% AccelLiftCoef=-imag(p4−p8)./real(p4−p8);
% DeccelLiftCoef=imag(p4−p17)./real(p4−p17);
% error=norm(AccelLiftCoef)/sqrt(length(AccelLiftCoef))
error=abs(std(AccelLiftCoef)) % this error function is used to minimize the
standard deviation of the AccelLiftCoef
% error=abs(std(DeccelLiftCoef)) % this error function is used to minimize
the standard deviation of the DeccelLiftCoef
% error=abs(mean(abs(AccelLiftCoef − .4269*ones(size(deltaWTv))))) % this
error function can be used to minimize the error
    % between AccelLiftCoef and 0.4269 over range of susp. travel
% error=abs(mean(abs(AccelLiftCoef −interp1([11,11],
    [.4269,.4269],deltaWTv)))) %
% error=abs(mean(abs(AccelLiftCoef − interp1([−11,11],[.35,.45],deltaWTv))))
% this error function can be used to
    % minimize the error of AccelLiftCoef and a linear function of
0.35 at −11 inch travel (full droop) and
    % 0.45 at +11 inch travel (full bump)over the suspension travel
and .35 at −11 inch suspension travel
    % over the range of suspension travel
```

To run the optimization in MatLab® from the MatLab computing environment, first the input which is being optimized is defined:

>>inputParameter2Optimize0=[50.7578 12.4088]

Then a MatLab optimization function (for example the 'fminsearch' function is used to optimize the driving pinion location point p2)

>>p2out=fminsearch('ChainBrake_function_revC', inputParameter2Optimize0)

This will then use the standard MatLab fminsearch function to optimize the point p2 using the error as defined in the function 'ChainBrake_function_revC', resulting in:

```
error =
    0.0087
AveAccelLiftCoef =
    0.3987
p2out =
    51.2603   12.0626
```

Accordingly, this new point p2 has been optimized to minimize the error of the DSCC (AccelLiftCoef) over the suspension travel range of −11 inch to +11 inch, with the desired AccelLift Coef as a linear function of suspension travel between 0.35 at −11" travel to 0.45 at +11" travel.

Graphical Method for Engine Braking

A method similar to that above, for the chain drive during acceleration, can be used to analyze and to optimize the driveline-suspension geometry for conditions of engine braking. The main distinction is that the lower chain run (1744*l*) is used to determine an optimal position for the chain idler 1763. This is complicated somewhat by the fact that the chain idler 1763 needs to move to compensate for changes in the chain path length as the suspension moves, because the driving pinion is not located coaxially with the trailing arm pivot axis. Nevertheless, methodology described hereinabove for the acceleration condition for a chain drive, in combination with this disclosure generally, is adaptable to the condition of engine breaking Computational Method for Engine Braking Appendix B to this disclosure is a MATLAB program script file which performs a two-dimensional planar analysis, using complex algebra, for the chain drive engine braking case. With slight modifications available to a person skilled in the programming arts, this MATLAB file can optimize any of the described design parameters for minimizing the variation in DSCC or to minimize the error to a desired DSCC, or to minimize the error to a desired DSCC as a function of suspension position. Additional MATLAB script files are provided for determining the chain idler position as a function of suspension position, which could be used separately or combined with the geometry optimizing script file.

Graphical Method for Service Braking

A modestly modified alternative version of the graphical method can be used to analyze and to optimize the driveline-suspension geometry for the service braking case. Instead of a tensioned chain interfacing tangentially with two pinions, the rear service brake torque link 1814 is mounted between two pivots (FIG. 24B), one on the vehicle chassis at the chassis rear brake stay mount 1816 position (FIG. 24B), and the other pivot on the rear brake caliper floating mount 1812 (FIG. 23B). This configuration alters the design parameter list from the list provided hereinabove for the chain drive case. The design parameters for the service brake case are then: (1) the horizontal position of the trailing arm pivot axis 1512 (also TAp in FIG. 23B); (2) the vertical position of the trailing arm pivot axis 1512 (TAp); (3) the horizontal position of the mount 1816 (at TLp1 in FIG. 23B) connecting the brake torque link to the vehicle chassis; (4) the vertical position of the mount 1816; (5) the length of the brake torque link 1814; (6) the length of the trailing arm 1510; and (7) the length (between Wp and TLp2, see FIG. 23B) of the rear brake caliper floating mount 1812; and (8) the wheel diameter. An approximate but suitable method for determining a solution for this geometry is to assume that the rear brake torque link 1814 is tangent to a circle concentric with the rear wheel (1550) and having a radius equal to the effective length of the rear brake caliper floating mount 1812. The chassis rear brake stay mount 1816 position (TLp1) is that point closest to the intersections of the set of analytical lines representing the rear brake torque link at different positions (as the floating mount 1812 moves pivotally). Similarly, the effective length of the rear brake torque link 1814 can be assumed to be the mean length of the set of lines representing the rear brake torque link positions between the chassis rear brake stay mount 1816 position and the tangent point on a circle definable by the rotation of rear brake caliper floating mount 1812. After this geometry has been determined and these points and lengths are known, the range of DSCC values can be graphically determined for the range of suspension motion. Slight adjustments may be made to the geometry to minimize the roll moment applied to the sprung mass created by the DSC.

Computational Method for Service Braking

Appendix C of this application is a MATLAB® program script file which performs a similar planar analysis, using complex algebra, to solve and to optimize the geometry of the trailing arm with torque link rear suspension about the axle as taught in FIGS. 23A-24B. With slight modifications, this MATLAB file can optimize any of the design parameters for minimizing the variation in DSCC, or to minimize the error to a desired DSCC, or to minimize the error to a desired DSCC as a function of suspension position.

Description of a Second Embodiment

Components of the nominal vehicle and second embodiment are similar to those of the first embodiment and are identified using similar but series-2 label numerals:
330 chain driven trailing arm rear suspension on a narrow leaning commuter vehicle with stabilizing geometry
2323 motorcycle sprung mass 2323
2510 trailing arm 2510
2512 trailing arm pivots 2512
2550 rear wheel 2550
2552 wheel 2552
2554 tire 2554
2556 rear axle 2556
2558 driven pinion (sprocket) 2558
2560 brake disc 2560
2610 driving pinion (countershaft sprocket) 2610
2700 final drive assembly 2700
2710 differential 2710
2742 final driving pinions 2742
2744 chain upper run 2744*u*, lower run 2744*l*
2763 chain idler 2763
2810 brake caliper 2810
2812 rear brake caliper floating mount 2812
2814 brake torque link 2814
2816 chassis rear brake stay mount 2816

FIG. 19B presents the second embodiment of an apparatus according to the present disclosure with stabilizing geometry during acceleration while the vehicle is cornering. In this embodiment, instead of designing a constant driveline suspension coupling coefficient (DSCC) over the range of suspension travel, the DSCC is designed to increase as the suspension is compressed during acceleration. Consequently, the DSCC is higher for the inside wheel during cornering and provides increased lift acting in the tire contact point vertical plane, compared to that of the outside wheel, when both wheels are provided equal driving force. This increased lifting force acting through the inside wheel provides a roll moment which reduces the vehicle roll angle. This is expressed by the vehicle reducing lean angle as the driver accelerates out of a turn, requiring slightly less counter steering by the driver. (It is recalled that a neutral stability system does not supply any significant roll moment onto the vehicle when accelerating out a corner, while an unstable geometry increases the lean angle during acceleration out of a corner.)

Figure 25:
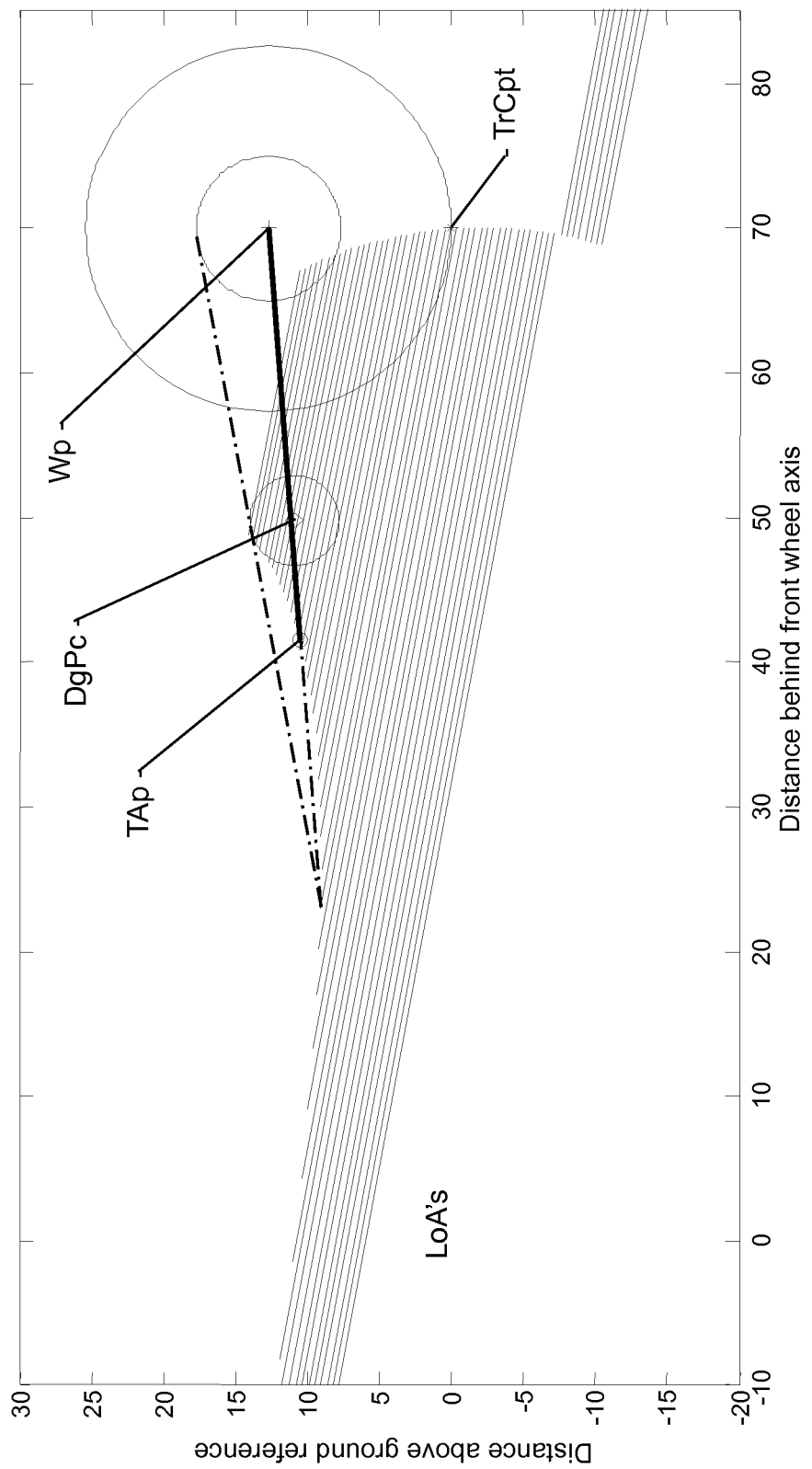
FIG. 25A is a diagrammatic side view of the second embodiment (stabilizing geometry) driveline and trailing arm geometry, shown at ride height during acceleration, and showing various alternative lines of actions for a range of suspension displacements.
FIG. 25B is a graph of the driveline suspension coupling coefficient (DSCC), versus wheel displacement from ride height, for acceleration of the second embodiment with stabilizing geometry according to the invention and over the range of suspension travel.
FIG. 25C is a graph of the normalized vehicle applied roll moment, versus vehicle lean angle, due to drive force coupling in the second embodiment according to the invention and over the range of vehicle lean angles to a side.
FIG. 25D is a graph of the driveline suspension coupling coefficient (DSCC), versus vehicle lean angle, for braking in the second embodiment with stabilizing geometry according to the invention and over the range of suspension travel.
FIG. 25E is a graph of the normalized vehicle applied roll moment, versus vehicle lean angle, due to drive and suspension force coupling due to braking in the second embodiment with stabilizing geometry according to the invention and over the range of vehicle lean angles to side.
Figure 25:
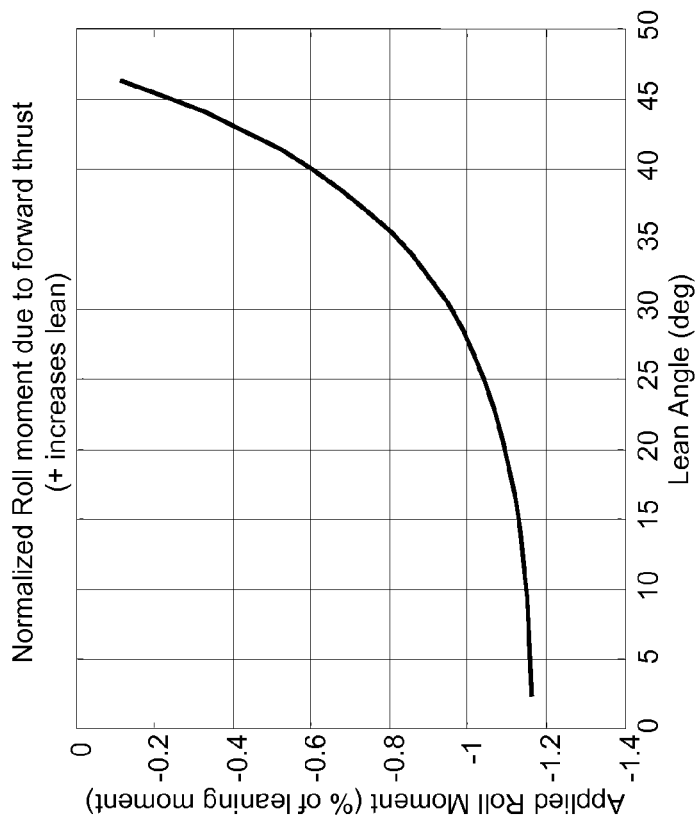
Figure 25:
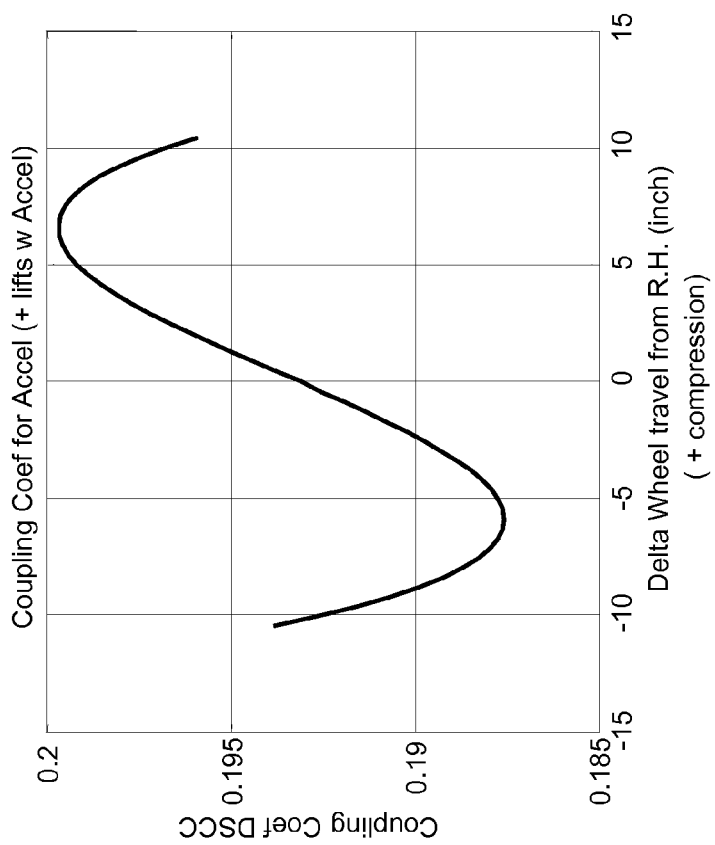
Figure 25:
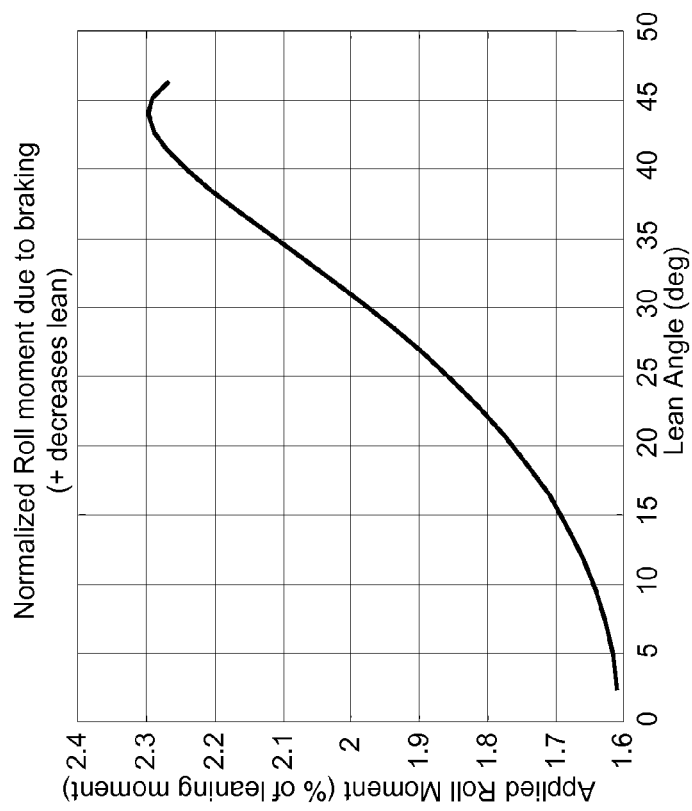
Figure 25:
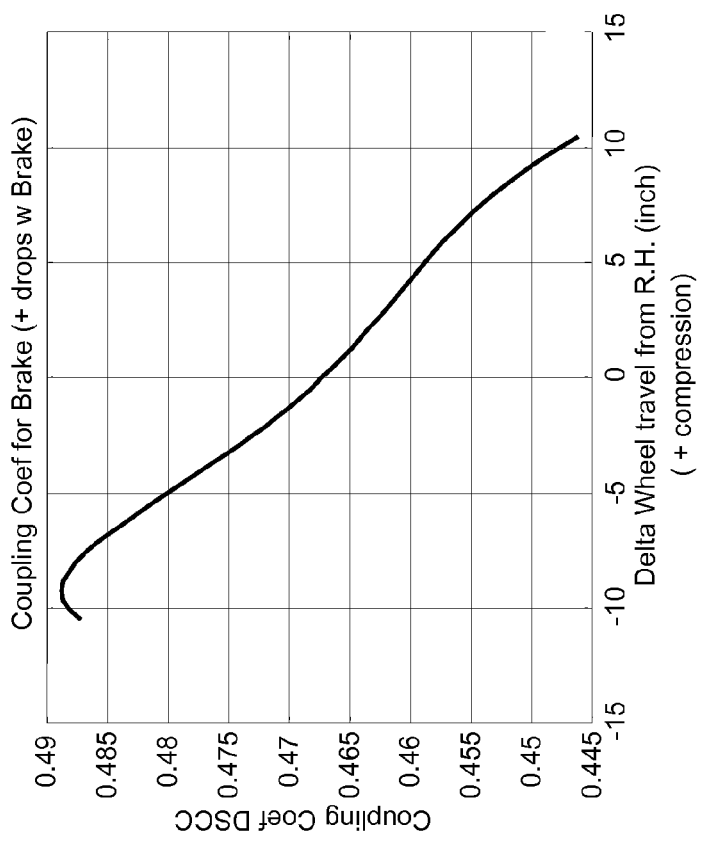

FIG. 25A is a graph of the driveline and suspension geometry for the second embodiment of an apparatus and method according to this disclosure. The stabilizing geometry is at ride height, and there is illustrated a set of lines of action (LoAs) for the range of suspension travel. FIG. 25A thus is similar to FIG. 21C for the first embodiment, except that the trailing arm pivot (2512) on the vehicle chassis and sprung mass (2323), and the differential (2710) axis location have been slightly altered using a computational method for optimizing a stabilizing geometry during acceleration. Although slightly difficult to perceive due to the size and pixilation of the figure, the LoAs have a steeper slope as the suspension travels into compression. FIG. 25B, which plots the DSCC for this geometry, shows the results of this change in LoA slope with a larger DSCC in suspension compression than in extension. FIG. 25C graphically illustrates the affects of this geometry change in the normalized roll moment due to forward thrust, with a negative normalized roll moment over the range of vehicle roll angles. This negative roll moment tends to reduce the roll angle of the vehicle as the vehicle accelerates during cornering, as discussed above for a stabilizing geometry.

In a similar fashion, also using a computational method, the geometry of the braking system in this second embodiment can be adjusted to provide a stabilizing roll moment during braking Reference is made to FIG. 25D, which plots the DSCC as a function of suspension position for such a geometry, and which has a decreasing braking DSCC as the suspension is compressed. For braking the DSCC decreases for a stabilizing geometry, as compared to the acceleration case DSCC, since braking forces are opposite to acceleration forces when acting on the vehicle. Therefore for this stabilizing geometry in braking, the DSCC is required to increase during suspension extension, opposite to that required for stabilizing geometry for acceleration.

FIG. 25E presents the normalized roll moment due to braking for this geometry, with a positive roll moment acting to decrease vehicle lean angle. In this figure, FIG. 25E, the average normalized roll moment is 2% positive, compared to that presented in FIG. 23E which is close to 0%.

Structure and Functionality of the Second Embodiment:

Except for the slight change in geometry affecting the vehicle roll stability, the structure and components of the second embodiment are very similar to the structure and components of the first embodiment, and helpful reference may be had to the drawings of the first embodiment structure to obtain an understanding of the structure of the second embodiment.

Operation of Second Embodiment:

The operation of the second embodiment differs slightly from that of the first, because the stabilizing geometry requires less counter-steer by the driver to exit a corner during vehicle acceleration. As discussed in the prior art, a single track vehicle requires counter-steering to enter and exit a corner. On corner entrance, the driver needs to turn the front wheel away from the corner direction to initiate a lean angle before turning into a corner, hence the term counter-steering. For the driver to exit a corner, counter-steering is required to straighten the vehicle up (toward true vertical), and the driver must turn more into the corner to move the wheels back under the vehicle's center of gravity. With stabilizing geometry, less counter-steering action is required by the driver to straighten up the vehicle while exiting a corner, because the driveline suspension coupling with stabilizing geometry provides some roll moment to help straighten up the vehicle.

Method of Use of Second Embodiment:

Graphical Method for Acceleration and Braking

In the first embodiment, a constant DSC was desired from the geometry over the range of suspension travel. In this second embodiment, an increasing DSC is desired for the acceleration case, while a decreasing DSC is desired for the braking case (as the suspension is compressed). The graphical method for determining the desired geometry during acceleration is extremely similar to the first embodiment case, except that instead of drawing parallel lines of action (LoAs) associated with each of the different alternative suspension positions, the LoAs of the second embodiment have progressively increasing slopes as the suspension is compressed. The graphical method for determining the desired geometry during braking is also very similar to the first embodiment case, except that instead of drawing parallel LoAs pertaining to the different alternative suspension positions, the LoAs of the second embodiment have progressively decreasing slopes as the suspension is compressed. Before the design method is initiated to determine driveline-suspension geometry, the increase in DSC for acceleration and the decrease in DSC for braking as a function of a particular vehicle's suspension travel must be determined. Either vehicle simulation or vehicle testing, or both, is useful in determining the change in DSC and the amount of stabilizing roll moment provided by the suspension during acceleration or braking. The observed change in DSC may then be used to ascertain the progressive increases/decreases in the DSCC.

Computational Method for Acceleration and Braking

As discussed in the first embodiment, MATLAB program script files are provided in the appendices for the acceleration and braking cases. With slight modifications available to a person of ordinary skill in the programming arts, these MATLAB files can optimize any of the design parameters for (A) minimizing the variation in DSCC, or to (B) minimize the error to a desired DSCC, or to (C) minimize the error to a desired DSCC as a function of suspension position. Options A and B are best suited to determining the neutral stability geometry of the first embodiment. Option (C) is well-suited to determining the stabilizing geometry of this second embodiment. To employ the MATLAB file in this way, a matrix is created with the suspension travel as a first column and the desired DSCC as the second column, with the rows ordered from smallest suspension travel to largest suspension travel. The MATLAB file then determines error based on the calculated DSCC for a given suspension travel compared to the desired DSCC for that suspension travel. The standard MATLAB function "fminsearch" is then executed to optimize the geometry to minimize the error over the range of suspension travel. It should be noted that other commercially available analysis methods or programs such as MATHEMATICA® program may also be used.

Description of Third Embodiment

Components of the nominal vehicle and third embodiment are similar in many respects to those of the first embodiment and are identified using similar, but series-3 numerals:

340 chain driven trailing arm rear suspension on a narrow leaning commuter vehicle with mildly destabilizing geometry
3323 motorcycle sprung mass 3323
3510 trailing arm 3510
3512 trailing arm pivots 3512
3550 rear wheel 3550
3552 wheel 3552
3554 tire 3554
3556 rear axle 3556
3558 driven pinion (sprocket) 3558
3560 brake disc 3560
3610 driving pinion (countershaft sprocket) 3610
3700 final drive assembly 3700
3710 differential 3710
3742 final driving pinions 3742
3744 chain upper run 3744$u$, lower run 3744$l$
3763 chain idler 3763
3810 brake caliper 3810
3812 rear brake caliper floating mount 3812
3814 brake torque link 3814
3816 chassis rear brake stay mount 3816

The third embodiment of the apparatus and method according to the present disclosure has a slightly destabilizing geometry during braking or acceleration while the vehicle is cornering. In this embodiment, instead of designing and providing a constant driveline suspension coupling coefficient (DSCC) over the range of suspension travel, the braking DSCC is designed to increase as the suspension is compressed (opposite to the stabilizing geometry of the second embodiment). Consequently, the braking DSCC is higher for the inside wheel during cornering, and provides decreased lift acting in the tire contact point vertical plane, than that of the outside wheel when both wheels are provided equal braking force. This decreased lifting force acting through the inside wheel generates a roll moment which slightly increases the vehicle roll angle. This is expressed by the vehicle's increasing lean angle as the driver brakes while entering a turn, thereby requiring slightly less counter-steering by the driver for turn initiation. (It is recalled again that a neutral stability system does not supply any significant roll moment onto the vehicle when braking into a corner, while an unstable geometry increases the lean angle during braking into a corner.)

Figure 26:
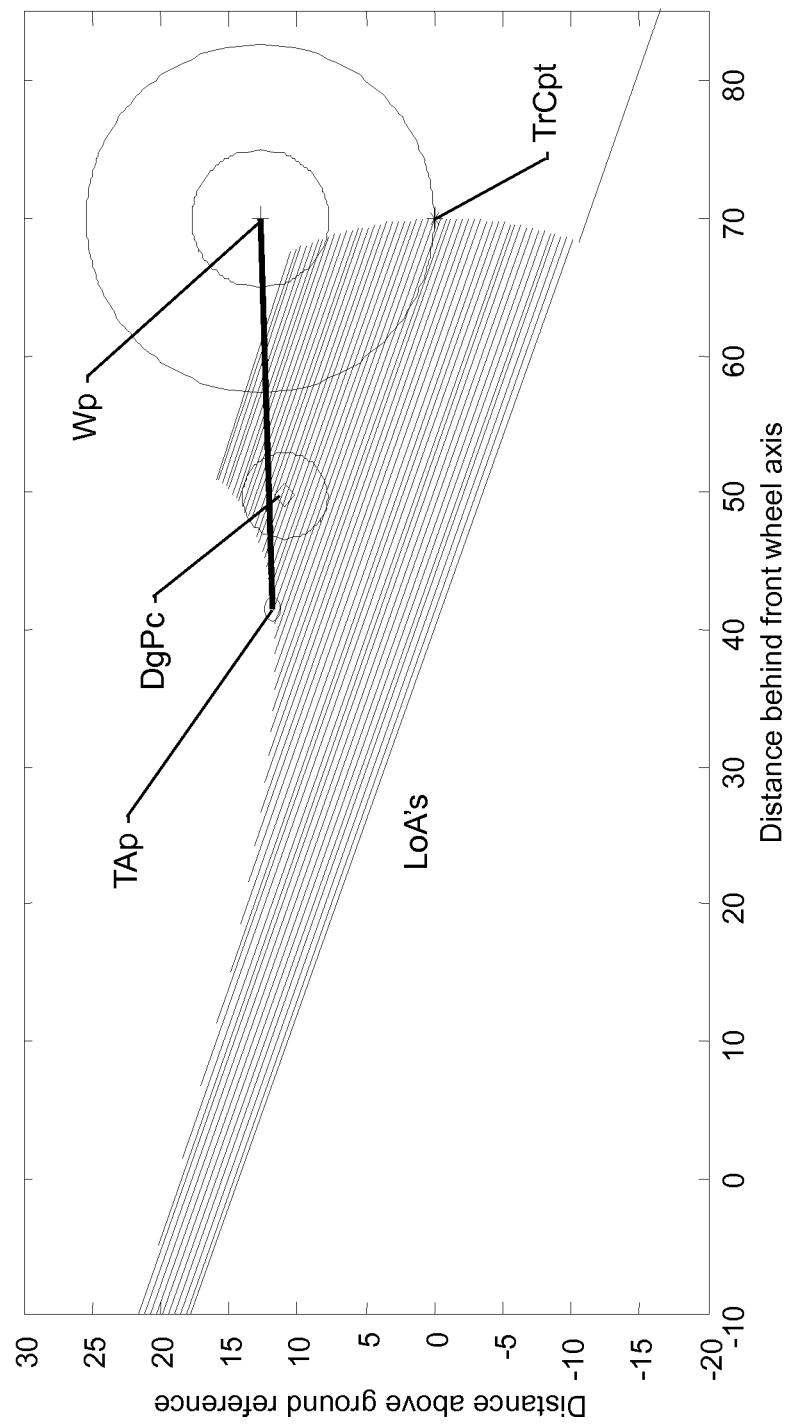
FIG. 26A is a diagrammatic side view of a third embodiment (slightly destabilizing geometry) of the invention, showing the driveline and trailing arm components geometry at ride height during acceleration, and showing various alternative lines of action for a range of suspension displacements.
FIG. 26B is a graph of a driveline suspension coupling coefficient (DSCC), versus wheel displacement from ride height, for acceleration of the third embodiment with slightly unstabilizing geometry according to the invention and over the range of suspension travel.
FIG. 26C is a graph of normalized vehicle applied roll moment, versus vehicle lean angle, due to drive and suspension force coupling due to acceleration in the third embodiment with slightly unstabilizing geometry according to the invention and over the range of vehicle lean angles to a side.
FIG. 26D is a graph of driveline suspension coupling coefficient (DSCC), versus wheel displacement from ride height, for braking in the third embodiment with slightly unstabilizing geometry according to the invention and over the range of suspension travel.
FIG. 26E is a graph of normalized vehicle roll moment, versus vehicle lean angle, due to drive and suspension force coupling due to braking in the third embodiment with slightly unstabilizing geometry according to the invention and over the range of vehicle lean angles towards a side.
Figure 26:
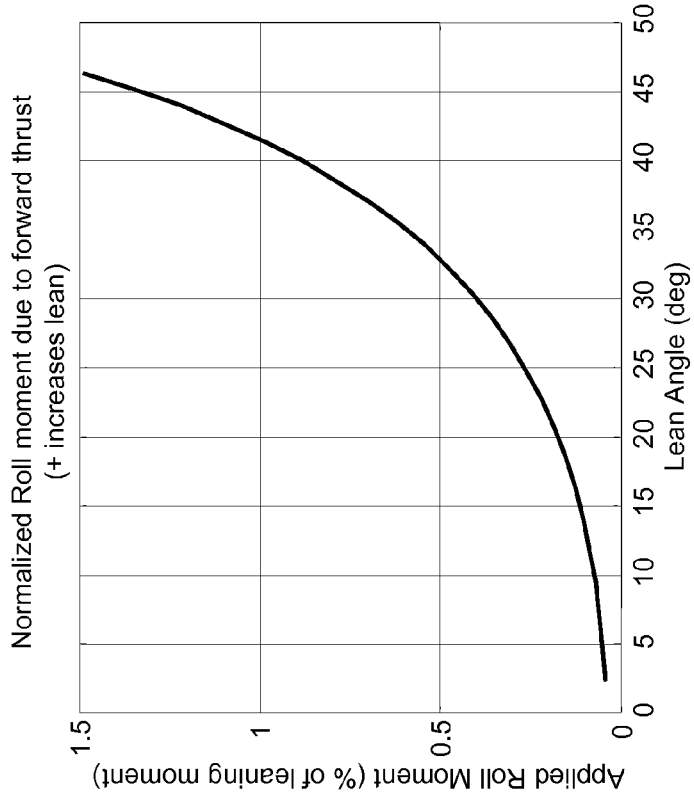
Figure 26:
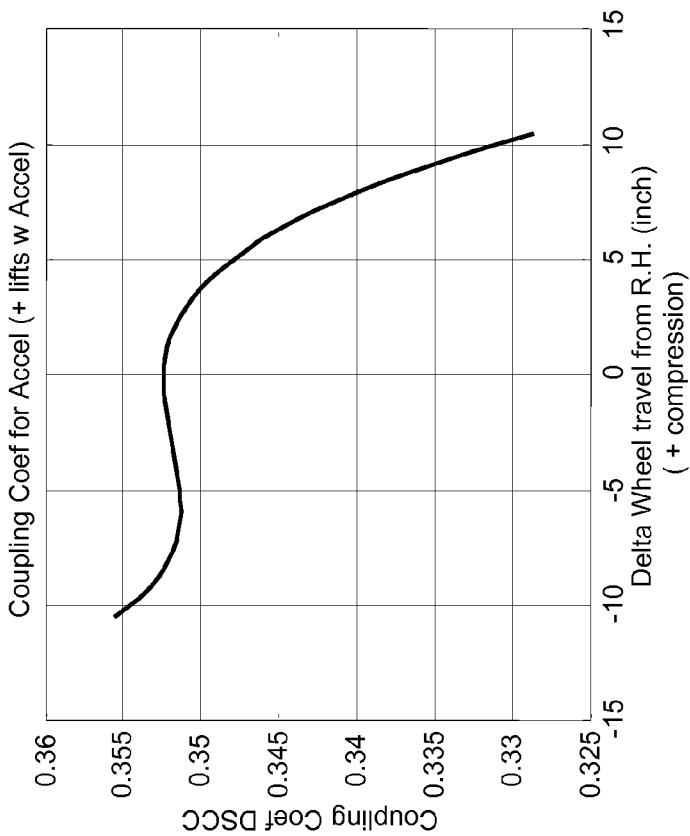

FIG. 26A is a graph depicts the driveline and suspension geometry for this third embodiment with slightly unstabilizing geometry at ride height, and shows a set of lines of action LoAs for the range of suspension travel. The graph is similar in respects to that of FIG. 21C for the first embodiment, except that the trailing arm pivot 3512 (TAp) joining the vehicle chassis and sprung mass 3323, and the differential 3710 axis location (DgPc) have been slightly altered using a computational method for optimizing an destabilizing geometry during acceleration. Although somewhat difficult to perceive in the graph, due to pixilation and the size of FIG. 26A, the LoAs have a steeper slope as the suspension travels (down) in extension. FIG. 26B plots the DSCC for this geometry, and shows the results of the changing LoA slope, with a larger DSCC in suspension extension than in suspension compression. FIG. 26C charts the affects of this geometry change on the normalized roll moment due to forward thrust, with a positive normalized roll moment manifested over the range of vehicle roll angles. This positive roll moment tends to increase the roll angle of the vehicle as the vehicle is accelerated during cornering (as also discussed hereinabove for a destabilizing geometry).

Similarly, and also using a computational (rather than graphical) method, the geometry of the braking system of this embodiment can be adjusted to provide a destabilizing roll moment during braking Reference in this regard is made to FIG. 26D, which graphs the DSCC as a function of suspension position for such a geometry having an increasing braking DSCC as the suspension is compressed. For braking, the DSCC increases for a destabilizing geometry (as compared to the acceleration case DSCC), as braking forces are opposite to acceleration forces when acting on the vehicle. Therefore, for a destabilizing geometry in braking, the DSCC must increase during suspension compression—the opposite of the requirements for a destabilizing geometry during acceleration. So, FIG. 26E graphs the normalized roll moment due to braking for a geometry according to this third embodiment, with a negative roll moment acting to increase vehicle lean angle. In FIG. 26E, the average normalized roll moment is about 1.5% negative, compared to that presented in FIG. 23E which approaches 0%.

Structure and Functionality of the Third Embodiment:

Except for the slight change in geometry affecting the vehicle roll stability, the structure and components of the third embodiment are very similar to the structure and components of the first embodiment, and helpful reference may be had to the drawings of the first embodiment structure to obtain an understanding of the structure of the third embodiment.

Operation of third embodiment:

The operation of the third embodiment is only slightly different than for the first, as the destabilizing geometry requires less counter steer by the driver to enter a corner during vehicle braking. As discussed, a single track vehicle requires counter-steering to enter and exit a corner. Entering a corner, the driver must turn the front wheel away from the corner direction to initiate a lean angle before turning into a corner, and to exit a corner, counter-steering is required to "straighten up" the vehicle up to move the wheels back under the center of gravity. With a vehicle having a slightly destabilizing geometry, less counter-steering is required to lean the vehicle while entering a corner, because the driveline suspension coupling provides some roll moment to induce vehicle lean during braking.

Method of Use of Third Embodiment:

Graphical Method for Acceleration and Braking

In the first embodiment of the present apparatus and method, a constant DSC is desired from the geometry over the range of suspension travel. In this third embodiment, a decreasing DSC is desired for the acceleration case, while an increasing DSC is desired for the braking condition (as the suspension is progressively compressed). The graphical method for determining the desired geometry in this embodiment during braking is similar to the first embodiment case, except that instead of drawing parallel lines of action LoAs for the various alternative suspension positions, the LoAs of the third embodiment have increasing slopes as the suspension is compressed. The graphical method for determining the desired geometry during acceleration is also similar to the first embodiment as described hereinabove, except that instead of drawing parallel LoAs for the different suspension positions, the LoAs of the third embodiment will have decreasing slopes as the suspension is compressed. Before the geometry design method is initiated, the decrease in DSC for acceleration and the increase in DSC for braking (as a function of suspension travel for a given vehicle) must be determined. Vehicle simulation or vehicle testing could both be useful in determining the change in DSC and thus the amount of destabilizing roll moment generated by the suspension during acceleration or braking. Of course, this demands input from the driver, since adding instability ordinarily is undesirable; but may be useful in increasing the vehicle maneuverability for certain situations for highly skilled drivers.

Computational Method for Acceleration and Braking

As discussed in the first embodiment, MATLAB program script files are given in the appendices for the acceleration and braking cases. With slight modifications, these MATLAB files can optimize any of the design parameters for (A) minimizing the variation in DSCC, or to (B) minimize the error to a desired DSCC, or to (C) minimize the error to a desired DSCC as a function of suspension position. While options A and B are best used for determining neutral stability geometry, option (C) can be implemented to determine the destabilizing geometry of this third embodiment. To use the MATLAB file in such a manner, a matrix is created with the suspension travel as a first column and the desired DSCC as the second column, with the rows ordered from smallest suspension travel to largest suspension travel. The MATLAB file then determines error based on the calculated DSCC for a given suspension travel, compared to the desired DSCC for that suspension travel. The standard MATLAB function "fminsearch" is then used to optimize the geometry to minimize the error over the range of suspension travel. Again, other analysis methods or programs such as MATHEMATICA could also be used.

A Vehicle could be Designed with Different Embodiments for the Acceleration Geometry than for the Braking Geometry Chain drive for a vehicle offers flexibility between the acceleration geometry and the braking geometry; such flexibility is more difficult to realize for vehicles using shaft or hub motor drive systems. For a higher-performance application, a chain drive vehicle could be designed with a stabilizing chain drive acceleration geometry (according to the second embodiment described above) and with a destabilizing brake geometry (according to the third embodiment). Such a configuration allows the vehicle improved turn-in under braking, and also allows earlier throttle application when exiting a corner. For a standard vehicle neutral geometry, in both the acceleration and braking conditions may be optimal. Further discussion for shaft drive and hub motor drive systems will be provided later in this application.

Description of a Fourth Embodiment

Figure 27:
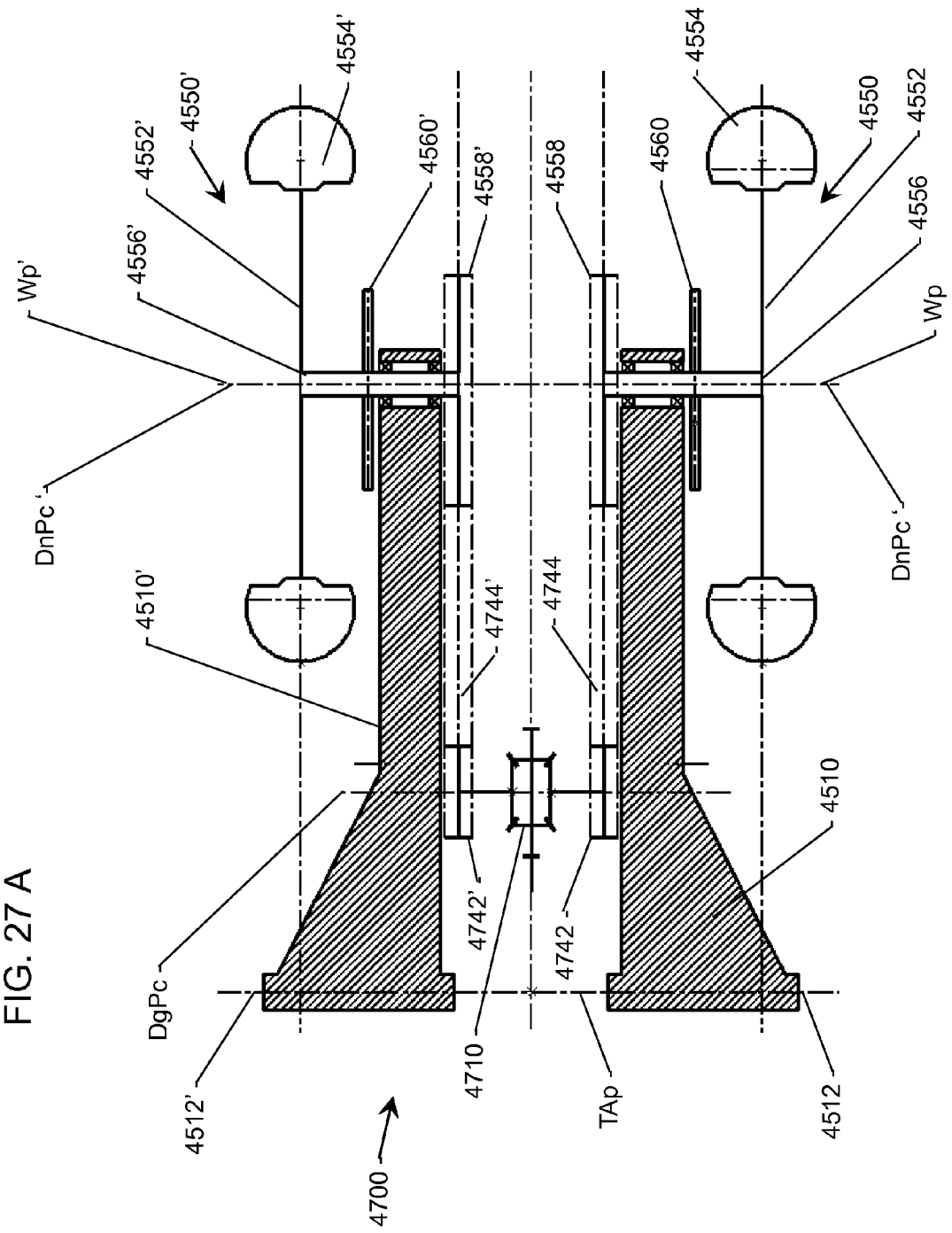
FIG. 27A is a diagrammatic sectional top view of a fourth embodiment of the apparatus according to the invention, showing a chain drive single sided trailing arm-live spindle.
FIG. 27B is a diagrammatic sectional top view of the fourth embodiment of the apparatus according to the invention, showing a brake actuator for chain drive trailing arm with torque link about axle-live spindle.
Figure 27:
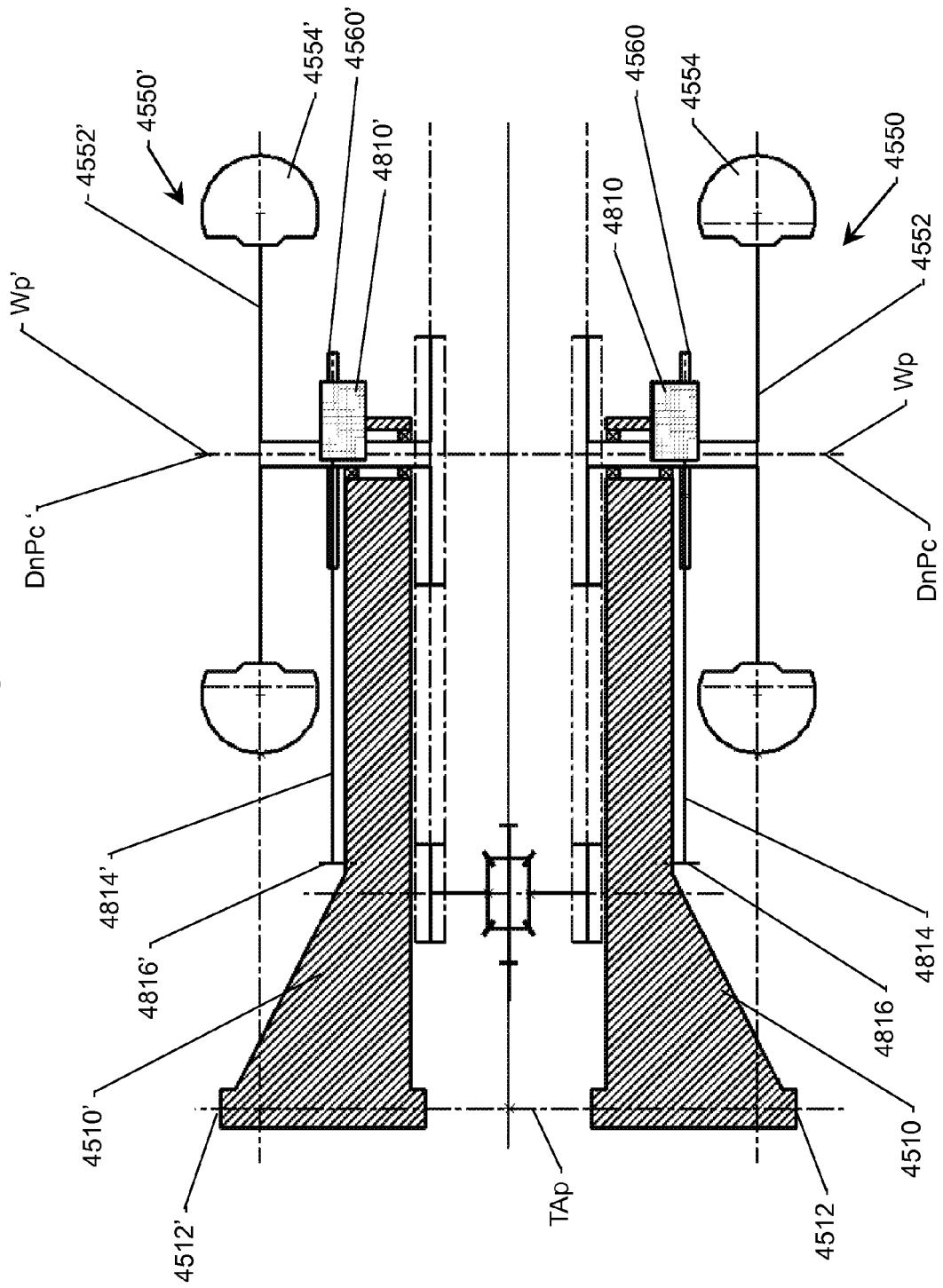

Components of the nominal vehicle and fourth embodiment appearing in the several views of FIGS. 27A-B are identified using series-4 label numerals:
350 chain driven trailing arm rear suspension on a narrow leaning commuter vehicle
4323 motorcycle sprung mass 4323
4510 trailing arm 4510
4512 trailing arm pivots 4512
4550 rear wheel 4550
4552 wheel 4552
4554 tire 4554
4556 live rear axle 4556
4558 driven pinion (sprocket) 4558
4560 brake disc 4560
4610 driving pinion (countershaft sprocket) 4610
4700 final drive assembly 4700
4710 differential 4710
4742 final driving pinions 4742
4744 chain upper run 4744u, lower run 4744l
4763 chain idler 4763
4810 brake caliper 4810
4812 rear brake caliper floating mount 4812
4814 brake torque link 4814
4816 chassis rear brake stay mount 4816

For the fourth embodiment, a rear suspension system using single-sided trailing arms (e.g., a pair of such trailing arms) is presented to show how the apparatus and method of the present disclosure may be applied to this type of suspension system. This fourth embodiment of the apparatus includes: a differential 4710; then for the left side of the vehicle a final driving pinion 4742; a rear wheel driven pinion 4558; a live rear axle 4556; a rear wheel 4550; a final loop drive element 4744 (with upper length 4744u and lower length 4744l); a chain idler 4763 (not shown in FIG. 27A); and a trailing arm 4510. Substantially identical but mirrored components would be driving the right side of the vehicle. For braking on the rear left side of the vehicle, the components are a chassis rear brake stay mount 4816, a rear brake caliper 4810, rear brake caliper floating mount 4812 (not seen in FIG. 27B), rear brake torque link 4814, rear brake lines (and associated parts) 4818 and a rear master cylinder 4820 (also not seen in FIG. 27B), which braking system supplies the substantially the same brake pressure to both the left and right rear brake calipers. Mirrored components would be braking the right side of the vehicle, except for the use of a shared single rear master cylinder.

Structure of the Fourth Embodiment:

Reference is invited to FIG. 27A, showing a diagrammatic top sectional view of the suspension and driveline of this embodiment cut along planes defined by the trailing arm pivot (4512) TAp, the wheel axis Wp, and the axis of the driving pinion DgPc. Although parallel, these axes normally are not coplanar. Power from the nominal vehicle intermediate drive 1600 (not shown), is transmitted to the intermediate driven pinion 4716 of the differential 4710, which divides the torque equally to the two output pinions, left pinion 4742 and right pinion 4742'. The final loop drive element 4744 delivers power to the wheel's driven pinion 4558, then through the live rear axle 4556 to the rear wheel 4552 and tire 4554. There optionally is a cushioning device, several types are known in motorcycle fabrication, between the driven pinion 4558 and the live rear axle 4556 to reduce frequency vibrations. Because the final loop drive element 4744 is a flexible loop drive, it transmits power through tension only, the upper length 4744u is in tension for vehicle acceleration and the lower length 4744l is in tension for engine braking (A chain idler 4763 is not shown in FIGS. 31A-B but is provided similarly to the first embodiment.) For reasons of improved dynamics and ease of final loop drive removal and replacement, the differential 4710 and final driving pinions 4742 are locate behind the trailing arm pivots 4512.

FIG. 27B is diagrammatic top sectional view of the suspension and driveline of this fourth embodiment, cut along planes defined by the trailing arm pivot TAp, the wheel axis Wp, and the axis of the driving pinion DgPc showing the rear service brake. The brake caliper 4810, torque link 4814 and chassis rear brake stay mount 4816 are shown are above the cutting planes in this sectional view. Braking torque is generated by friction between the brake disc 4560 mounted to the rear wheel 4552 and the rear brake caliper 4810 which incorporates brake pads. The rear brake caliper 4810 is rigidly mounted to a rear brake caliper floating mount 4812 (see 1812 in FIG. 23B), which allows the caliper mount assembly to rotate about the live rear axle 4556 axis. The rear brake torque link 4814 reacts to the brake moment created by the interaction of the brake disc 4560 and rear brake caliper 4810 to the chassis rear brake stay mount 4816. This brake moment is reacted by the rear brake torque link 4814 as a force couple with one force of the brake couple reacting through the rear brake torque link 4814 and the second force of the brake couple reacting through the trailing arm 4510. The trailing arm cannot react the entire braking moment, as the rear brake caliper floating mount 4812 cannot transmit a moment into the trailing arm, but can only impart a force at the pivot on the live axle 4556. As with the first embodiment, the brake geometry of this fourth embodiment is a multi-link trailing arm with torque link type rear suspension.

Functionality, Operation and Method of Use for the Fourth Embodiment

Besides using single-sided trailing arms (with the chain drive components centered between the left-hand and right-hand trailing arms), the chain drive geometry in the chain drive plane is very similar to those depicted by FIGS. 21A and 22A. The placement of the chain drive to the inside of the trailing arm in this fourth embodiment beneficially reduces size restrictions for clearance between the trailing arm 4510 and chain drive 4744. Such restrictions may exist in the first embodiment, in which the trailing arm passes through the chain drive loop. This embodiment instead requires some clearance, between the trailing arm 4510 and the brake torque link 4814, somewhere between the trailing arm 4510 and the tire 4554. Except for this clearance requirement, the brake geometry for the present embodiment is substantially similar to that disclosed by the side view of FIG. 23A. Likewise, the operation and method of use of the fourth embodiment is similar to that of the first embodiment as described hereinabove. As discussed in the first through third embodiments, this fourth embodiment could have neutral, stabilizing or slightly destabilizing geometry for the acceleration case, or the braking case, or a combination. Notably the use of a single-sided or double-sided trailing arm (but usually one pair of arms per vehicle) does not necessitate the desired geometry type used.

Description of a Fifth Embodiment

Figure 28:
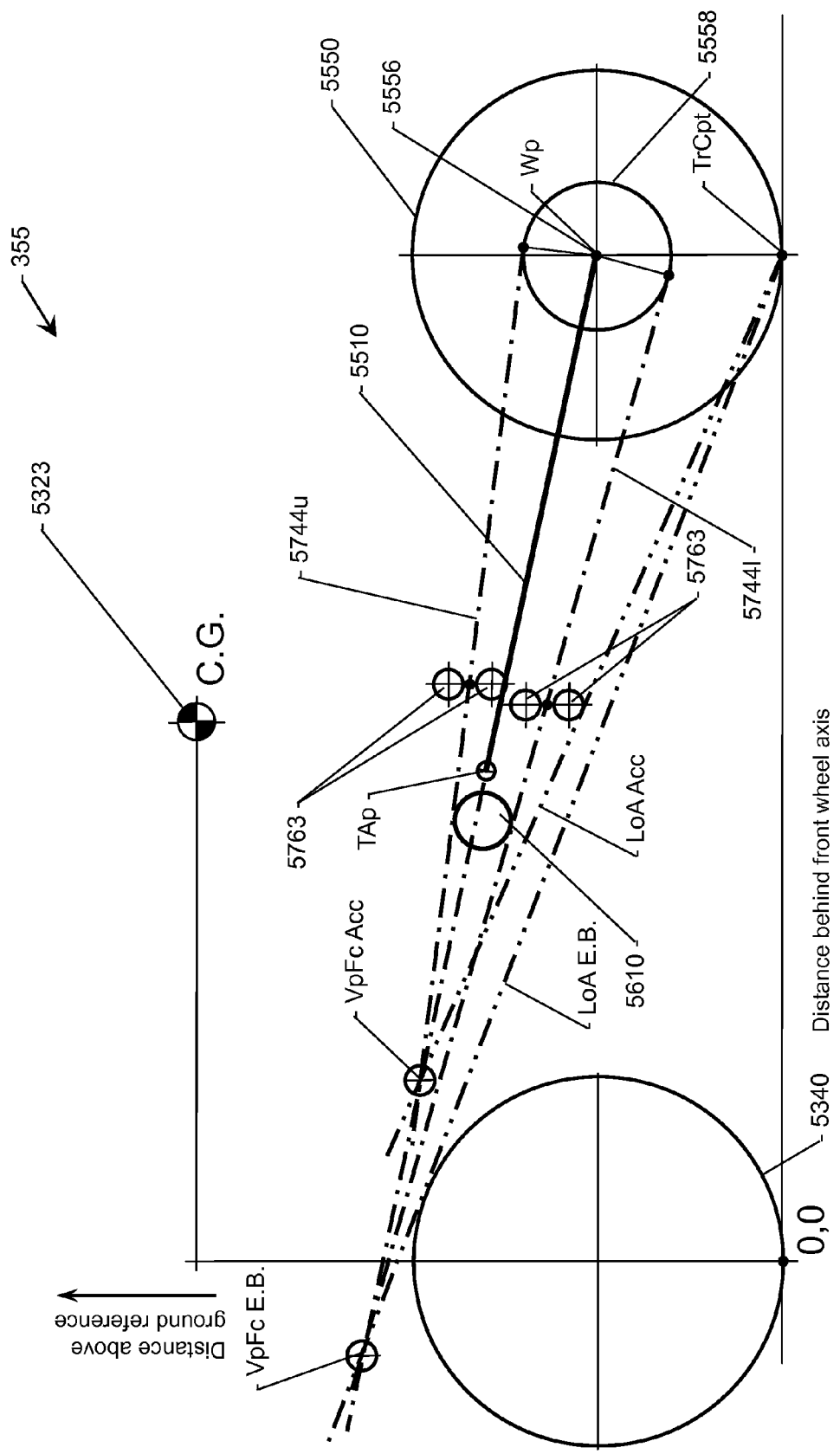
FIG. 28 is a diagrammatic side view of a fifth embodiment of an apparatus according to the present invention, with two sets of chain guide rollers and with improved geometry during acceleration and engine braking.

Components of the nominal vehicle and fifth embodiment appearing in the view of FIG. 28 are identified with series-5 label numerals:
355 idler guided chain driven trailing arm rear suspension on a narrow leaning commuter vehicle
5323 motorcycle sprung mass 5323
5340 front wheel 5340
5510 trailing arm 5510
5512 trailing arm pivots 5512
5550 rear wheel 5550
5552 wheel 5552
5554 tire 5554
5556 rear axle 5556
5558 driven pinion 5558
5560 brake disc 5560
5610 driving pinion (countershaft sprocket) 5610
5700 final drive assembly 5700
5710 differential 5710
5742 final driving pinions 5742
5744 chain upper run 5744u, lower run 5744l
5763 chain idler 5763
5810 brake caliper 5810
5812 rear brake caliper floating mount 5812
5814 brake torque link 5814
5816 chassis rear brake stay mount 5816

Structure of the Fifth Embodiment:

FIG. 28 illustrates diagrammatically the fifth embodiment of the apparatus and method according to the present disclosure. In this embodiment, the chain path is defined by two sets of chassis-mounted idlers 5763 which define an upper chain run length 5744u and a lower chain run length 5744l, as the drive chain 5744 engages with the driven pinion 5558 which drives the rear wheel 5550. A driving pinion 5610 drives the chain 5744. This driving pinion 5610 is connected on the output of a differential, as disclosed with the first embodiment. However, when compared to the first embodiment, this fifth embodiment allows a wider range of driving pinion 5610 locations. (More chain idlers 5763 are, however, required.) As with the first embodiment, one set of idlers (or other means) may be used to account for the chain path variation as the suspension travels through its range of motion. The chain idlers may potentially be fixed to the chassis or elsewhere on the sprung mass 5323, and some other form of chain tensioner of path length compensation could be used.

Functionality, Operation and Method of Use for the Fifth Embodiment

Aside from the substitution of an extra set of chain idlers to determine the location of the upper chain length run 5744u, and the freedom to locate the driving pinion 5610, this embodiment is very similar to the first embodiment. This fifth embodiment could also provide neutral stability, stabilizing and slightly unstabilizing geometry as per the first three embodiments, depending on the geometry and location of the chain idlers 5763 on the vehicle chassis 5323. This geometry could also be employed with either a single- or a double-sided trailing arm.

Computational Method for Acceleration and Braking

As discussed in the first embodiment, MATLAB program script files are given in the appendices for the acceleration and braking cases for this embodiment. With slight modifications, these MATLAB files can optimize any of the design parameters for (A) minimizing the variation in DSCC, or to (B) minimize the error to a desired DSCC, or to (C) minimize the error to a desired DSCC as a function of suspension position. Option C can be used to determine destabilizing geometry of this fifth embodiment. To make the determination, the MATLAB program file is used substantially the same way as described for this Option C in regards to the second and third embodiments, discussed hereinabove.

Description of a Sixth Embodiment

Figure 29:
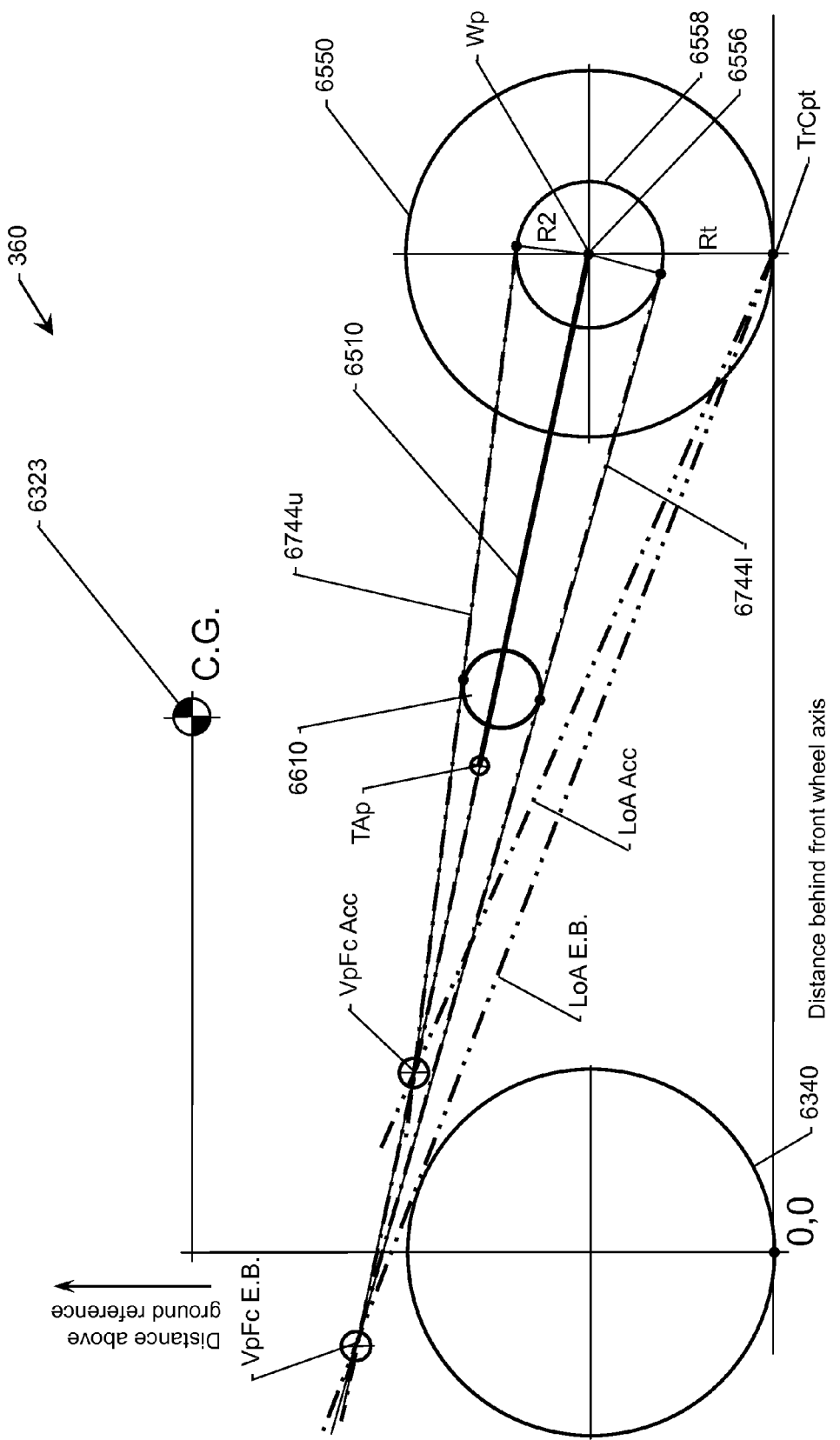
FIG. 29 is a diagrammatic side view of a sixth embodiment of an apparatus according to the present invention, with a single driving pinion and with improved geometry during acceleration and engine braking.

Components of the nominal vehicle and fifth embodiment appearing in the view of FIG. 29 are identified with series-6 label numerals:
360 chain driven trailing arm rear suspension on a Narrow leaning commuter vehicle
6323 motorcycle sprung mass 6323
6510 trailing arm 6510
6512 trailing arm pivots 6512
6550 rear wheel 6550
6552 wheel 6552
6554 tire 6554
6556 rear axle 6556
6558 driven pinion (sprocket) 6558
6560 brake disc 6560
6610 driving pinion (countershaft sprocket) 6610
6700 final drive assembly 6700
6710 differential 6710
6742 final driving pinions 6742
6744 chain upper run 6744u, lower run 6744l
6763 chain idler 6763
6810 brake caliper 6810
6812 rear brake caliper floating mount 6812
6814 brake torque link 6814
6816 chassis rear brake stay mount 6816

Structure of the Sixth Embodiment:

Disclosure particular to the sixth embodiment of the apparatus and method is had by reference to FIG. 29. In this embodiment, the overall chain path is defined by the driving pinion 6610 and the driven pinion 6558, which in turn define an upper chain run 6744*u* and a lower chain run 6744*l*. The driving pinion 6610 drives the chain 6744. This driving pinion 6610 is operably connected to the output of a differential, as with the first embodiment. This embodiment has fewer parts, although the location and diameter of the driving pinion could still be optimized for both acceleration as well as engine braking conditions. This embodiment does not, however, allow the design freedom offered by the independent placement of chain idlers to define the chain run for the acceleration case separately than the engine braking case. Also, some means for maintaining chain tension is required.

Functionality, Operation and Method of Use for the Sixth Embodiment

Besides the simplification of the drive system (that is, lacking chain idlers to define the geometry of the final drive system), this sixth embodiment could also be configured to provide neutral stability, stabilizing, and slightly destabilizing geometry per the teachings of the first three embodiments. The stability (or instability) depends on the diameter and location of the driving pinion 6610, on the vehicle chassis 5323, the size of the driven pinion 6558, and the geometric configuration of the trailing arms (such as the arm length and arm pivot location on the chassis). The geometry of this embodiment also may be used with either a single- or a double-sided trailing arm. If spring-loaded chain tensioners are used in this geometry, they do not necessarily determine the stability of the chain drive, because when the top chain run 6744*u* is loaded during acceleration, the spring loaded tensioner could move relative to the chain 6744 and chassis. Tensioner movement would not define the geometry of the top run of chain unless the tensioner spring imparted a high tensioning load to overcome the applied loads to the chain. (Such would also be the case for a spring-loaded idler on the bottom run of chain.)

Computational Method for Acceleration and Braking

The computational method for this sixth embodiment is substantially the same, using the MATLAB program, as described hereinabove for the second and third embodiments.

Introduction to the Seventh, Eighth and Ninth Embodiments

The following three embodiments (embodiments seven, eight and nine) are all based on the trailing arm with torque link geometry, which has been well discussed in the braking geometry of the first embodiment. In this configuration, a floating carrier is free to pivot about the spin axis of the rear wheel. A torque link is mounted to this floating carrier with a revolute type joint between the torque link and the floating carrier (at one end of the torque link). The other end of the torque link is mounted to the vehicle chassis, also with a revolute type joint. The vehicle chassis, trailing arm floating carrier, and torque link make up a planar four-bar linkage, which defines the motion of the floating carrier as the trailing arm moves up and down (relative to the chassis, thereby providing suspension motion of the rear wheel). The torque link can be mounted above or below the trailing arm. As discussed throughout herein above, this geometry can be determined and configured to provide substantially constant driveline suspension coupling for a neutrally stable leaning vehicle, or to provide a stabilizing coupling action, or (much less commonly) also to provide a mildly unstabilizing coupling action (e.g., per the first three embodiments disclosed above). To reduce cost and complexity with these types of systems, the brake caliper can be mounted to the floating carrier. When this is so, the coupling between the driveline and suspension for the acceleration, engine braking and brake cases is the same.

Although more complex, the brake caliper could be revolutely mounted to the floating carrier, and also be provided with an additional torque link. This could then have different suspension and braking coupling than the acceleration or engine braking cases, similar to the first embodiment, with different coupling for the engine acceleration condition and the braking condition. Such systems, although more complex and typically more expensive than the chain driven embodiments, have excellent engine braking coupling which is difficult to achieve with the chain drive embodiments.

Inasmuch as these three embodiments are similar to the first braking embodiment, similar design and analysis methods are used to determine the geometry, such as the graphical or computation methods discussed earlier. The MATLAB files listed in the appendices can also be used to optimize the different geometry positions for a desired average anti-squat or anti-rise or to have an optimal geometry for a given vehicle package.

Description of a Seventh Embodiment

Figure 30:
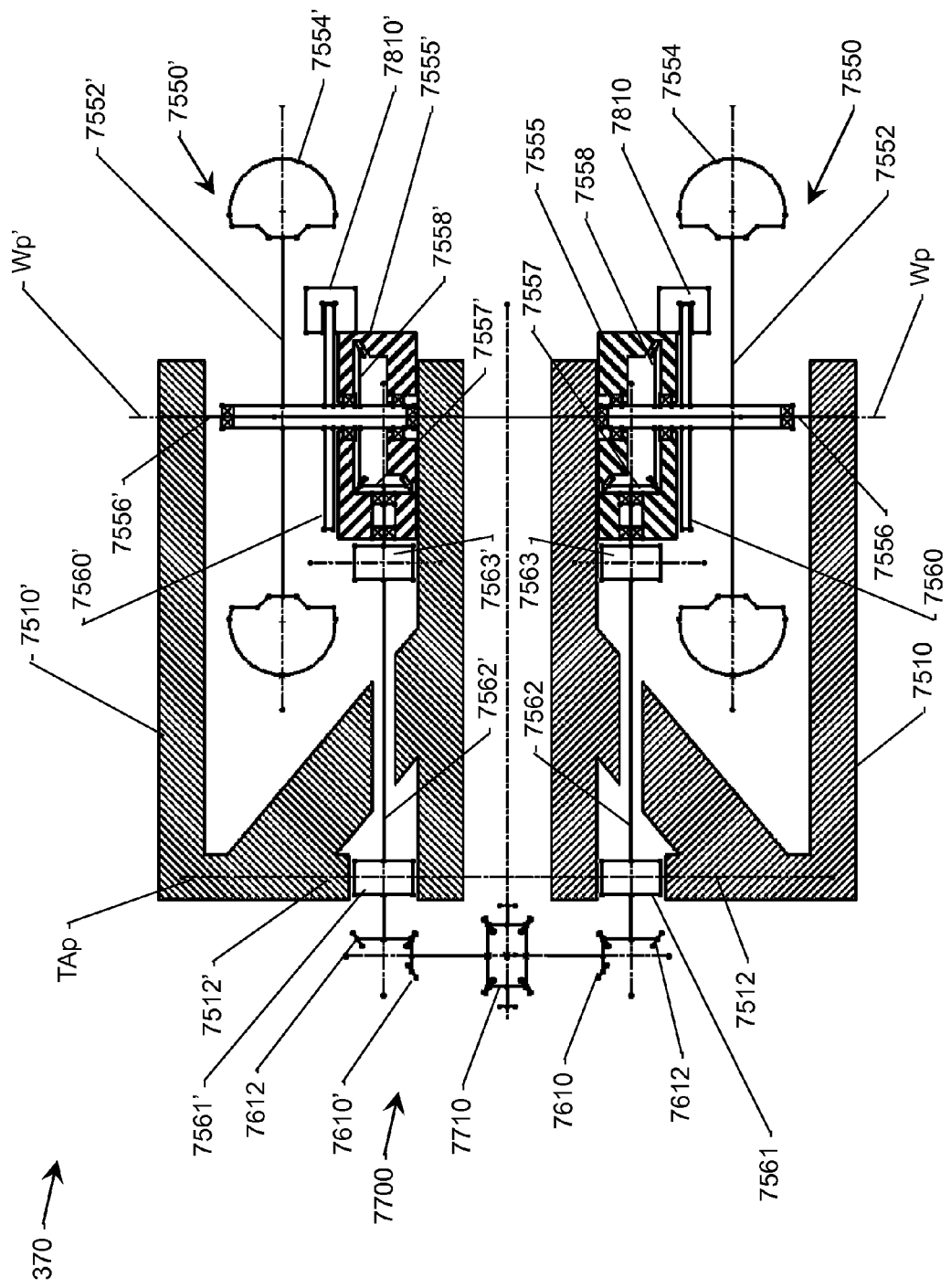
FIG. 30 is a diagrammatic sectional top view of a seventh embodiment of an apparatus according to the present invention, showing a shaft-drive driveline double trailing arm with torque link about axle.

Components of the nominal vehicle and seventh embodiment appearing in the view of FIG. 30 are identified with series-7 label numerals:
370 chain driven trailing arm rear suspension on a narrow leaning commuter vehicle
7323 motorcycle sprung mass 7323
7510 trailing arm 7510
7512 trailing arm pivots 7512
7550 rear wheel 7550
7552 wheel 7552
7554 tire 7554
7555 final drive Carrier 7555
7556 rear axle 7556
7557 final driving pinion 7557
7558 final driven ring gear 7558
7560 brake disc 7560
7561 first driveline joint 7561
7562 drive shaft 7562
7563 second driveline joint 7563
7564 drive shaft slip joint 7564
7610 differential driving pinion 7610
7612 differential driven pinion 7612
7700 final drive assembly 7700
7710 differential 7710
7810 brake caliper 7810
7812 rear brake caliper floating mount 7812
7814 torque link 7814
7816 chassis torque link mount 7816

Structure of the Seventh Embodiment:

There is seen in FIG. 30 a sectioned top view of an embodiment of the apparatus according to this disclosure, having a double-sided trailing arm and shaft drive mounted in a floating carrier. As with the other embodiments according to this disclosure, this seventh embodiment is mounted to the nominal example vehicle with trailing arm mounts 1170 (see FIG. 20B). The trailing arm(s) (7510 denoting the left side, and 7510' for the right) mount to the nominal vehicle mounts 1170 with revolute joints in the trailing arm pivots 7512. This allows the trailing arm 7510 to pivot relative to the vehicle chassis. A rear wheel axle 7556 is mounted at the rearward end of the trailing arm 7510. The rear wheel 7550 is revolutely mounted about this axle 7556, which allows the rear wheel 7550 to spin on an axis parallel to the trailing arm pivot 7512, and to swing up and down with the end of the trailing arm 7510. A differential 7710 is used to distribute power between the two rear wheels 7550 and 7550' by driving a differential driving pinion 7610, which in turn then drives a differential driven pinion 7612. The differential driven pinion 7612 has a shaft which is connected to a driveline joint 7561, which joint is aligned with the trailing arm pivot 7512 and allows the drive shaft 7562 to move as the trailing arm 7510 moves. The drive shaft 7562 may have a slip joint 7564 (not shown in FIG. 30), which could be splined or a ball spline type joint, to allow for variations in distance as the suspension moves over the range of travel. A second driveline joint 7563 is mounted on the other end of the drive shaft, and drives a final driving pinion 7557. The first 7561 and or second driveline joint 7563 may be a Cardan type, or a constant velocity type, driveline joint depending on the angles required. The final driving pinion 7557 is mounted in a floating final drive carrier 7555 which is revolutely mounted about the rear axle 7556. Also within the final drive carrier 7555 is a final driven ring gear 7558, which provides driving torque to the rear wheel 7550. A torsional vibration damper (not shown) may be used to couple the final driven ring gear 7558 to the rear wheel 7550.

Also attached to the rear wheel 7550 is a brake disc 7560. A brake caliper 7810 mounted to the floating final drive carrier 7555 is actuated and grips the brake disc 7560 to provide torque to the wheel to slow the vehicle. A one end of a torque link 7814 is revolutely mounted on the final drive carrier 7555 and the other end of the torque link 7814 is revolutely mounted to the chassis. This torque link reacts the torques applied to the floating final drive carrier 7555 into the nominal vehicle chassis. A tire 7554 is mounted onto the wheel 7552 which supports the vehicle and can drive the vehicle forward or slow the vehicle depending on the torque supplied by the final driven ring gear 7558 or brake disc 7560. Not shown is the suspension system which supports the vehicle and allows the wheel to move up and down to absorb irregularities in the terrain.

The geometry of this seventh embodiment is generally represented in FIG. 23B, but more particularly with the trailing arm 7510 pivoting relative to the vehicle chassis at point TAp, and the wheel and floating final drive carrier 7555 pivoting about the point Wp. The torque link 7814 in this embodiment is revolutely mounted to the final drive carrier 7555 at point TLp2, with the other end of the torque link revolutely connected to the chassis at point TLp1. The instant center (Virtual pivot and Force center) is located at point VpFc. As with the previous embodiments, the Line of Action (LoA) is drawn between the tire contact point TrCpt and the VpFc. The slope of this Line of Action determines the amount of coupling (DSCC) between the drive forces at the tire contact point and the lift created by the drive forces.

Functionality, Operation and Method of Use for the Seventh Embodiment

This seventh embodiment uses the trailing arm with torque link geometry, very similar to the brake geometry of the first embodiment. As discussed herein regarding the first through third embodiments, this seventh embodiment could have neutral, stabilizing, or slightly destabilizing geometry for the acceleration condition, engine braking condition, or the braking condition, or a combination of the three. Operation and method of use of the seventh embodiment also is similar to that of the first embodiment. The MATLAB program files listed in the appendices may be used to optimize the different geometry positions for a desired average anti-squat or anti-rise or to have an optimal geometry for a given vehicle package.

Description of an Eighth Embodiment

Figure 31:
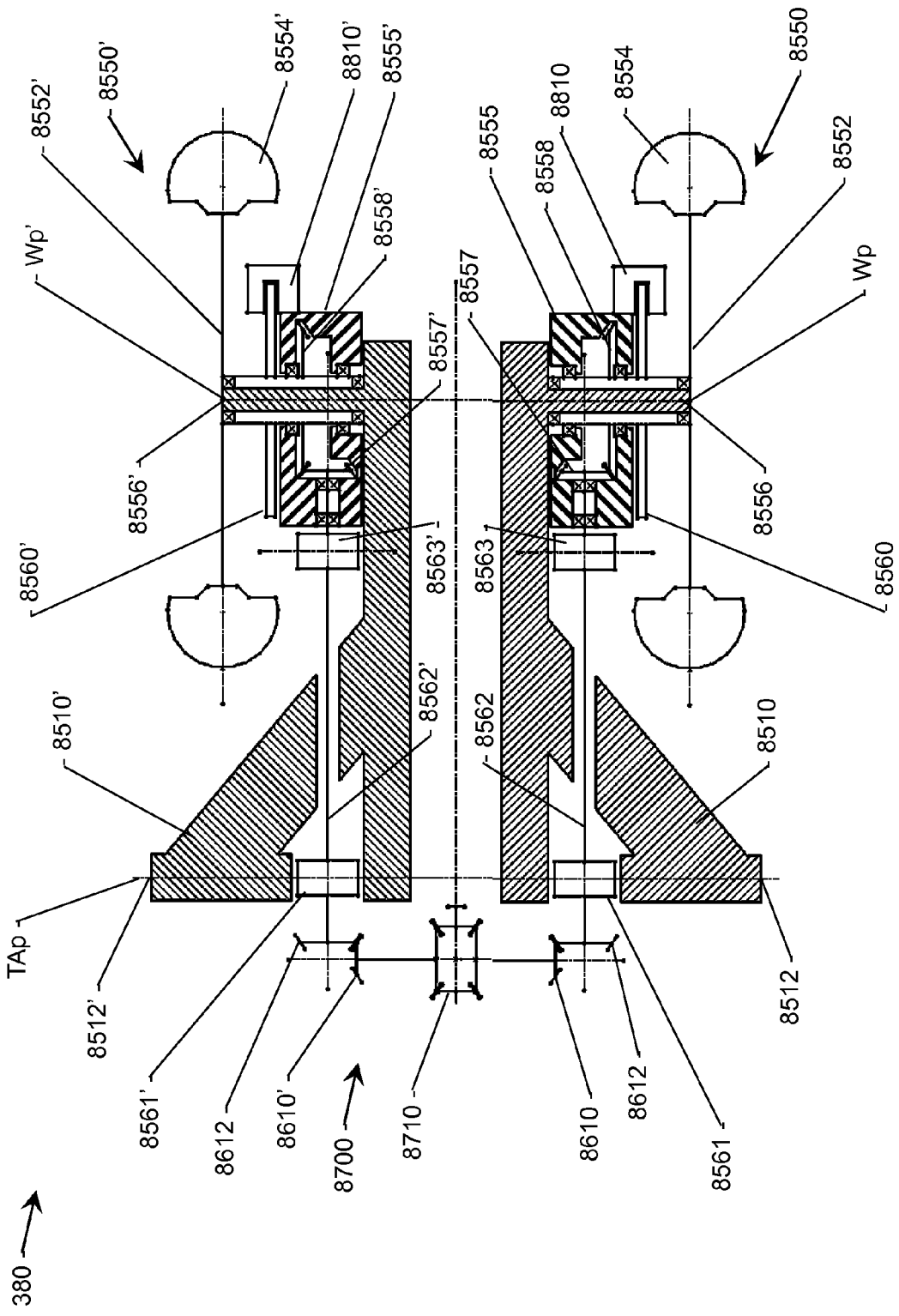
FIG. 31 is a diagrammatic sectional top view of an eighth embodiment of an apparatus according to the present invention, showing a shaft drive driveline trailing arm with torque link about axle.

Components of the nominal vehicle and eighth embodiment appearing in the view of FIG. 31 are identified with series-8 label numerals:
- 380 chain driven trailing arm rear suspension on a narrow leaning commuter vehicle
- 8323 motorcycle sprung mass 8323
- 8510 trailing arm 8510
- 8512 trailing arm pivots 8512
- 8550 rear wheel 8550
- 8552 wheel 8552
- 8554 tire 8554
- 8555 final drive carrier 8555
- 8556 rear axle 8556
- 8557 final driving pinion 8557
- 8558 final driven ring gear 8558
- 8560 brake disc 8560
- 8561 first driveline joint 8561
- 8562 drive shaft 8562
- 8563 second driveline joint 8563
- 8564 drive shaft slip joint 8564
- 8610 differential driving pinion 8610
- 8612 differential driven pinion 8612
- 8700 final drive assembly 8700
- 8710 differential 8710
- 8810 brake caliper 8810
- 8812 rear brake caliper floating mount 8812
- 8814 torque link 8814
- 8816 chassis torque link mount 8816

Structure of the Eighth Embodiment:

FIG. 31 presents a sectional top view of an eighth embodiment of an apparatus according to the present disclosure, with a single-sided trailing arm and a shaft drive mounted in a floating carrier. As with the other embodiments, this embodiment is mounted to the nominal example vehicle with trailing arm mounts 1170 (FIG. 20B). The trailing arm(s) (8510 denoted for the left side, and 8510' for the right) mount to the nominal vehicle mounts 1170 with revolute joints in the trailing arm pivots 8512. This allows the trailing arm 8510 to pivot relative to the vehicle chassis. At the rearward end of the trailing arm 8510 a rear wheel axle 8556 is mounted. The rear wheel 8550 is revolutely mounted about this axle 8556, allowing the rear wheel 8550 to spin on an axis parallel to the trailing arm pivot 8512, as well as to swing up and down with the trailing arm 8510. A differential 8710 is used to distribute power between the two rear wheels 8550 and 8550', by driving a differential driving pinion 8610 which then drives a differential driven pinion 8612. The differential driven pinion 8612 has a shaft which is connected to a driveline joint 8561, which is aligned with the trailing arm pivot 8512 and allows the drive shaft 8562 to move as the trailing arm 8510 moves. The drive shaft 8562 may have a slip joint 8564 (not shown) which could be splined, or a ball spline type joint, to allow for variations in distance as the suspension moves over the range of travel. A second driveline joint 8563 is mounted on the other end of the drive shaft and drives a final driving pinion 8557. The first 8561 and/or second driveline joint 8563 may be a Cardan type, or a constant velocity type, driveline joint depending on the angles required. The final driving pinion 8557 is mounted in a floating final drive Carrier 8555, which is revolutely mounted about the rear axle 8556. Also within the final drive Carrier 8555 is a final driven ring gear 8558, which delivers driving torque to the rear wheel 8550. A torsional vibration damper (not shown) may be used to couple the final driven ring gear 8558 to the rear wheel 8550.

As with the seventh embodiment, a brake disc 8560 also is attached to the rear wheel 8550. A brake caliper 8810 mounted to the floating final drive carrier 8555, when actuated, grips the brake disc 8560 to provide torque to the wheel to slow the vehicle. A first end of a torque link 8814 is revolutely mounted on the final drive carrier 8555, and the other end of the torque link 8814 is revolutely mounted to the chassis. This torque link reactively transfers into the nominal vehicle chassis the torques applied to the floating final drive carrier 8555. The tire 8554 supports the vehicle and drives the vehicle forward, or slows the vehicle, depending on the torque supplied by the final driven ring gear 8558 or brake disc 8560. Not shown is the suspension system which supports the vehicle and allows the wheel to move up and down to absorb irregularities in the terrain.

The geometry of this eighth embodiment is analogous to that represented by FIG. 23B, to which further reference may be made. With the trailing arm 8510 pivoting relative to the vehicle chassis at point TAp, the wheel and floating final drive carrier 8555 pivoting about the point Wp. The torque link 8814 is revolutely mounted to the final drive carrier 8555 at point TLp2, with the other end of the torque link revolutely mounted to the chassis at point TLp1. Again, the Virtual pivot and Force center is at point VpFc. Likewise o the other embodiments, the Line of Action LoA is drawn between the tire contact point TrCpt and the VpFc to define the amount of coupling between the drive forces at the tire contact point and the lift created by the drive forces.

Functionality, Operation and Method of Use for the Eighth Embodiment

This embodiment uses the trailing arm with torque link geometry, very similar to the brake geometry of the first embodiment. The functionality, operation, and method are substantially the same as for the seventh embodiment.

Description of a Ninth Embodiment

Figure 32:
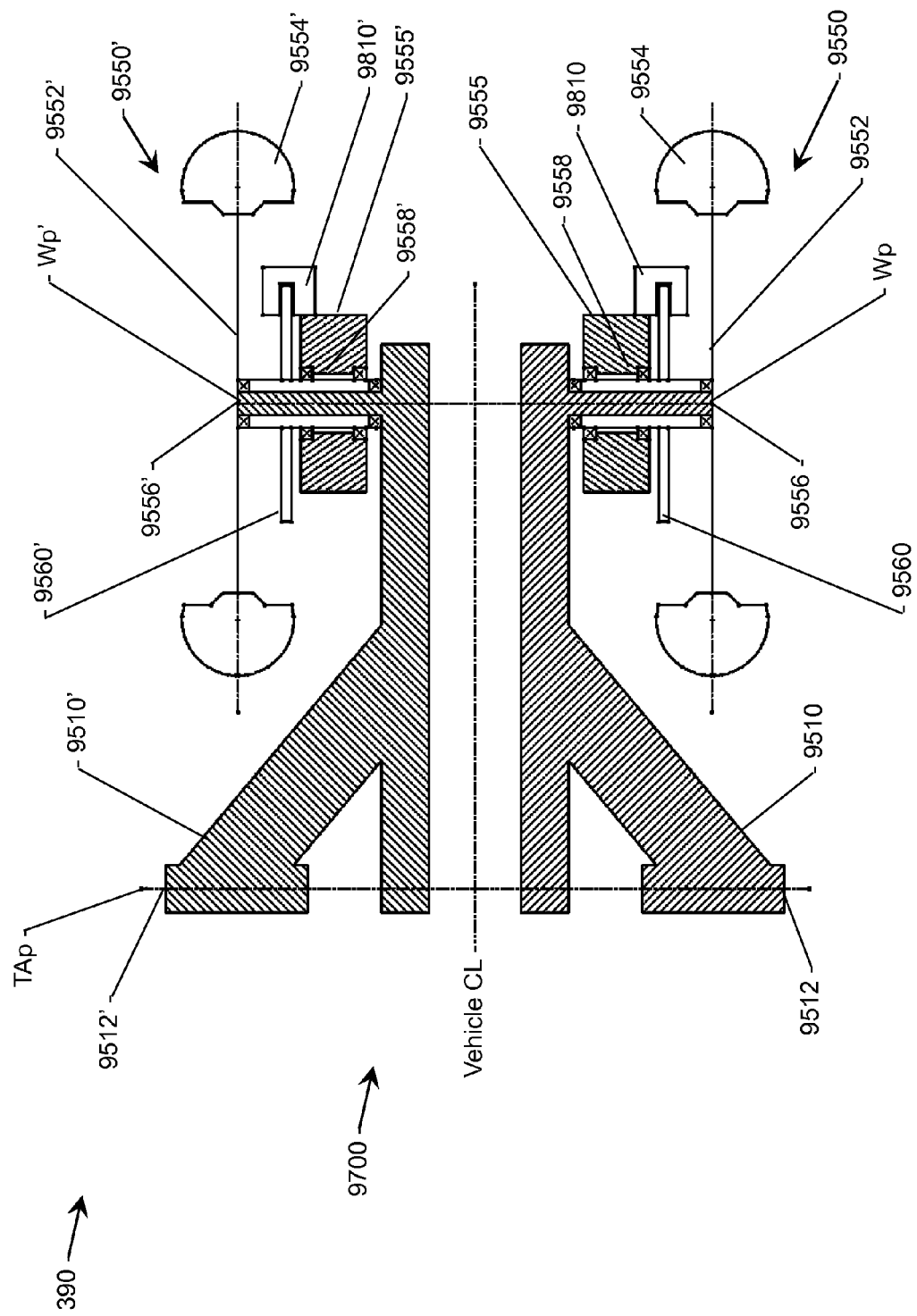
FIG. 32 is a diagrammatic sectional top view of a ninth embodiment of an apparatus according to the present invention, showing a hub motor driveline trailing arm with torque link about axle.

Components of the nominal vehicle and ninth embodiment appearing in the view of FIG. 32 are identified with series-9 label numerals:
390 chain driven trailing arm rear suspension on a narrow leaning commuter vehicle
9323 motorcycle sprung mass 9323
9510 trailing arm 9510
9512 trailing arm pivots to chassis 9512
9550 rear wheel assembly 9550
9552 wheel 9552
9554 tire 9554
9555 hub motor carrier 9555
9556 rear axle 9556
9558 hub motor with gearing 9558
9560 brake disc 9560
9700 final drive assembly 9700
9810 brake caliper 9810
9812 rear brake caliper floating mount 9812
9814 torque link 9814
9816 chassis torque link mount 9816
Structure of the Ninth Embodiment:

Reference is made to FIG. 32, a sectioned top view of the eighth embodiment of the apparatus according to this disclosure. There is provided (in a pair) a single-sided trailing arm with hub motor drive mounted in a floating carrier. As with the other embodiments, this embodiment is mounted to the nominal example vehicle with trailing arm mounts, and this embedment otherwise is similar in most regards to the eighth embodiment. A hub motor with gearing 9558 drives the first rear wheel 9550, with a second hub motor with gearing 9558' driving the other wheel 9551'. Depending on the type and size of the hub motor 9550, reduction gear(s) may be used, or a multi-speed gear set (not shown) could be employed. The hub motor controllers (not shown) command torque from each of the hub motors, and each hub motor is commanded to, and provides, substantially equal torques to each of the two rear wheels. The hub motors with gearing 9558 and 9558' are mounted in a floating hub motor carrier 9555, which is revolutely mounted about the rear wheel axle axis. A torsional vibration damper (not shown) may be used to couple the hub motor drive to the rear wheel 9550. The braking system of this embodiment is substantially the same as that seen in the eighth embodiment, with series-9 label numerals designating similar components as labeled with series-8 numerals in FIG. 31.

Similarly to the seventh and eighth embodiments, the geometry of this ninth embodiment is reasonably characterized by reference to FIG. 23B, and as discussed with reference to the seventh and eighth embodiments hereinabove.

Functionality, Operation and Method of Use for the Ninth Embodiment

This embodiment uses the trailing arm with torque link geometry, very similar to the brake geometry of the first embodiment. The functionality, operation, and method are substantially the same as for the seventh embodiment.

Introduction to the Tenth and Eleventh Embodiments

Figure 33:
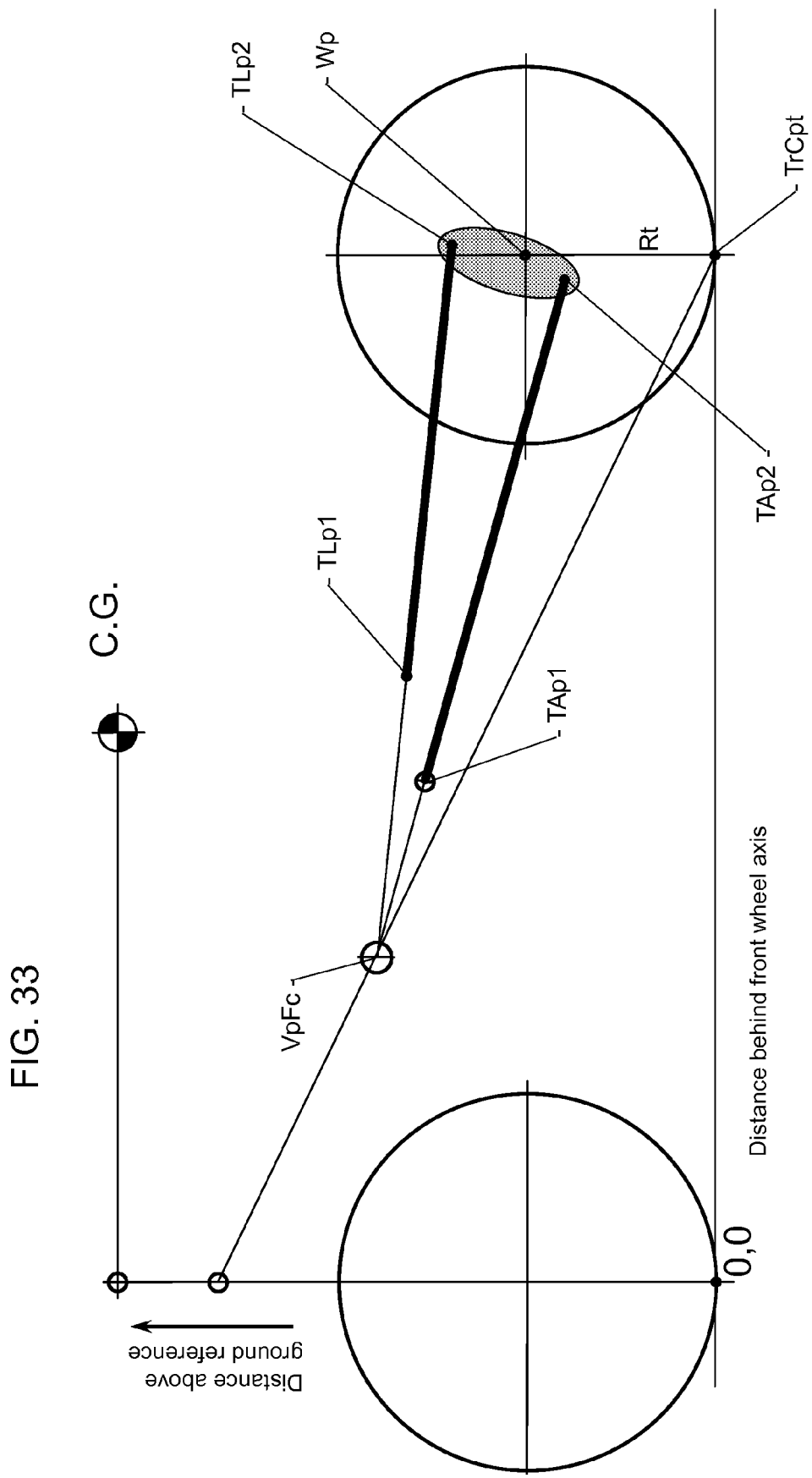
FIG. 33 is a diagrammatic side view illustrating aspects of tenth and eleventh embodiments of an apparatus according to the present invention, with general multi-link trailing arm geometry pivoting about an arbitrary point.

FIG. 33 presents diagrammatically the general configuration for the tenth and eleventh embodiments of an apparatus and method according to this disclosure, which are based on the arbitrary trailing arm with torque link geometry as described previously herein. As with the other embodiments, the trailing arm is revolutely mounted to the vehicle chassis at TAp1. The main difference in this embodiment is that, for this geometry, a floating carrier is free to pivot about an arbitrarily located pivot axis shown at TAp2 in FIG. 33 between the trailing arm and the carrier. The term "arbitrary" is used to separate this type of geometry from the trailing arm with torque link geometry discussed in earlier embodiments, in which the floating carrier pivots about the rear wheel spin axis. Thus "arbitrary" means that the pivot axis location is not based on a previously defined point, such as the rear wheel spin axis, but can be located at a point determined by the designer. This point (in the vertical, longitudinal plane) may still be situated based on previously defined locations, such as the location of a Constant Velocity Joint (CVJ) mounted on the driving pinion of a final drive ring and pinion gear set (housed in the floating carrier or some other appropriate location). In this geometry, the pivot axis is still parallel to that of the trailing arm and rear wheel spin axis, keeping the links as a four bar-planar linkage.

A torque link is mounted to this floating carrier with a revolute type joint (at TLp2 in FIG. 33) between the torque link and the floating carrier at one end of the torque link. The other end of the torque link is mounted to the vehicle chassis also with a revolute type joint (at TLp1). The vehicle chassis, trailing arm, floating carrier and torque link make up a planar four-bar linkage which defines the motion of the floating carrier as the trailing arm moves up and down relative to the chassis, thus allowing suspension motion of the rear wheel (with its spin axis Wp mounted revolutely to the floating carrier). The torque link can be mounted above or below the trailing arm. According to principles previously explained herein, the geometry of this embodiment can be determined to provide substantially constant driveline suspension coupling for a neutrally stable leaning vehicle, or to provide a stabilizing coupling action, or also to provide a slightly unstabilizing coupling action as discussed in respect of the first three embodiments.

To reduce cost and complexity with these type systems, the brake caliper can be mounted to the floating carrier. When this is so, then the coupling for the acceleration, engine braking and brake cases is the same. Although more complex, the brake caliper could be revolutely mounted to the floating carrier and be provided with an additional torque link. This could then have different suspension and braking coupling than the acceleration or engine braking cases, similar to the first embodiment, with different coupling for the engine acceleration case and the braking case. These systems, although more complex and typically more expensive than the chain driven embodiments have excellent engine braking coupling which is not easily achieved with the chain drive embodiments.

Although this embodiment is modestly different than previously described embodiments, the MATLAB program files listed in the appendices can nevertheless be used to analyze and optimize the geometry of this embodiment, based on the arbitrary trailing arm with torque link geometry. The MATLAB program files can be used to design the geometry for a neutral stability DSC, design the geometry for a stabilizing DSC, or to design the geometry for a slightly destabilizing DSC.

Description of a Tenth Embodiment

Figure 34:
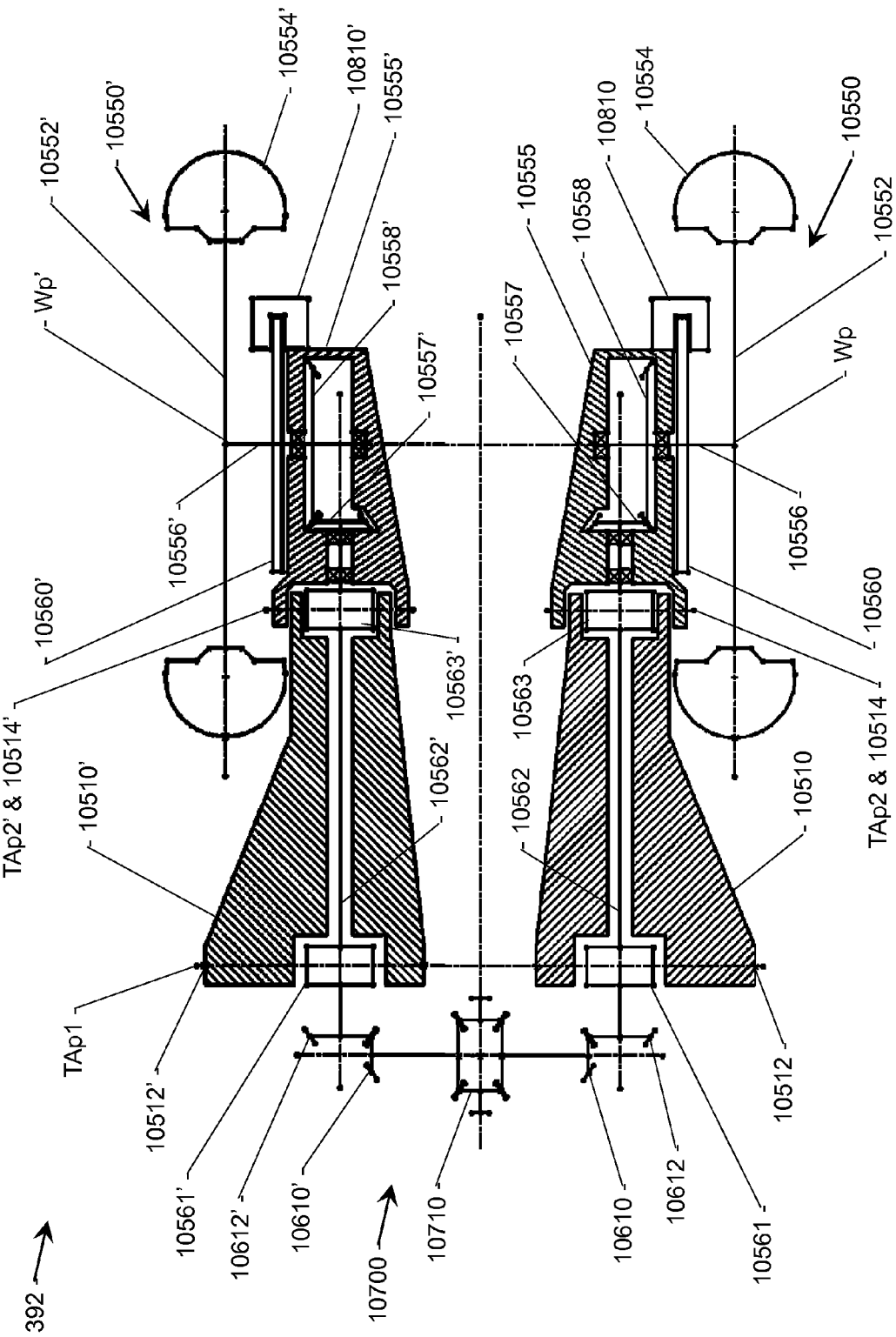
FIG. 34 is a diagrammatic sectional top view of the tenth embodiment of an apparatus according to the present invention, showing a shaft drive driveline with general multi-link trailing arm geometry pivoting about arbitrary point.

Components of the nominal vehicle and tenth embodiment appearing in the view of FIG. 34 are identified with series-10 label numerals:
392 chain driven trailing arm rear suspension on a narrow leaning commuter vehicle
10323 motorcycle sprung mass 10323
10510 trailing arm 10510
10512 trailing arm pivots to chassis 10512
10514 trailing arm pivot to carrier 10514
10550 rear wheel 10550
10552 wheel 10552
10554 tire 10554
10555 final drive carrier 10555
10556 rear axle 10556
10557 final driving pinion 10557
10558 final driven pinion 10558
10560 brake disc 10560
10561 first driveline joint 10561
10562 drive shaft 10562
10563 second driveline joint 10563
10610 differential driving pinion 10610
10612 differential driven pinion 10612
10700 final drive assembly 8700
10710 differential 10710
10810 brake caliper 10810
10812 rear brake caliper floating mount 10812
10814 torque link 10814
10816 chassis torque link mount 10816
Structure of the Tenth Embodiment:

An understanding of a tenth embodiment of an apparatus according to this disclosure is obtained upon reference to FIG. 34, which presents a sectional top view of an embodiment with arbitrary trailing arm with torque link geometry, as applied to a structure with a single-sided trailing arm with shaft drive mounted in a floating carrier. As with previous embodiments, this embodiment is mounted to the nominal example vehicle with trailing arm mounts. The trailing arm(s) 10510 and 10510' mount to the nominal vehicle chassis mounts with revolute joints (at TAp1 in FIG. 34) in the trailing arm pivots 10512. The trailing arm 10510 thus may pivot relative to the vehicle chassis.

At the rearward end of the trailing arm 10510, a floating final drive carrier 10555 is mounted with a revolute type joint, allowing the floating final drive carrier 10555 to pivot (on pivot TAp2 in FIG. 34) relative to the trailing arm 10510, with a pivot axis parallel to the pivot axis (TAp1) at the juncture between the trailing arm 10510 and the chassis trailing arm mounts. The rear axle 10556 (in this case a spinning live axle) is mounted with a revolute type joint to the floating final drive carrier 10555, with an axis parallel to both the trailing arm axis (TAp1) and the drive carrier 10555 axis (TAp2). The rear wheel 8550 is revolutely mounted about this axle 10556, which allows the rear wheel 10550 to spin on an axis parallel to the trailing arm pivot 10512, and to move up and down with the trailing arm 10510 and floating final drive carrier 10555. A differential 10710 distributes power between the two rear wheels 10550, 10550' by driving a differential driving pinion 10610, which then drives a differential driven pinion 10612. The differential driven pinion 10612 has a shaft which is connected to a driveline joint 10561 which is aligned with the trailing arm pivot 10512 and allows the drive shaft 10562 to move as the trailing arm 10510 moves. The drive shaft 10562 may have a slip joint 10564 (not shown) to allow for manufacturing tolerances, and/or to allow for length variations as the suspension moves over the range of travel. For a well-designed trailing geometry of this type, a slip joint is not necessarily required.

A second driveline joint 10563 is mounted on the other end of the drive shaft, and may be aligned with the pivot (TAp2) which connects pivotally the trailing arm and floating final drive carrier. This second driveline joint 10563 drives a final driving pinion 10557. The first driveline joint 10561 and/or the second driveline joint 10563 may be a Cardan type or a constant velocity type driveline joint, depending on the angles required. The final driving pinion 10557 is mounted in a floating final drive carrier 10555. Also provided within the final drive carrier 10555 is a final driven ring gear 10558, which delivers driving torque to the rear wheel 10550. A torsional vibration damper (not shown) may be used to couple the final driven ring gear 10558 to the rear wheel 10550. Also attached to the rear wheel 10550 is a brake disc 10560. A brake caliper 10810 mounted to the floating final drive carrier 10555 is actuated and grips the brake disc 10560 to provide torque to the wheel to slow the vehicle. Overall, the braking system is substantially similar to that of the eighth embodiment, but with series-10 label numerals in FIG. 34 corresponding to like components in FIG. 31.

The geometry of this tenth embodiment is represented schematically in FIG. 33. The trailing arm 10510 pivots relative to the vehicle chassis at point TAp1, with the floating final drive carrier 10555 pivoting about the point TAp2 and the rear wheel spinning about axis Wp revolutely mounted to the floating final drive carrier 10555. A first end of the torque link 10814 is revolutely mounted to the final drive carrier 10555 at point TLp2, with the other end of the torque link revolutely mounted to the chassis at point TLp1. The Virtual pivot and Force center is situate at point VpFc. Again, the Line of Action LoA is drawn between the tire contact point TrCpt and the VpFc, and its slope describes the amount of coupling between the drive forces at the tire contact point and the lift created by those drive forces.

Functionality, Operation and Method of Use for the Tenth Embodiment

This embodiment uses the arbitrary trailing arm with torque link geometry. As discussed in the first through third embodiments, this tenth embodiment could have neutral, stabilizing or slightly unstabilizing geometry for the acceleration case, engine braking case or the braking case, or a combination by fine tuning the geometry of the different axis points. Operation and method of use of the tenth embodiment would also be very similar to that of the earlier embodiment. The MATLAB program files listed in the appendices can also be used to optimize the different geometry positions for a desired average anti squat or anti rise or to have an optimal geometry for a given vehicle package.

Description of an Eleventh Embodiment

Figure 35:
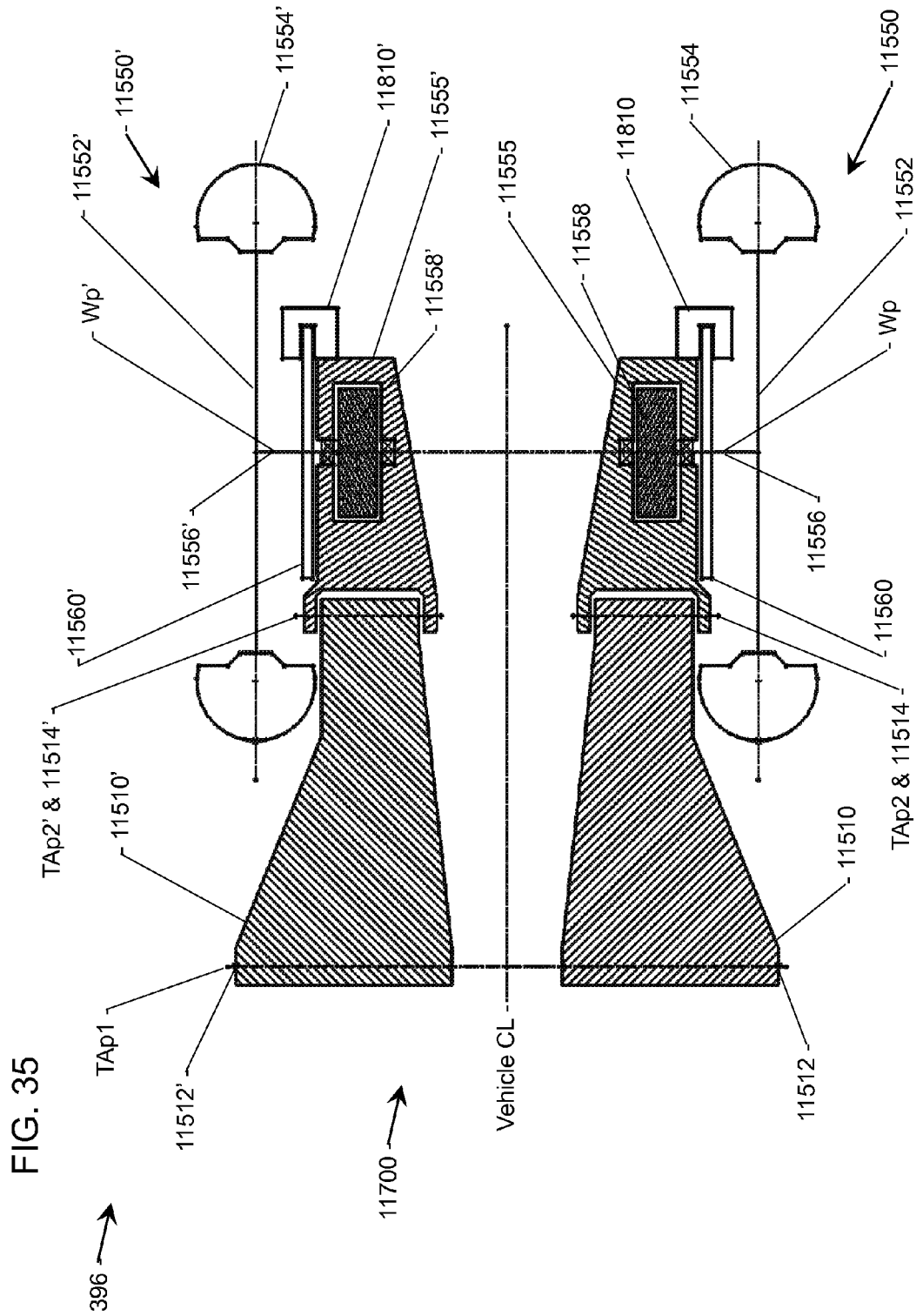
FIG. 35 is a diagrammatic sectional top view the eleventh embodiment of an apparatus according to the present invention, showing a hub motor driveline with general multi-link trailing arm geometry pivoting about arbitrary point.

Components of the nominal vehicle and eleventh embodiment appearing in the view of FIG. 35 are identified with series-11 label numerals:
396 chain driven trailing arm rear suspension on a narrow leaning commuter vehicle
11323 motorcycle sprung mass 11323
11510 trailing arm 11510
11512 trailing arm pivots to chassis 11512
11514 trailing arm pivot to carrier 11514
11550 rear wheel assembly 11550
11552 wheel 11552
11554 tire 11554
11555 hub motor carrier 11555
11556 rear axle 11556
11558 hub motor with gearing 11558
11560 brake disc 11560
11700 final drive assembly 11700
11810 brake caliper 11810
11812 rear brake caliper floating mount 11812
11814 torque link 11814
11816 chassis torque link mount 11816
Structure of the Eleventh Embodiment:

FIG. 35 provides a sectioned top view of an eleventh embodiment of an apparatus according to the present invention, and having an arbitrary trailing arm with torque link geometry, as applied to a structure with a single-sided trailing arm with hub motor drive mounted in a floating carrier. As with the other embodiments, this embodiment is mounted to the nominal example vehicle with trailing arm mounts. The trailing arm(s) 11510 and 11510' are connected to the nominal vehicle chassis mounts by revolute joints (at TAp1) in the trailing arm pivots 11512. This allows the trailing arm 11510 to pivot relative to the vehicle chassis. At the rearward end of the trailing arm 11510, a floating final drive carrier 11555 is connected with a revolute type joint. This allows the floating final drive carrier 11555 to pivot (on pivot TAp2 in FIG. 35) about the trailing arm 11510 with an axis parallel to the first pivot axis (TAp1) (whose revolute joint connects the trailing arm to the vehicle chassis trailing arm mount). The rear axle 11556 (here, a spinning live axle) is mounted with a revolute type joint to the floating final drive carrier 11555 with its axis parallel to both the trailing arm axis (TAp1) and the drive carrier 11555 axis (TAp2). The rear wheel 11550 is mounted about this axle 11556, which allows the rear wheel 11550 to spin on an axis parallel to the trailing arm pivot 11512, and to move up and down with the trailing arm 11510 and the floating final drive carrier 11555.

Hub motors with gearing 11558, 11558 are used to drive the rear wheels 11550, 11550. Depending on the type and size of the hub motor 11550 a reduction gear may be used or a multi-speed gear set could be used (not shown). The hub motor controllers (not shown) would command torque from each of the hub motors and each hub motor would be commanded to provide substantially equal torques to each of the two rear wheels. These hub motors with gearing 11558 and 11558' are mounted in a floating hub motor carrier 11555. A torsional vibration damper (not shown) may be used to couple the hub motor drive to the rear wheel 11550. The braking system is comparable to that of the tenth embodiment, and can be understood by a person of ordinary skill having reference to the braking systems of previously explained embodiments. Not shown is the suspension system which supports the vehicle and allows the wheel to move up and down to absorb irregularities in the terrain.

The geometry of this eleventh embodiment also is represented in FIG. 33. The trailing arm 11510 pivots relative to the vehicle chassis at point TAp1, and the floating final drive carrier 11555 pivots about the point TAp2. The rear wheel rotates about axis Wp revolutely attached to the floating final drive carrier 11555. A first end of the torque link 11814 is revolutely connected to the final drive carrier 11555 at point TLp2, while the second end of the torque link is revolutely mounted to the chassis at point TLp1.

Functionality, Operation and Method of Use for the Eleventh Embodiment

This eleventh embodiment uses the arbitrary trailing arm with torque link geometry. As discussed in the first through third embodiments, this eleventh embodiment could have neutral, stabilizing or slightly destabilizing geometry for the acceleration case, engine braking case or the braking case, or a combination by fine tuning the geometry of the different axis points. Operation and method of use of the eleventh embodiment would also be very similar to that of the earlier embodiment. The MATLAB program files listed in the appendices can also be used to optimize the different geometry positions for a desired average anti squat or anti rise or to have an optimal geometry for a given vehicle package.

CONCLUSION, RAMIFICATIONS AND SCOPE

There is disclosed a Geometry for Improved Driveline-Suspension Coupling of Narrow Leaning Commuter Vehicles which eliminates the dangerous unstable behavior of prior art narrow multi-track vehicles during acceleration while cornering. The geometry also provides for greatly improved dynamics during vehicle corning with engine braking or with use of the vehicle's service brakes. These improved dynamics allow for high levels of vehicle performance with reduced levels of vehicle operator training compared to prior art vehicles. The improved suspension dynamics give the vehicle excellent behavior even when compared to those of a motorcycle. The method and apparatus according to this disclosure also result in shorter trailing arm lengths than on prior art vehicles, which results in an easier-to-package suspension system, lowering vehicle cost, and increasing packaging flexibility in the vehicle design. This improved geometry also allows for reduced maintenance costs since much less labor and disassembly is required to replace critical driveline maintenance parts such as the final drive chain or belt.

The geometries and structures presented in this application provide for a wide range of design options. Lower cost vehicles may use the chain drive system described in the first group of embodiments. More expensive vehicles could be based on the shaft drive embodiments. More environmentally friendly vehicles could use the hub motor driven options.

While the foregoing descriptions contain many specifics for an example set of embodiments, these should not be construed as limitations on the scope of the invention, but rather as exemplification of a few preferred embodiments thereof. Many other variations are possible. For example, the trailing arm used could be of either double-sided or single-sided design, the braking system could be co-located with the driving system, or located on the other side of the driven (rear) wheel. The drive systems using an arbitrary trailing arm with torque link could be combined with a raking system based on the trailing arm with torque link pivoting about the wheel axle. Brake, drive and structural materials could be metallic or composite materials. Based on the geometry presented and the wide range of embodiments illustrating how to apply this geometry to different designs, one skilled in the art can apply the benefits of this invention to innumerable variations.

Computer Program-Listing Appendix

Attached hereto and incorporated herein by reference are appendices A-E supplying MATLAB computer program files, which in conjunction with the foregoing specification text and drawings, enable a person of ordinary skill in the art to practice the invention without undue experimentation.

Some helpful explanations regarding the supplied MATLAB files:

Comments in MATLAB start with the % character. Anything after a % is ignored.

The files supplied can be used with the MATLAB function 'fminsearch', which is a multivariable optimization function. Typically, this function starts with an initial set of parameter values and runs these values in an error function (the files supplied) which determines an error based on the initial parameter set. The MATLAB function 'fminsearch' then optimizes the parameter set to minimize the error as determined by the error function.

To run one of these error functions to optimize for a given parameter, first an initial parameter set is defined:

inputParameter2Optimize0=[50.7578 12.4088]

This parameter set will be used to optimize the driving pinion for a final chain drive system. Next, the input parameter and error function are determined and activated in the error function. In the error function, the line:

p2=inputParameter2Optimize(1)+
        j*inputParameter2Optimize(2);

is used to define p2 based on the input to the error function. As long as this is the last definition of p2 in the error function this statement will define p2. If p2 is defined before this statement the earlier definition will be ignored. The error is then defined in the error function. For example:

error=abs(std(AccelLiftCoef))

defines the output error to be the standard deviation of the acceleration lift coefficient over the range of suspension travel analyzed by the error function. Other error functions can be used depending on what is being optimized by the specific analysis. Once the input is defined and the output error is defined in the error function, 'fminsearch' is run in the MATLAB environment:

p2out=fminsearch('ChainBrake_function_revC',
        inputParameter2Optimize0)

The output, in this case p2out, is the optimized set of parameters as determined by MATLAB based on the error function and input output set used. As shown by the comments in the error functions presented in the attached text file a wide range of input parameters and error outputs can be used to optimize the suspension coupling for 1) neutral stability by minimizing the variation in the acceleration, deceleration and braking coupling coefficients; 2) for stabilizing geometry by optimizing the acceleration coefficient to increase as the suspension is compressed, or the braking coefficient to decrease as the suspension is compressed; or 3) for slightly destabilizing geometry by optimizing the acceleration coefficient to decrease as the suspension is compressed, or the braking coefficient to increase as the suspension is compressed.

Figure 36:
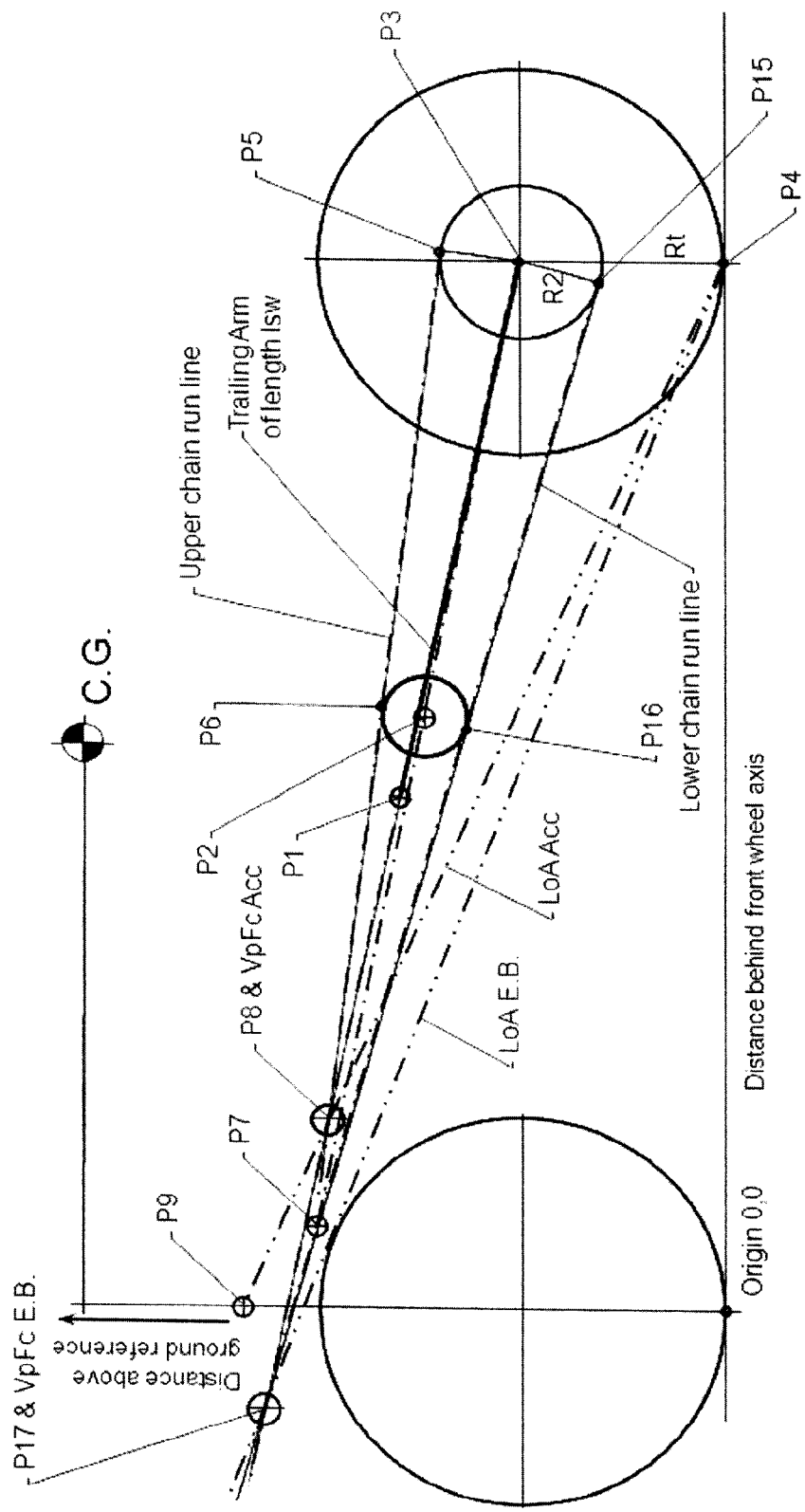
FIG. 36 is a diagrammatic side view of a vehicle with trailing arm and chain drive geometry between a driving pinion and a driven pinion, with points and lengths labeled for MATLAB® optimizing and analysis files.
Figure 37:
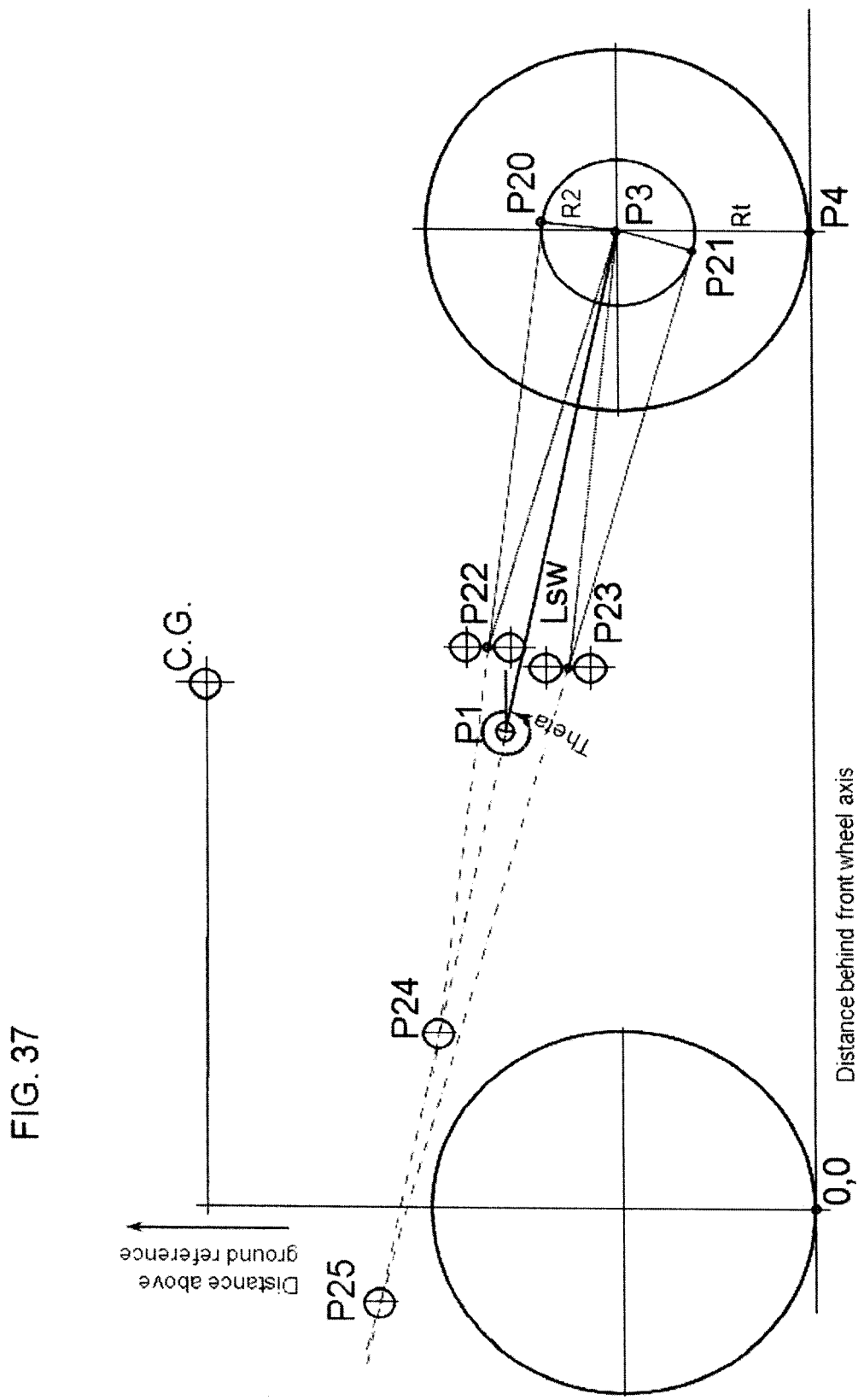
FIG. 37 is a diagrammatic side view of a vehicle with trailing arm and chain drive geometry guided by idle rollers on the upper and lower chain runs, with points and lengths labeled for MATLAB® optimizing and analysis files.
Figure 38:
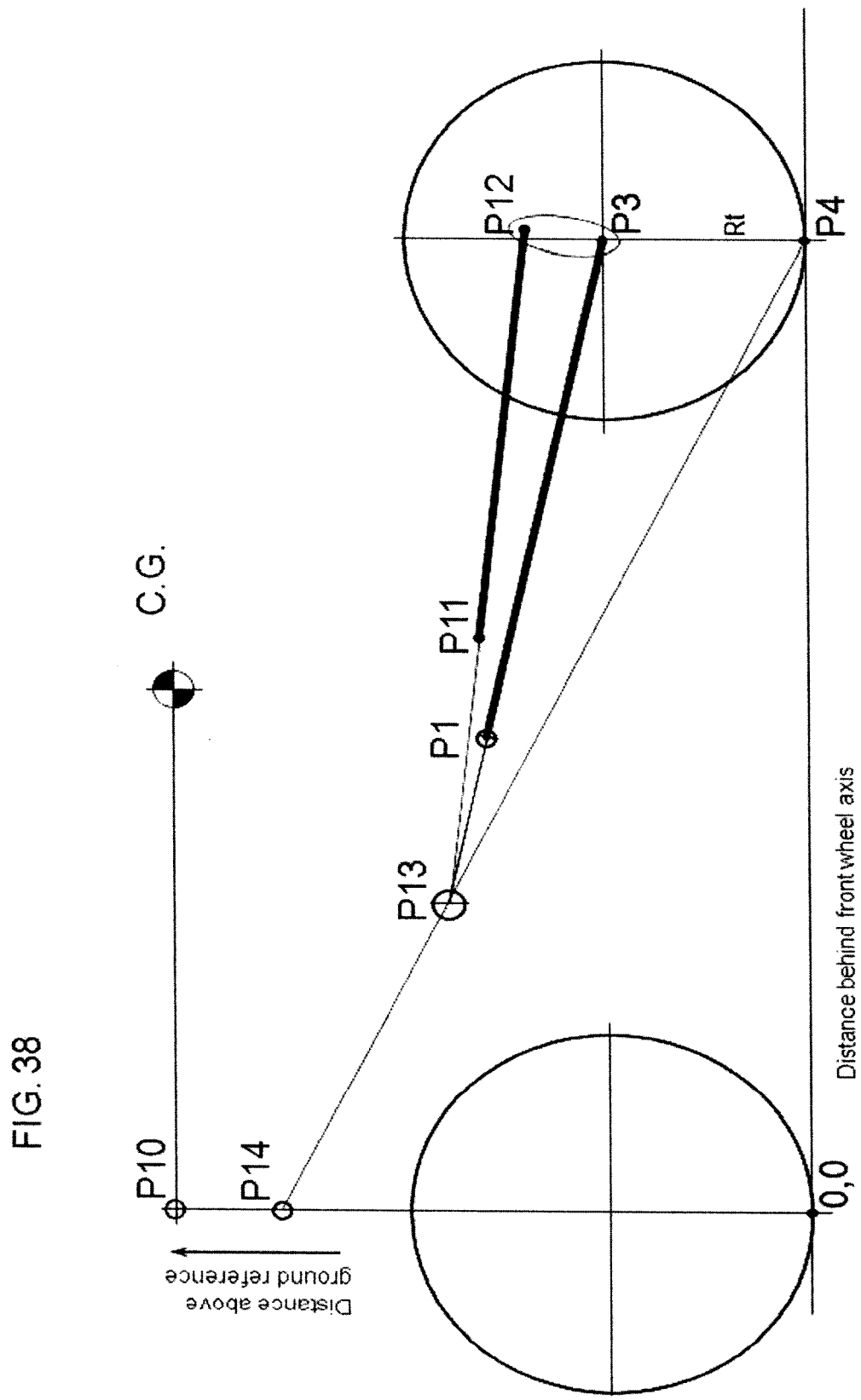
FIG. 38 is a diagrammatic side view of general multi-link trailing arm geometry pivoting about the wheel axle, with points and lengths labeled for MATLAB® optimizing and analysis files.
Figure 39:
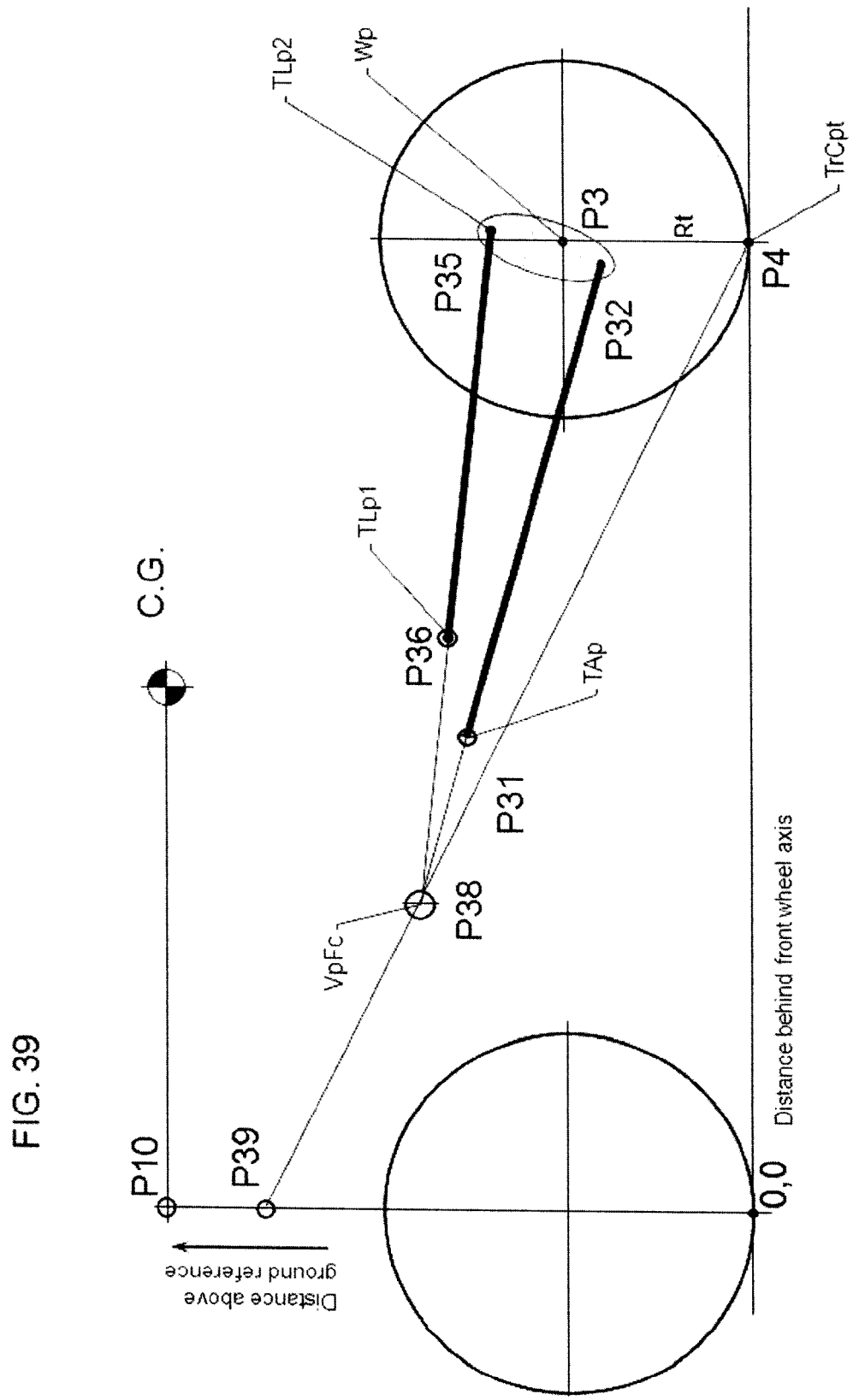
FIG. 39 is a diagrammatic side view of vehicle with general multi-link trailing arm geometry pivoting about arbitrary point, with points and lengths labeled for MATLAB® optimizing and analysis files.

Further, reference can be made to FIG. 36, which supplies a diagrammatic side view of a vehicle with trailing arm and chain drive geometry between a driving pinion and a driven pinion, with points and lengths labeled for MATLAB optimizing and analysis files. FIG. 37 is a diagrammatic side view of a vehicle with trailing arm and chain drive geometry guided by idle rollers on the upper and lower chain runs, also with points and lengths labeled in the figure for MATLAB optimizing and analysis files. Similarly, FIG. 38 is offered as a diagrammatic side view of general multi-link trailing arm geometry pivoting about the wheel axle, also with points and lengths labeled for MATLAB optimizing and analysis files. FIG. 39 is a diagrammatic side view of vehicle with general multi-link trailing arm geometry pivoting about arbitrary point, again with points and lengths labeled for MATLAB optimizing and analysis files. Finally, beneficial reference also is made to FIG. 40 for a diagrammatic side view of a vehicle with trailing arm and chain drive geometry guided by the driving pinion on the upper chain run and idle rollers on the lower chain run, with points and lengths labeled for MATLAB optimizing and analysis files.

I claim:

1. A method for improving performance of a driveline and suspension of a leaning vehicle having a first driveline, a first rear driven wheel on a first trailing arm suspension, a second driveline, and a second rear driven wheel on a second trailing arm suspension, the suspensions having a shared pivot axis wherein the driven wheels are movable independently of each other over a range of suspension travel, comprising:
   determining a driveline-suspension geometry which results in a substantially constant driveline-suspension coupling over the range of suspension travel, or in a progressively increasing driveline-suspension coupling during a suspension compression during vehicle acceleration, or in a progressively increasing driveline-suspension coupling during a suspension compression during vehicle braking;
   providing the drivelines and the suspensions with the determined suspension-driveline geometry; and
   supplying equal driving forces to the driven wheels.

2. The method of claim 1 wherein the step of determining a suspension-driveline geometry comprises:
   (a) estimating initial values for driveline-suspension design parameters;
   (b) locating driveline and suspension components at a selected position and according to the estimated initial values;
   (c) selecting a slope of a line of action of a resultant force, resulting from a vehicle driving force, acting through the shared pivot axis;
   (d) locating the line of action for the selected position of the driveline and suspension components;
   (e) determining a virtual pivot force center for the driveline and suspension components;
   (f) locating a chain run line;
   (g) locating driveline and suspension components at an alternative selected position and according to the estimated initial values;
   (h) selecting an alternative slope of the line of action;

(i) locating the line of action for the alternative selected position of the driveline and suspension components;

(j) determining an alternative virtual pivot force center for the driveline and suspension components at the alternative selected position of the driveline and suspension components;

(k) locating an alternative chain run line; and (l) using the chain run lines to determine a position and a diameter for a driving pinion.

3. The method of claim 2 comprising repeating steps 2(g) through 2(k), prior to step 2(l), to locate a plurality of alternative chain run lines.

4. The method of claim 2 wherein the step of locating a chain run line comprises locating an upper chain run line for a condition of vehicle acceleration.

5. The method of claim 3 wherein the step of determining a driveline-suspension geometry comprises determining a neutral driveline-suspension geometry which results in a substantially constant driveline-suspension coupling over the range of suspension travel, and wherein repeating steps 2(g) through 2(k) comprises selecting a plurality of equal alternative slopes of the line of action.

6. The method of claim 3 wherein the step of determining a driveline-suspension geometry comprises determining a stabilizing driveline-suspension geometry which results in a progressively increasing driveline-suspension coupling during suspension compression as the vehicle leans during vehicle acceleration, and wherein repeating steps 2(g) though 2(k) comprises selecting a plurality of progressively increasing alternative slopes of line of action.

7. The method of claim 3 wherein the step of determining a driveline-suspension geometry comprises determining a destabilizing driveline-suspension geometry which results in a progressively decreasing driveline-suspension coupling during suspension compression as a vehicle leans during vehicle acceleration, and wherein repeating steps 2(g) though 2(k) comprises selecting a plurality of progressively decreasing alternative slopes of line of action.

8. The method of claim 1 wherein the step of determining a suspension-driveline geometry comprises:

(a) estimating initial values for driveline-suspension design parameters;

(b) locating driveline and suspension components at a selected position and according to the estimated initial values;

(c) selecting a slope of a line of action of a resultant force, resulting from a vehicle driving force, acting through the shared pivot axis;

(d) locating the line of action for the selected position of the driveline and suspension components;

(e) determining a virtual pivot force center for the driveline and suspension components;

(f) locating a chassis rear brake stay mount position;

(g) locating driveline and suspension components at an alternative selected position and according to the estimated initial values;

(h) selecting an alternative slope of the line of action;

(i) locating the line of action for the alternative selected position of the driveline and suspension components;

(j) determining an alternative virtual pivot force center for the driveline and suspension components at the alternative selected position of the driveline and suspension components;

(k) locating an alternative chassis rear brake stay mount position; and (l) using the chassis rear brake stay mount positions to determine an optimal rear brake stay mount position;

wherein the step of locating a chassis rear brake stay mount position comprises locating a chassis rear brake stay mount position for a condition of vehicle deceleration due to service braking.

9. The method of claim 8 comprising repeating steps 8(g) through 8(k), prior to step 8(l), to locate a plurality of alternative chassis rear brake stay mount positions.

10. The method of claim 9 wherein the step of determining a driveline-suspension geometry comprises determining a neutral driveline-suspension geometry which results in a substantially constant driveline-suspension coupling over the range of suspension travel, and wherein repeating steps 8(g) through 8(k) comprises selecting a plurality of equal alternative slopes of the line of action.

11. The method of claim 9 wherein the step of determining a driveline-suspension geometry comprises determining a stabilizing driveline-suspension geometry which results in a progressively increasing driveline-suspension coupling during suspension compression as the vehicle leans during vehicle acceleration, and wherein repeating steps 8(g) though 8(k) comprises selecting a plurality of progressively increasing alternative slopes of line of action.

12. The method of claim 9 wherein the step of determining a driveline-suspension geometry comprises determining a stabilizing driveline-suspension geometry which results in a progressively decreasing driveline-suspension coupling during suspension compression as a vehicle leans during vehicle deceleration due to vehicle service braking, and wherein repeating steps 8(g) though 8(k) comprises selecting a plurality of progressively decreasing alternative slopes of line of action.

13. The method of claim 9 wherein the step of determining a driveline-suspension geometry comprises determining a destabilizing driveline-suspension geometry which results in a progressively decreasing driveline-suspension coupling during suspension compression as a vehicle leans during vehicle acceleration, and wherein repeating steps 8(g) though 8(k) comprises selecting a plurality of progressively decreasing alternative slopes of line of action.

14. The method of claim 2 wherein steps 2(a) through 2(l) are performed by iterative two-dimensional graphical analytical determination.

15. The method of claim 8 wherein steps 8(a) through 8(l) are performed by iterative two-dimensional graphical analytical determination.

16. The method according to claim 1 wherein the step of determining a driveline-suspension geometry comprises:

(a) selecting values for an initial set of driveline-suspension design parameters;

(b) locating driveline and suspension components at an initial position and according to the initial set of driveline-suspension design parameters;

(c) computing algebraically a calculated location of an initial line of action of a resultant force, resulting from a vehicle driving force acting through the shared pivot axis, and corresponding to the initial position of the driveline and suspension components;

(d) locating driveline and suspension components at a plurality of alternative positions and according to the initial set of driveline-suspension design parameters;

(e) computing algebraically a plurality of calculated locations of alternative lines of action of a resultant force, resulting from a vehicle driving force acting through the shared pivot axis, and corresponding to each of the plurality of alternative positions of the driveline and suspension components; and (f) selecting values for an alternative a set of driveline-suspension design parameters to optimize the variation between the calculated locations of the initial and alternative lines of action.

17. The method of claim 16 wherein selecting values for an alternative set of driveline-suspension parameters further comprises optimizing at least one design parameter value to minimize variation in the calculated locations of the initial and alternative lines of action.

18. A method according to claim 16 further comprising:
selecting an initial desired slope of the initial line of action;
selecting alternative desired slopes of the alternative lines of action;
computing algebraically calculated slopes of the initial and alternative lines of action; and
calculating at least one error between at least one of the desired slopes of the lines of action and at least one of the calculated slopes of the lines of action.

19. The method of claim 18 further comprising optimizing at least one design parameter value to minimize the at least one error.

* * * * *